(12) United States Patent
Hiwatari et al.

(10) Patent No.: US 9,276,735 B2
(45) Date of Patent: Mar. 1, 2016

(54) INFORMATION PROCESSING APPARATUS, SIGNATURE GENERATION APPARATUS, INFORMATION PROCESSING METHOD, SIGNATURE GENERATION METHOD, AND PROGRAM

(75) Inventors: Harunaga Hiwatari, Kanagawa (JP); Koichi Sakumoto, Tokyo (JP); Taizo Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 14/239,931

(22) PCT Filed: Aug. 17, 2012

(86) PCT No.: PCT/JP2012/070906
§ 371 (c)(1),
(2), (4) Date: Feb. 20, 2014

(87) PCT Pub. No.: WO2013/031555
PCT Pub. Date: Mar. 7, 2013

(65) Prior Publication Data
US 2014/0192981 A1    Jul. 10, 2014

(30) Foreign Application Priority Data
Aug. 29, 2011  (JP) ................. 2011-185944

(51) Int. Cl.
*H04L 29/06*   (2006.01)
*H04L 9/08*    (2006.01)
(Continued)

(52) U.S. Cl.
CPC ............ *H04L 9/0816* (2013.01); *H04L 9/3093* (2013.01); *H04L 9/3247* (2013.01)

(58) Field of Classification Search
CPC ... H04L 9/0816; H04L 9/3093; H04L 9/3247; H04L 9/08
See application file for complete search history.

(56) References Cited

U.S. PATENT DOCUMENTS 5,263,085 A * 11/1993 Shamir ................... H04L 9/302
                                                          380/28
5,375,170 A * 12/1994 Shamir ................. H04L 9/3247
                                                          380/28
(Continued)

FOREIGN PATENT DOCUMENTS

| JP | 02-266464 A | 10/1990 |
|----|-------------|---------|
| JP | H02-266464 A | 10/1990 |
| JP | 2008-545323 A | 12/2008 |

OTHER PUBLICATIONS

U.S. Appl. No. 14/237,030, filed Feb. 4, 2014, Sakumoto.
(Continued)

*Primary Examiner* — Chau Le
*Assistant Examiner* — Muhammad Chaudhry
(74) *Attorney, Agent, or Firm* — Sony Corporation

(57) ABSTRACT

An information processing apparatus including a random number generation unit configured to generate a pair of random numbers from a seed, a message generation unit configured to generate a message based on a pair of multi-order multivariate polynomials $F=(f_1, \ldots, f_m)$ defined in a ring K, the pair of random numbers, and a vector s that is an element of a set $K^n$, a message supply unit configured to supply the message to a verifier storing the pair of multi-order multivariate polynomials F and vectors $y=(y_1, \ldots, y_m)=(f_1(s), \ldots, f_m(s))$, and a response supply unit configured to supply the verifier with response information corresponding to a verification pattern selected by the verifier from among k (where $k \geq 3$) verification patterns.

10 Claims, 28 Drawing Sheets

(51) Int. Cl.
   *H04L 9/30* (2006.01)
   *H04L 9/32* (2006.01)

(56) References Cited

U.S. PATENT DOCUMENTS

| | | | | |
|---|---|---|---|---|
| 8,046,582 B2 * | 10/2011 | Akiyama et al. | ...... | H04L 9/3093 380/277 |
| 2005/0096906 A1 * | 5/2005 | Barzilay | ................ | G06Q 30/06 704/249 |

OTHER PUBLICATIONS

U.S. Appl. No. 14/236,959, filed Feb. 4, 2014, Sakumoto.
U.S. Appl. No. 14/237,010, filed Feb. 4, 2014, Sakumoto.
U.S. Appl. No. 14/236,703, filed Feb. 3, 2014, Sakumoto.
U.S. Appl. No. 14/235,240, filed Jan. 27, 2014, Sakumoto.
U.S. Appl. No. 14/239,926, filed Feb. 20, 2014, Sakumoto, et al.
Jacques Patarin, et al., "QUARTZ, 128-Bit Long Digital Signatures", Topics in Cryptology—CT-RSA 2001, Lecture Notes in Computer Science, vol. 2020, 2001, pp. 282-297.
Jacques Patarin, "Asymmetric Cryptography with a Hidden Monomial", Advances in Cryptology—CRYPTO '96, Lecture Notes in Computer Science, vol. 1109, 1996, pp. 45-60.
Koichi Sakumoto, et al., "Public-Key Identification Schemes based on Multivariate Quadratic Polynomials", Advances in Cryptology—CRYPTO 2011, Lecture Notes in Computer Science, vol. 6841, 2011, pp. 706-723.
Koichi Sakumoto, et al., "Public-Key Identification Schemes based on Multivariate Quadratic Polynomials", Advances in Cryptology—CRYPTO 2011, Lecture Notes in Computer Science, vol. 6841, 2011, 19 Pages(Powerpoint Slides).
Koichi Sakumoto et al, "Public-Key Identification Schemes Based on Multivariate Quadratic Polynomials", Advances in Cryptology—CRYPTO 2011 31st Annual Cryptology Conference, Santa Barbara, CA, USA, Springer, Aug. 6, 2011, vol. 6841, p. 706-723.
Koichi Sakumoto et al, "Public-Key Identification Schemes Based on Multivariate Quadratic Polynomials", CRYPTO 2011, Sony Corporation, Aug. 18, 2011, pp. 19.
Japanese Office Action for Application No. JP2011-185944, Issued on Apr. 14, 2015.
U.S. Appl. No. 14/370,817, filed Jul. 7, 2014, Sakumoto, et al.

* cited by examiner

PUBLIC-KEY AUTHENTICATION SCHEME

DIGITAL SIGNATURE SCHEME

APPLICATION EXAMPLE #1 (BASIC STRUCTURE)

MODIFICATION EXAMPLE A1

MODIFICATION EXAMPLE A1

MODIFICATION EXAMPLE A2

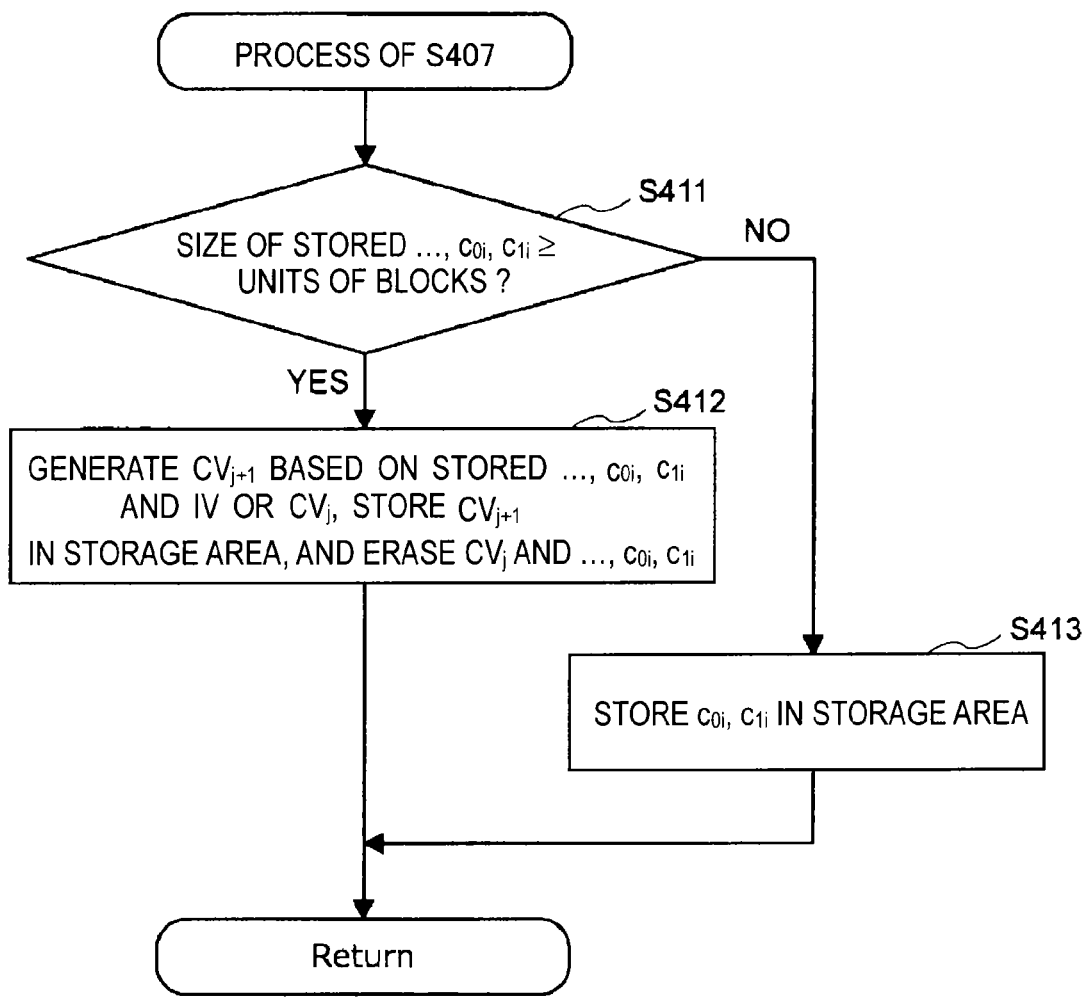

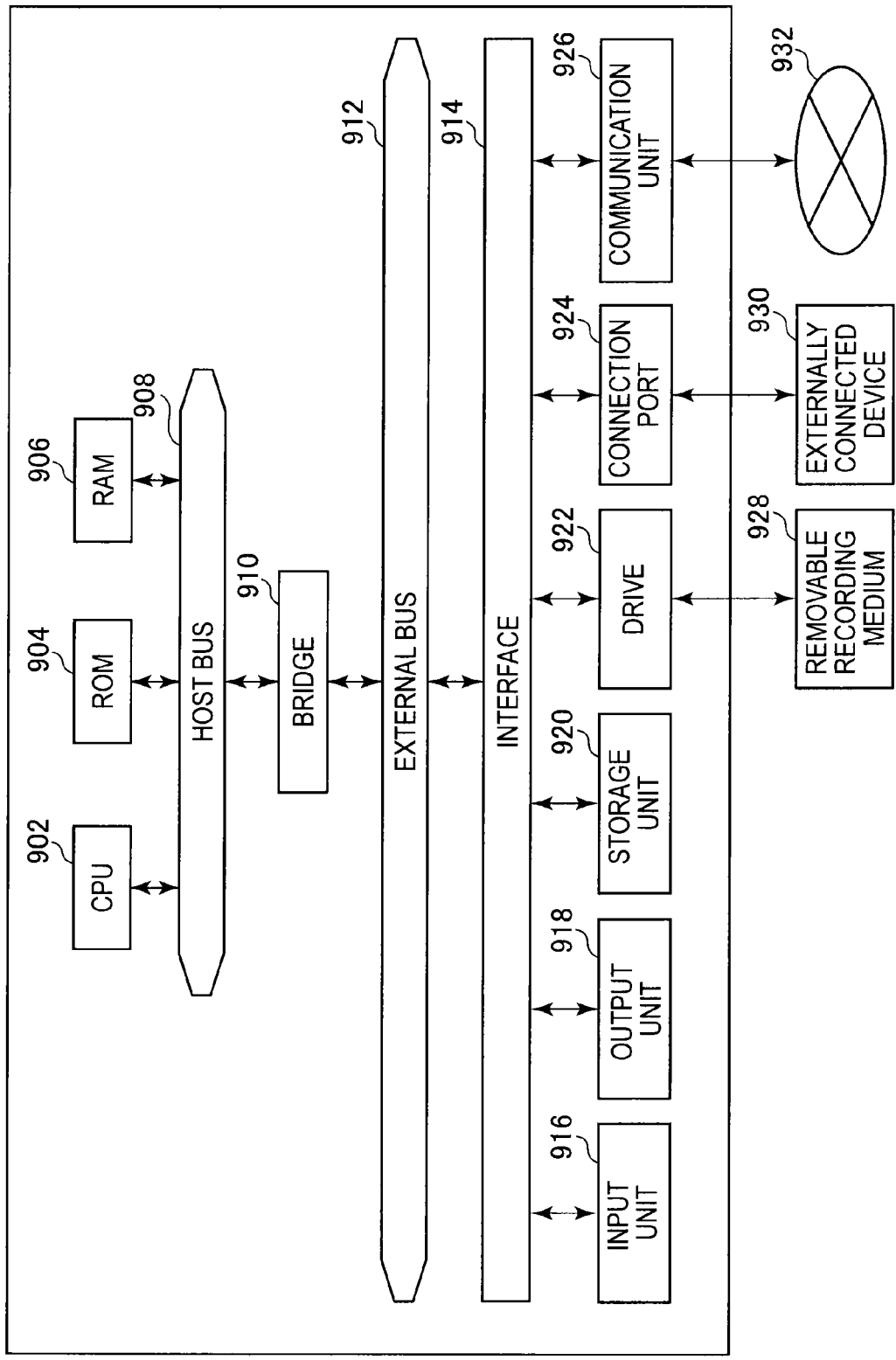

INFORMATION PROCESSING APPARATUS, SIGNATURE GENERATION APPARATUS, INFORMATION PROCESSING METHOD, SIGNATURE GENERATION METHOD, AND PROGRAM

TECHNICAL FIELD

The present technology relates to an information processing apparatus, a signature generation apparatus, an information processing method, a signature generation method, and a program.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in the following non-patent literatures 1 and 2.

CITATION LIST

Non-Patent Literature

Non-Patent Literature 1: Jacques Patarin, Asymmetric Cryptography with a Hidden Monomial, CRYPTO 1996, pp. 45-60

Non-Patent Literature 2: Patarin, J., Courtois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag., pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n)=y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n)))=y'$ related to $x_1, \ldots, x_n$. On the other hand, the equation $B(F(A(x_1, \ldots, x_n)))=y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n)))=y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n)))=y$ of a combined form of three functions (trapdoors) B, F, and A that can be relatively easily solved has been used, and thus it is difficult to ensure sufficient security.

The present technology is devised in view of the above-mentioned circumstance and is intended to provide a novel and improved information processing apparatus, a novel and improved signature generation apparatus, a novel and improved information processing method, a novel and improved signature generation method, and a novel and improved program capable of realizing a public-key authentication scheme and a digital signature scheme that are efficient and have high security using a multi-order multivariate simultaneous equation for which a means of efficient solving (trapdoor) is not known with a small memory.

Solution to Problem

According to an embodiment of the present technology, there is provided an n information processing apparatus including a random number generation unit configured to generate a pair of random numbers from a seed, a message generation unit configured to generate a message based on a pair of multi-order multivariate polynomials $F=(f_1, \ldots, f_m)$ defined in a ring K, the pair of random numbers, and a vector s that is an element of a set $K^n$, a message supply unit configured to supply the message to a verifier storing the pair of multi-order multivariate polynomials F and vectors $y=(y_1, \ldots, y_m)=(f_1(s), \ldots, f_m(s))$, and a response supply unit configured to supply the verifier with response information corresponding to a verification pattern selected by the verifier from among k (where k≥3) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys and the response information. The message generation unit stores the seed in a storage apparatus and sequentially erases the random numbers becoming unnecessary in course of generating the message and intermediate variables generated from the random numbers.

According to another embodiment of the present technology, there is provided an information processing apparatus including a random number generation unit configured to generate a pair of random numbers from a seed, a message generation unit configured to generate a message based on a pair of multi-order multivariate polynomials $F=(f_1, \ldots, f_m)$ defined in a ring K, the pair of random numbers, and a vector s that is an element of a set $K^n$, a message supply unit configured to supply the message to a verifier storing the pair of multi-order multivariate polynomials F and vectors $y=(y_1, \ldots, y_m)=(f_1(s), \ldots, f_m(s))$, an intermediate information generation unit configured to generate third information based on first information randomly selected by the verifier and second information obtained at a time of generation of the message, an intermediate information supply unit configured to supply the third information to the verifier, and a response supply unit configured to supply the verifier with response information corresponding to a verification pattern selected by the verifier from among k (where k≥2) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys, the first information, the third information, and the response information. The message generation unit stores the seed in a storage apparatus and sequentially erases the random numbers becoming unnecessary in course of generating the message and intermediate variables generated from the random numbers.

According to another embodiment of the present technology, there is provided a signature generation apparatus including a random number generation unit configured to generate a pair of random numbers from a seed, a signature generation unit configured to generate a digital signature for a document M based on a pair of multi-order multivariate polynomials $F=(f_1, \ldots, f_m)$ defined in a ring K, the pair of random numbers, and a signature key s that is an element of a set $K^n$, and a signature supply unit configured to supply the digital signature to a verifier storing the pair of multi-order multivariate polynomials F and vectors $y=(f_1(s), \ldots, f_m(s))$. The signature generation unit stores the seed in a storage apparatus and sequentially erases the random numbers becoming unnecessary in course of generating the digital signature and intermediate variables generated from the random numbers.

According to another embodiment of the present technology, there is provided an information processing method including a step of generating a pair of random numbers from a seed, a step of generating a message based on a pair of multi-order multivariate polynomials $F=(f_1, \ldots, f_m)$ defined in a ring K, the pair of random numbers, and a vector s that is an element of a set $K^n$, a step of supplying the message to a verifier storing the pair of multi-order multivariate polynomials F and vectors $y=(y_1, \ldots, y_m)=(f_1(s), \ldots, f_m(s))$, and a step of supplying the verifier with response information corresponding to a verification pattern selected by the verifier from among k (where k≥3) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys and the response information. In the step of generating the message, the seed is stored in a storage apparatus and a process of sequentially erasing the random numbers becoming unnecessary in course of generating the message and intermediate variables generated from the random numbers is executed.

According to another embodiment of the present technology, there is provided an information processing method including a step of generating a pair of random numbers from a seed, a step of generating a message based on a pair of multi-order multivariate polynomials $F=(f_1, \ldots, f_m)$ defined in a ring K, the pair of random numbers, and a vector s that is an element of a set $K^n$, a step of supplying the message to a verifier storing the pair of multi-order multivariate polynomials F and vectors $y=(y_1, \ldots, y_m)=(f_1(s), \ldots, f_m(s))$, a step of generating third information based on first information randomly selected by the verifier and second information obtained at a time of generation of the message, a step of supplying the third information to the verifier, and a step of supplying the verifier with response information corresponding to a verification pattern selected by the verifier from among k (where k≥2) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys, the first information, the third information, and the response information. In the step of generating the message, the seed is stored in a storage apparatus and a process of sequentially erasing the random numbers becoming unnecessary in course of generating the message and intermediate variables generated from the random numbers is executed.

According to another embodiment of the present technology, there is provided a signature generation method including a step of generating a pair of random numbers from a seed, a step of generating a digital signature for a document M based on a pair of multi-order multivariate polynomials $F=(f_1, \ldots, f_m)$ defined in a ring K, the pair of random numbers, and a signature key s that is an element of a set $K^n$, and a step of supplying the digital signature to a verifier storing the pair of multi-order multivariate polynomials F and vectors $y=(f_1(s), \ldots, f_m(s))$. In the step of generating the digital signature, the seed is stored in a storage apparatus and a process of sequentially erasing the random numbers becoming unnecessary in course of generating the digital signature and intermediate variables generated from the random numbers is executed.

According to another embodiment of the present technology, there is provided a program causing a computer to realize a random number generation function of generating a pair of random numbers from a seed, a message generation function of generating a message based on a pair of multi-order multivariate polynomials $F=f_m$) defined in a ring K, the pair of random numbers, and a vector s that is an element of a set $K^n$, a message supply function of supplying the message to a verifier storing the pair of multi-order multivariate polynomials F and vectors $y=(y_1, \ldots, y_m)=(f_1(s), \ldots, f_m(s))$, and a response supply function of supplying the verifier with response information corresponding to a verification pattern selected by the verifier from among k (where k≥3) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys and the response information. The message generation function stores the seed in a storage apparatus and sequentially erases the random numbers becoming unnecessary in course of generating the message and intermediate variables generated from the random numbers.

According to another embodiment of the present technology, there is provided a program causing a computer to realize a random number generation function of generating a pair of random numbers from a seed, a message generation function of generating a message based on a pair of multi-order multivariate polynomials $F=(f_1, \ldots, f_m)$ defined in a ring K, the pair of random numbers, and a vector s that is an element of a set $K^n$, a message supply function of supplying the message to a verifier storing the pair of multi-order multivariate polynomials F and vectors $y=(y_1, \ldots, y_m)=(f_1(s), \ldots, f_m(s))$, an intermediate information generation function of generating third information based on first information randomly selected by the verifier and second information obtained at a time of generation of the message, an intermediate information supply function of supplying the third information to the verifier, and a response supply function of supplying the verifier with response information corresponding to a verification pattern selected by the verifier from among k (where k≥2) verification patterns. The vector s is a secret key. The pair of multi-order multivariate polynomials F and the vectors y are public keys. The response information is information selected from among the pair of random numbers and the message according to the verification pattern. The message is information obtained by executing calculation prepared in advance for the verification pattern corresponding to the response information based on the public keys, the first information, the third information, and the response information. The message generation function stores the seed in a storage apparatus and sequentially erases the random numbers becoming unnecessary in course of generating the message and intermediate variables generated from the random numbers.

According to another embodiment of the present technology, there is provided a program causing a computer to realize a random number generation function of generating a pair of random numbers from a seed, a signature generation function of generating a digital signature for a document M based on a pair of multi-order multivariate polynomials $F=(f_1, \ldots, f_m)$ defined in a ring K, the pair of random numbers, and a signature key s that is an element of a set $K^n$, and a signature supply function of supplying the digital signature to a verifier storing the pair of multi-order multivariate polynomials F and vectors $y=(f_1(s), \ldots, f_m(s))$. The signature generation function stores the seed in a storage apparatus and sequentially erases the random numbers becoming unnecessary in course of generating the digital signature and intermediate variables generated from the random numbers.

According to another embodiment of the present technology, there is provided a computer-readable recording medium having the above-mentioned programs recorded thereon.

According to another embodiment of the present technology, there is provided a computer-readable recording medium having the above-mentioned programs recorded thereon.

Advantageous Effects of Invention

According to the present technology described above, it is possible to realize a public-key authentication scheme and a digital signature scheme that are efficient and have high security using a multi-order multivariate simultaneous equation for which efficiently solving means (trapdoor) is not known.

BRIEF DESCRIPTION OF DRAWINGS

FIG. 28 is an explanatory diagram for describing an intermediate variable management method according to a modification example of the embodiment.

FIG. 29 is an explanatory diagram for describing a hardware configuration example of an information processing apparatus capable of executing the algorithm according to each embodiment of the present technology.

DESCRIPTION OF EMBODIMENTS

Figure 1:
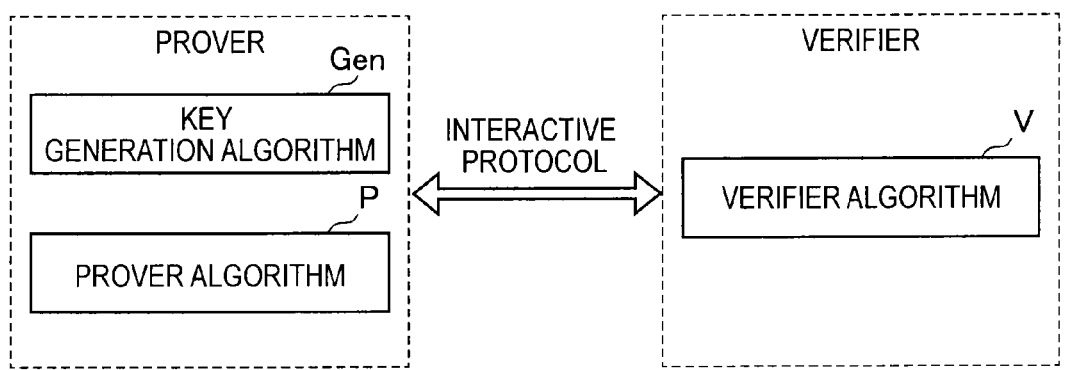
FIG. 1 is an explanatory diagram for describing an algorithm structure related to a public-key authentication scheme.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Next, an example of an algorithm structure related to a 3-pass public-key authentication scheme will be described with reference to FIGS. 4 and 5. Next, an example of an algorithm structure related to a 5-pass public-key authentication scheme will be described with reference to FIGS. 6 and 7. Next, a method of modifying the efficient algorithms related to the 3-pass and 5-pass public-key authentication schemes into algorithms of the digital signature scheme will be described with reference to FIGS. 8 and 9.

Subsequently, an intermediate variable management method according to the embodiment will be described with reference to FIGS. 10 to 28. Subsequently, a hardware configuration example of an information processing apparatus capable of realizing each algorithm according to the first and second embodiments of the present technology will be described with reference to FIG. 29. Finally, a summary of the technical spirit of the present embodiments and operational advantageous effects obtained from the technical spirit will be described in brief.

(Detailed Articles)

1. Introduction
    1-1: Algorithm of Public-key Authentication Scheme
    1-2: Algorithms for Digital Signature Scheme
    1-3: N-pass Public-key Authentication Scheme
2. Algorithm Structures Related to 3-pass Public-key Authentication Scheme
    2-1: Example of Specific Algorithm Structure
    2-2: Example of Parallelized Algorithm Structure
3: Algorithm Structure Related to 5-pass Public-key Authentication Scheme
    3-1: Example of Specific Algorithm Structure (FIG. 6)
    3-2: Example of Parallelized Algorithm Structure (FIG. 7)
4: Modification of Digital Signature Scheme
    4-1: Modification of 3-pass Public-key Authentication Scheme into Digital Signature Scheme
    4-2: Modification of 5-pass Public-key Authentication Scheme into Digital Signature Scheme 5: Efficient Intermediate Variable Management Method
  5-1: Overview
  5-2: Application Example #1 (Application to Basic Structure of 3-pass Scheme)
  5-3: Application Example #2 (Application to Parallelized Structure of 3-pass Scheme)
  5-4: Application Example #3 (Application to Basic Structure of 5-pass Scheme)
  5-5: Application Example #4 (Application to Parallelized Structure of 5-pass Scheme)
  5-6: Application Example #5 (Application to Digital Signature Scheme)
  5-7: Modification Example A (Structure in Consideration of Hash Function Structure)
    5-7-1: Application to 3-pass Scheme
    5-7-2: Application to 5-pass Scheme
  5-8: Modification Example B (Seed Determination Method)
6: Example of Hardware Configuration
7: Summary <1. Introduction>

The embodiments herein relate to a public-key authentication scheme and a digital signature scheme that base their safety on the difficulty of solving multi-order multivariate simultaneous equations. However, the embodiments herein differ from techniques of the related art such as HFE digital signature schemes, and relate to a public-key authentication scheme and a digital signature scheme that utilize multi-order multivariate simultaneous equations that lack a means of efficient solving (trapdoors). First, algorithms for a public-key authentication scheme, algorithms for a digital signature scheme, and an n-pass public-key authentication scheme will be briefly summarized.

1-1: Algorithm of Public-Key Authentication Scheme

First, an overview of algorithm of a public-key authentication scheme will be described with reference to FIG. 1. FIG. 1 is an explanatory diagram for describing an algorithm structure of a public-key authentication scheme.

A public-key authentication is used when a person (prover) convinces another person (verifier) that she is the prover herself by using a public key pk and a secret key sk. For example, a public key $pk_A$ of a prover A is made known to the verifier B. On the other hand, a secret key $sk_A$ of the prover A is secretly managed by the prover A. According to the public-key authentication scheme, a person who knows the secret key $sk_A$ corresponding to the public key $pk_A$ is regarded as the prover A herself.

In order for the prover A to prove to the verifier B that she is the prover A herself using the public-key authentication setup, the prover A, via a interactive protocol, presents proof to the verifier B indicating that she knows the secret key $sk_A$ corresponding to the public key $pk_A$. The proof indicating the prover A knows the secret key $sk_A$ is then presented to verifier B, and in the case where the verifier B is able to confirm that proof, the validity of the prover A (the fact that the prover A is herself) is proven.

However, a public-key authentication setup demands the following conditions in order to ensure safety.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the execution of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

Conducting public-key authentication safely involves using an interactive protocol exhibiting both soundness and zero-knowledge. If an authentication process were hypothetically conducted using an interactive protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

In a model of the public-key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public-key authentication scheme is configured from two entities, namely the prover and the verifier, and three algorithms, namely the key generation algorithm Gen, the prover algorithm P and the verifier algorithm V.

Figure 10:
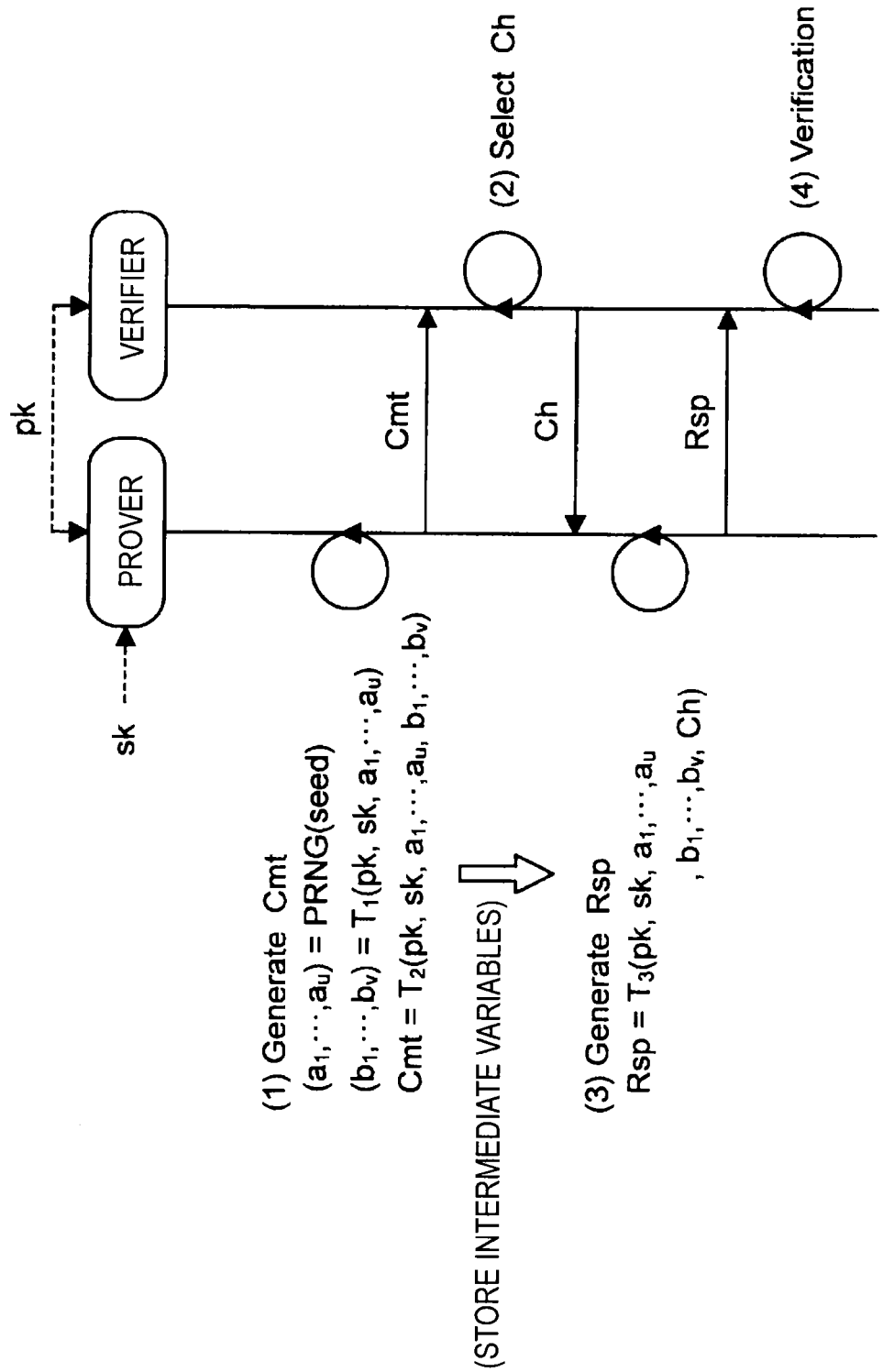
FIG. 10 is an explanatory diagram for describing an intermediate variable management method related to the 3-pass scheme.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 10, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter 1λ (λ is an integer of 0 or more) as an input and outputs the secret key sk and the public key pk.

[Math 1]

$$(sk, pk) \leftarrow Gen(1^\lambda) \qquad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following formula (2).

[Math 2]

$$0/1 \leftarrow V(pk) \qquad (2)$$

As above, realizing meaningful public-key authentication involves having the interactive protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key generation algorithm Gen, prover algorithm P, and verifier algorithm V are skillfully designed to satisfy these requirements.

The foregoing thus summarizes the algorithms in a public-key authentication scheme.

1-2: Algorithms for Digital Signature Scheme

Figure 2:
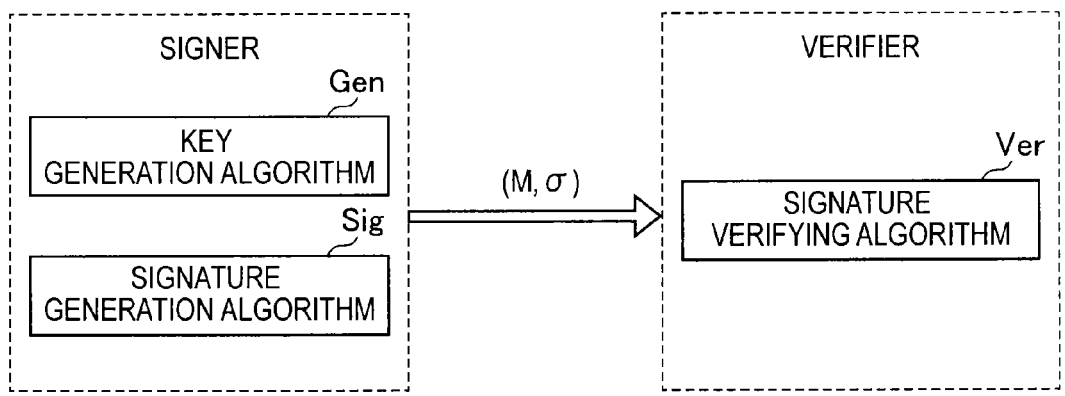
FIG. 2 is an explanatory diagram for describing an algorithm structure related to a digital signature scheme.

Next, algorithms for a digital signature scheme will be summarized with reference to FIG. 2. FIG. 2 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature q to attach to a message M. In other words, the signer is an entity that attaches a digital signature to a message M. Meanwhile, the verifier uses the signature verifying algorithm Ver to verify the digital signature attached to the message M. In other words, the verifier is an entity that verifies the digital signature q in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 10, for example. In other words, the key generation algorithm Gen, the signature generation algorithm Sig, and the signature verifying algorithm Ver are executed by a device such as a CPU 902 on the basis of a program recorded onto a device such as ROM 904, RAM 906, a storage unit 920, or a removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature q to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow Gen(1^\lambda) \qquad (3)$$

(Signature Generation Algorithm Sig)

The signature generation algorithm Sig is used by the signer. The signature generation algorithm Sig is an algorithm that generates a digital signature q to be attached to a message M. The signature generation algorithm Sig is an algorithm that accepts a signature key sk and a message M as input, and outputs a digital signature q. The signature generation algorithm Sig may be expressed formally as in the following formula (4).

[Math 4]

$$\sigma \leftarrow Sig(sk, M) \qquad (4)$$

(Signature Verifying Algorithm Ver)

The signature verifying algorithm Ver is used by the verifier. The signature verifying algorithm Ver is an algorithm that verifies whether or not the digital signature q is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver may be expressed formally as in the following formula (5). At this point, the verifier decides that the digital signature q is invalid in the case where the signature verifying algorithm Ver outputs 0 (the case where the verification key pk rejects the message M and the digital signature q), and decides that the digital signature q is valid in the case where the signature verifying algorithm Ver outputs 1 (the case where the verification key pk accepts the message M and the digital signature q).

[Math 5]

$$0/1 \rightarrow \text{Ver}(pk, M, \sigma) \quad (5)$$

The foregoing thus summarizes the algorithms in a digital signature scheme.

1-3: N-Pass Public-Key Authentication Scheme

Figure 3:
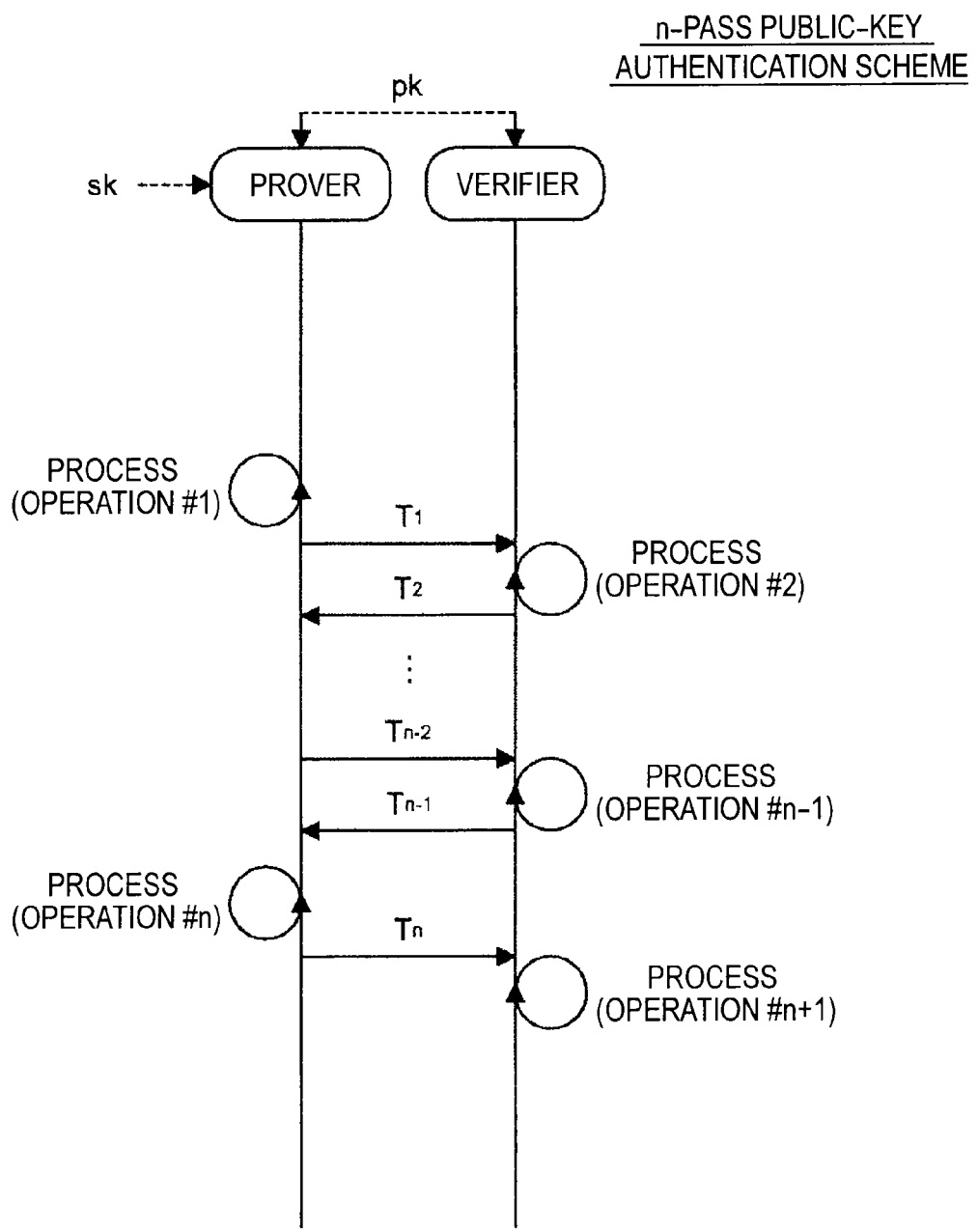
FIG. 3 is an explanatory diagram for describing an algorithm structure related to an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during an interactive protocol. In addition, the interactive protocol has to satisfy the two conditions of soundness and zero-knowledge. For this reason, during the interactive protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

<2. Algorithm Structures Related to 3-Pass Public-Key Authentication Scheme>

Hereinafter, algorithms related to a 3-pass public-key authentication scheme will be described. Note that in the following description, a 3-pass public-key authentication scheme may also be referred to as a "3-pass scheme" in some cases.

2-1: Example of Specific Algorithm Structure (FIG. 4)

Figure 4:
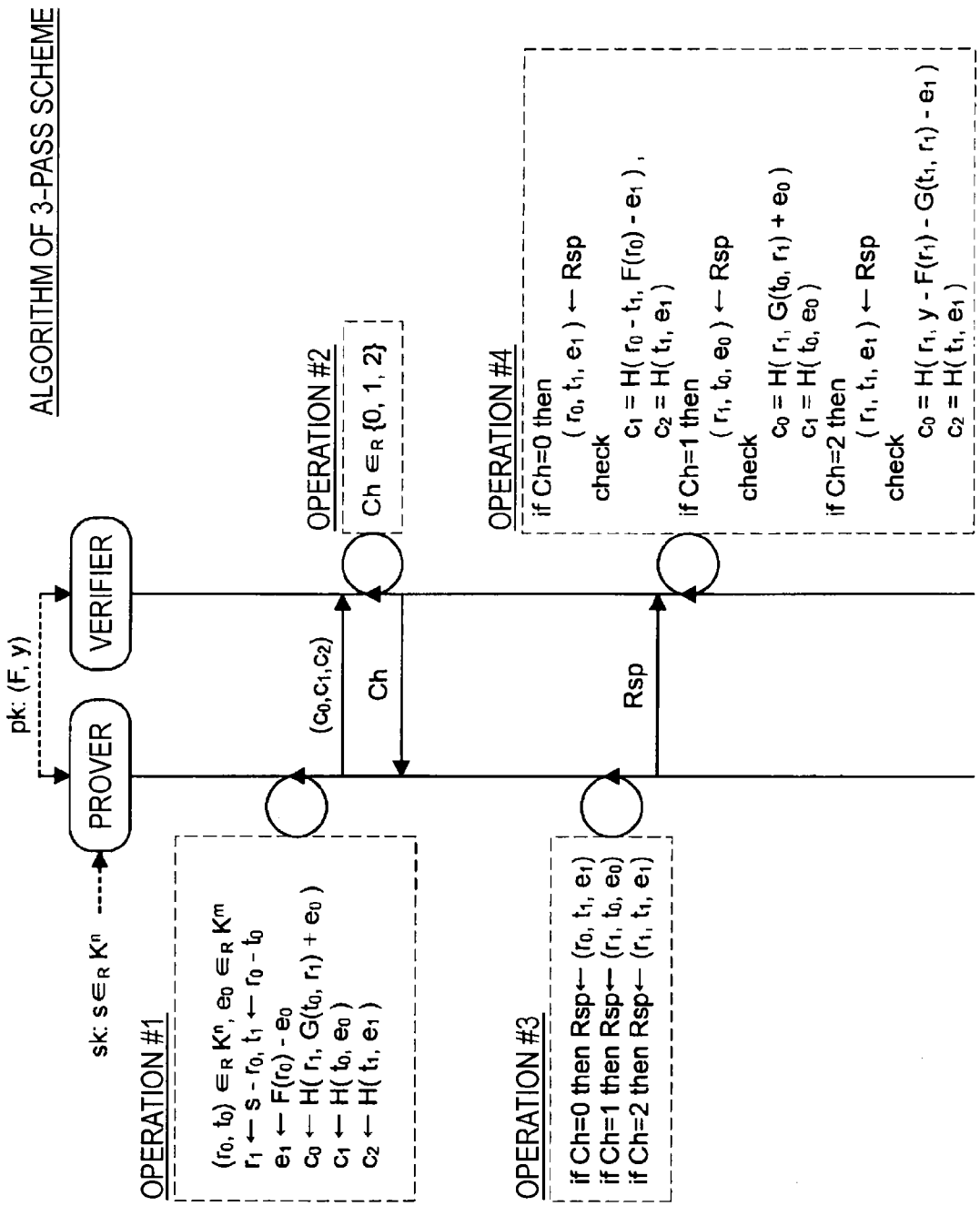
FIG. 4 is an explanatory diagram for describing an efficient algorithm related to the 3-pass public-key authentication scheme.

First, an example of a specific algorithm structure related to the 3-pass scheme will be introduced with reference to FIG. 4. FIG. 4 is an explanatory diagram for describing a specific algorithm structure related to the 3-pass scheme. Here, a case in which a pair of quadratic polynomials $(f_1(x), \ldots, f_m(x))$ are used as a part of the public key pk will be described. Here, a quadratic polynomial $f_i(x)$ is assumed to be expressed as in the following formula (6). Also, a vector $(x_1, \ldots, x_n)$ is represented as x and a pair of quadratic multivariate polynomials $(f_1(x), \ldots, f_m(x))$ are represented as multivariate polynomials $F(x)$.

[Math 6]

$$f_i(x_1, \ldots, x_n) = \sum_{j,k} a_{ijk} x_j x_k + \sum_j b_{ij} x_j \quad (6)$$

Also, the pair of quadratic polynomials $(f_1(x), \ldots, f_m(x))$ can be expressed as in the following formula (7). Also, $A_1, \ldots, A_m$ is an n×n matrix. Further, each of $b_1, \ldots, b_m$ is an n×1 vector.

[Math 7]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

When this expression is used, a multivariate polynomial F can be expressed as in the following formula (8) and formula (9). From the following formula (10), it can easily be confirmed that this expression is satisfied.

[Math 8]

$$F(x+y) = F(x) + F(y) + G(x, y) \quad (8)$$

$$G(x, y) = \begin{pmatrix} y^T(A_1^T + A_1)x \\ \vdots \\ y^T(A_m^T + A_m)x \end{pmatrix} \quad (9)$$

$$\begin{aligned} f_i(x+y) &= (x+y)^T A_i(x+y) + b_i^T(x+y) \quad (10) \\ &= x^T A_i x + x^T A_i y + y^T A_i x + y^T A_i y + b_i^T x + b_i^T y \\ &= f_i(x) + f_i(y) + x^T A_i y + y^T A_i x \\ &= f_i(x) + f_i(y) + x^T (A_i^T)^T y + y^T A_i x \\ &= f_i(x) + f_i(y) + (A_i^T x)^T y + y^T A_i x \\ &= f_i(x) + f_i(y) + y^T (A_i^T x) + y^T A_i x \\ &= f_i(x) + f_i(y) + y^T (A_i^T + A_i)x \end{aligned}$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) is also referred to as a bilinear term. Using this property enables the construction of an efficient algorithm.

For example, use the vector $t_0$ that is an element of the set $K^n$ and the vector $e_0$ that is an element of the set $K^m$ to express the multivariate polynomial $F_1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in formula (11) below. Here, when $t_1=r_0+t_0$, $e_1=F(r_0)+e_0$, the multivariate polynomial $F_2(x)=F(x+r_0)+F_1(x)$ can be expressed by the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

[Math 9]

$$\begin{aligned} F(x+r_0) + F_1(x) &= F(x) + F(r_0) + G(x, r_0) + G(x, t_0) + e_0 \quad (11) \\ &= F(x) + G(x, r_0 + t_0) + F(r_0) + e_0 \end{aligned}$$

Additionally, information on $r_0$ is not leaked at all from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an algorithm of the 3-pass scheme constructed based on the foregoing logic will be described. The algorithm of the 3-pass scheme to be described here is made up of a key generation algorithm Gen, a prover algorithm P, and a verifier algorithm V to be described below.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as $F(x)$.

(Prover Algorithm P, Verifier Algorithm V)

Hereinafter, a process performed by the prover algorithm P and a process performed by the verifier algorithm V during the interactive protocol will be described with reference to FIG. 4. During the foregoing interactive protocol, a prover does not leak information on the secret key s at all to a verifier and expresses to the verifier that "she herself knows s satisfying $y=F(s)$." On the other hand, the verifier verifies whether or not the prover knows s satisfying $y=F(s)$. The public key pk is assumed to be made known to the verifier. Also, the secret key s is assumed to be secretly managed by the prover. Hereinafter, the description will be made with reference to the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Additionally, the prover algorithm P calculates $t_1 \leftarrow r_0 - t_0$. Subsequently, the prover algorithm P calculates $e_1 \leftarrow F(r_0) - e_0$.

Operation #1 (Continued):

Subsequently, the prover algorithm P calculates $c_0 \leftarrow H(r_1, G(t_0, r_1) + e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response $Rsp=(r_0, t_1, e_1)$. In the case where Ch=1, the prover algorithm P generates a response $Rsp=(r_1, t_0, e_0)$. In the case where Ch=2, the prover algorithm P generates a response $Rsp=(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1 = H(r_0 - t_1, F(r_0) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0 = H(r_1, G(t_0, r_1) + e_0)$ holds. In addition, the verifier algorithm V verifies whether or not the equality of $c_1 = H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0 = H(r_1, y - F(r_1) - G(t_1, r_1) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 3-pass scheme has been described above.

2-2: Example of Parallelized Algorithm Structure (FIG. 5)

Next, a method of parallelizing the algorithm of the 3-pass scheme illustrated in FIG. 4 will be described with reference to FIG. 5. However, further description of the structure of the key generation algorithm Gen will be omitted.

In fact, applying the above session protocol makes it possible to keep the probability of a successful forgery to $2/3$ or less. Consequently, executing the session protocol twice makes it possible to keep the probability of a successful forgery to $(2/3)^2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Conceivable methods of executing the interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 3-pass scheme in parallel (hereinafter designated parallelized algorithms) will now be described with reference to FIG. 5.

Figure 5:
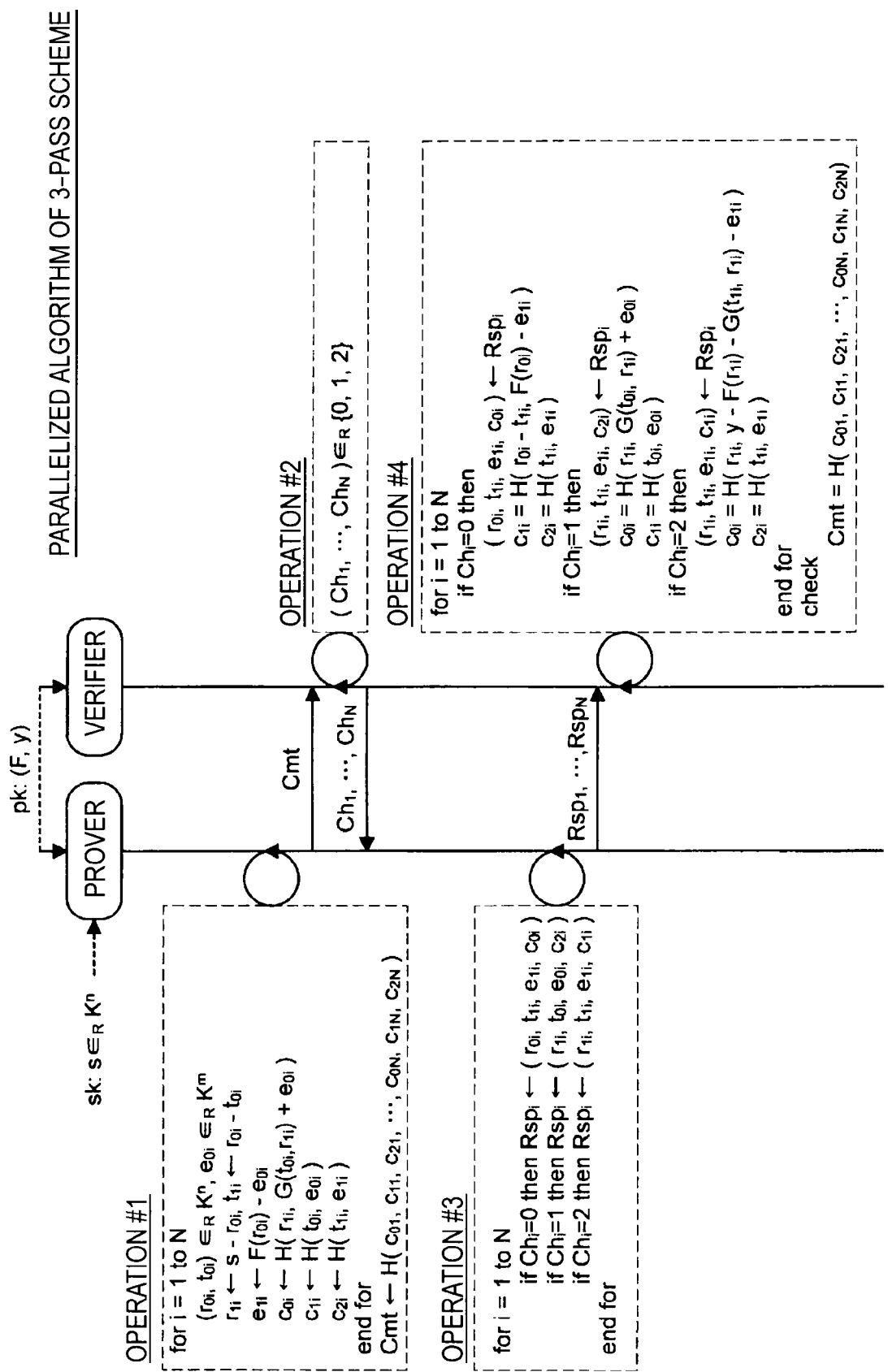
FIG. 5 is an explanatory diagram for describing parallelization of efficient algorithms related to the 3-pass public-key authentication scheme.

Operation #1:

As described in FIG. 5, the prover algorithm P first executes the following processes (1) to (6) for i=1 to N.

Process (1): The prover algorithm P randomly generates the vectors $r_{0i}$, $t_{0i}$ that are elements of the set $K^n$, and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$. Additionally, the prover algorithm P calculates $t_{1i} \leftarrow r_{0i} + t_{0i}$.

Process (3): The prover algorithm P calculates $e_{1i} \leftarrow F(r_{0i}) - e_{0i}$.

Process (4): The prover algorithm P calculates $c_{0i} \leftarrow H(r_{1i}, G(r_{1i}, t_{0i}) + e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates $Cmt \leftarrow H(c_{01}, c_{11}, e_{21}, \ldots, c_{0N}, c_{1N}, c_{2N})$. The hash value Cmt generated in operation #1 is sent to the verifier algorithm V. In this way, the message ($c_{01}, c_{11}, c_{21}, \ldots, c_{0N}, c_{1N}, c_{2N}$) is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i=(r_{0i}, t_{1i}, e_{1i}, c_{0i})$. In the case where $Ch_i=1$, the prover algorithm P generates a response $Rsp_i=(r_{1i}, t_{0i}, e_{0i}, c_{2i})$. In the case where $Ch_i=2$, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves ($r_{0i}, t_{1i}, e_{1i}, c_{0i}$) from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores ($c_{0i}, c_{1i}, c_{2i}$).

Process (2): In the case where $Ch_i=1$, the verifier algorithm V retrieves ($r_{1i}, t_{0i}, e_{0i}, c_{2i}$) from $Rsp_i$. Subsequently, the verifier algorithm V calculates $c_{0i}=H(r_{1i}, G(t_{0i}, r_{1i})+e_{0i})$. In addition, the verifier algorithm V calculates $c_{1i}=H(t_{0i}, e_{0i})$. The verifier algorithm V then stores ($c_{0i}, c_{1i}, c_{2i}$).

Process (3): In the case where $Ch_i=2$, the verifier algorithm V retrieves ($r_{1i}, t_{1i}, e_{1i}, c_{1i}$) from $Rsp_i$. Subsequently, the verifier algorithm V calculates $c_{0i}=H(r_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores ($c_{0i}, c_{1i}, c_{2i}$).

After executing the above processes (1) to (3) for i=1 to N, the verifier algorithm V verifies whether or not the equality of $Cmt=H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The example of the structures of the parallelized efficient algorithms related to the 3-pass scheme has been described above.

<3: Algorithm Structure Related to 5-Pass Public-Key Authentication Scheme>

Next, algorithms related to a 5-pass public-key authentication scheme will be described. Note that in the following description, a 5-pass public-key authentication scheme may also be referred to as a "5-pass scheme" in some cases.

In the case of the 3-pass scheme, the probability of the false verification is ⅔ per time of the interactive protocol. However, in the case of the 5-pass scheme, the probability of the false verification per time of the interactive protocol is ½+1/q. Here, q is an order of a ring to be used. Accordingly, when the order of the ring is sufficiently large, the probability of the false verification per time of the 5-pass scheme can be reduced, and thus the probability of the false verification can be sufficiently reduced by executing the interactive protocol a small number of times.

For example, when the probability of the false verification is desired to be equal to or less than $½^n$, the interactive protocol has to be executed n/(log 3−1)=1.701n times or more in the 3-pass scheme. On the other hand, when the probability of the false verification is desired to be equal to or less than $½^n$, the interactive protocol has to be executed n/(1−log(1+1/q)) times or more in the 5-pass scheme. Accordingly, when q=24, a communication quantity necessary to realize the same security level is less in the 5-pass scheme than in the 3-pass scheme.

3-1: Example of Specific Algorithm Structure (FIG. 6)

Figure 6:
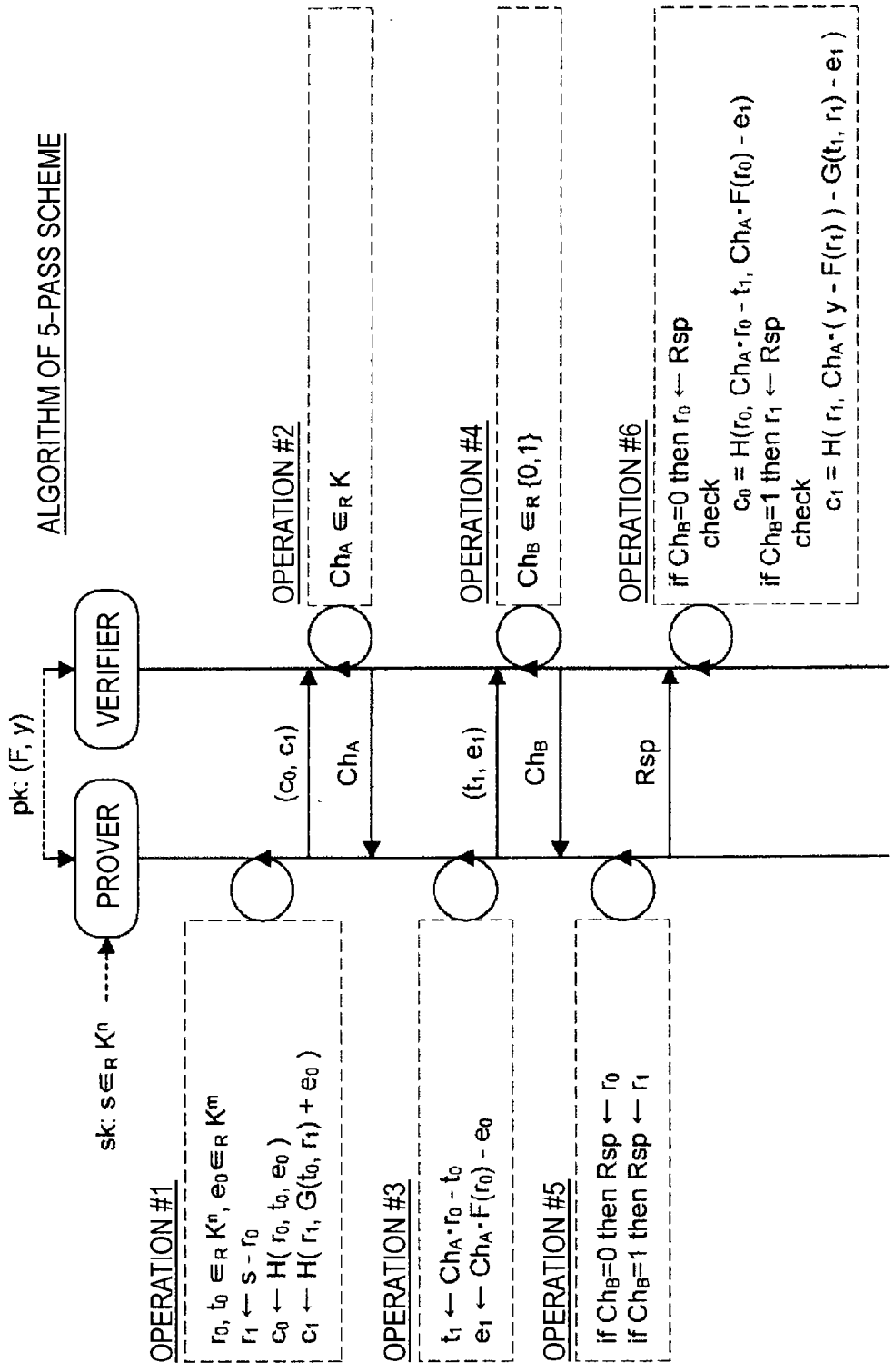
FIG. 6 is an explanatory diagram for describing an example of an efficient algorithm related to the 5-pass public-key authentication scheme.

First, an example of a specific algorithm structure related to the 5-pass scheme will be introduced with reference to FIG. 6. FIG. 6 is an explanatory diagram for describing a specific algorithm structure related to the 5-pass scheme. Here, a case in which a pair of quadratic polynomials ($f_1(x), \ldots, f_m(x)$) are used as a part of the public key pk will be described. Here, a quadratic polynomial $f_i(x)$ is assumed to be expressed as in the foregoing formula (6). Also, a vector ($x_1, \ldots, x_n$) is represented as x and a pair of quadratic multivariate polynomials ($f_1(x), \ldots, f_m(x)$) are represented as multivariate polynomials F(x).

As in the efficient algorithms related to the 3-pass scheme, two vectors, i.e., the vector $t_0$ that is an element of the set $K^n$ and the vector $e_0$ that is an element of the set $K^m$, are used to express the multivariate polynomial $F_1(x)$, which is used to mask the multivariate polynomial $F(x+r_0)$, as $F_1(x)=G(x, t_0)+e_0$. When this expression is used, a relation expressed in the following formula (12) can be obtained for the multivariate polynomial $F(x+r_0)$.

[Math 10]

$$Ch_A \cdot F(x+r_0) + F_1(x) = Ch_A \cdot F(x) + Ch_A \cdot F(r_0) + Ch_A \cdot G(x, r_0) + G(x, t_0) + e_0 \quad (12)$$
$$= Ch_A \cdot F(x) + G(x, Ch_A \cdot r_0 + t_0) + Ch_A \cdot F(r_0) + e_0$$

For this reason, when $t_1=Ch_A \cdot r_0+t_0$, $e_1=Ch_A \cdot F(r_0)+e_0$, the multivariate polynomial $F_2(x)=Ch_A \cdot F(x+r_0)+(x)$ after the masking can also be expressed by two vectors, i.e., the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

Additionally, information on $r_0$ is not at all leaked from $F_2$ (or $F_1$). For example, even when $e_1$ and $t_1$ (or $e_0$ and $t_0$) are given, the information on $r_0$ is not known at all as long as $e_0$ and to (or $e_1$ and $t_1$) are not known. Accordingly, the zero knowledge is ensured. Hereinafter, an algorithm of the 5-pass scheme constructed based on the foregoing logic will be described. The algorithm of the 5-pass scheme to be described here is made up of a key generation algorithm Gen, a prover algorithm P, and a verifier algorithm V to be described below.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the key generation algorithm Gen calculates $y=(y_1, \ldots, y_m)$ $(f_1(s), \ldots, f_m(s))$. Also, the key generation algorithm Gen sets $(f_1, \ldots, f_m, y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as $F(x)$.

(Prover Algorithm P, Verifier Algorithm V)

Hereinafter, a process performed by the prover algorithm P and a process performed by the verifier algorithm V during the interactive protocol will be described with reference to FIG. 6. During the foregoing interactive protocol, a prover does not leak information on the secret key s at all to a verifier and expresses to the verifier that "she herself knows s satisfying $y=F(s)$." On the other hand, the verifier verifies whether or not the prover knows s satisfying $y=F(s)$. The public key pk is assumed to be made known to the verifier. Also, the secret key s is assumed to be secretly managed by the prover. Hereinafter, the description will be made with reference to the flowchart illustrated in FIG. 6.

Operation #1:

As illustrated in FIG. 10, the prover algorithm P randomly generates the vector $r_0$ that is an element of the set $K^n$, the vector $t_0$ that is an element of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Subsequently, the prover algorithm P calculates the hash value $c_0$ of the vectors $r_0, t_0, e_0$. That is, the prover algorithm P calculates $c_0 \leftarrow H(r_0, t_0, e_0)$. Subsequently, the prover algorithm P generates $G(t_0, r_1)+e_0$ and the hash value $c_1$ of $r_1$. That is, the prover algorithm P calculates $c_0 \leftarrow H(r_1, G(t_0, r_1)+e_0)$. The messages $(c_0, c_1)$ generated in operation #1 is sent to the verifier algorithm V.

Operation #2:

Upon receiving the messages $(c_0, c_1)$, the verifier algorithm V randomly selects one number $Ch_A$ from the origins of q rings K and sends the selected number $Ch_A$ to the prover algorithm P.

Operation #3:

Upon receiving the number $Ch_A$, the prover algorithm P calculates $t_1 \leftarrow Ch_A \cdot r_0 - t_0$. Additionally, the prover algorithm P calculates $e_1 \leftarrow Ch_A \cdot F(r_0) - e_0$. The prover algorithm P sends $t_1$ and $e_1$ to the verifier algorithm V.

Operation #4:

Upon receiving $t_1$ and $e_1$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response $Rsp=r_0$. In the case where $Ch_B=1$, the prover algorithm P generates a response $Rsp=r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V executes $r_0 \leftarrow Rsp$. Then, the verifier algorithm V verifies whether or not the equality of $c_0 = H(r_0, Ch_A \cdot r_0 - t_1, Ch_A \cdot F(r_0) - e_1)$ holds. The verifier algorithm V outputs the value 1 to indicate authentication success in the case where these verifications all succeed, and outputs the value 0 to indicate authentication failure in the case where a verification fails.

In the case where $Ch_B=1$, the verifier algorithm V executes $r_1 \leftarrow Rsp$. Then, the verifier algorithm V verifies whether or not the equality of $c_1 = H_1(r_1, Ch_A \cdot (y - F(r_1)) - G(t_1, r_1) - e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 5-pass scheme has been described above.

Figure 7:
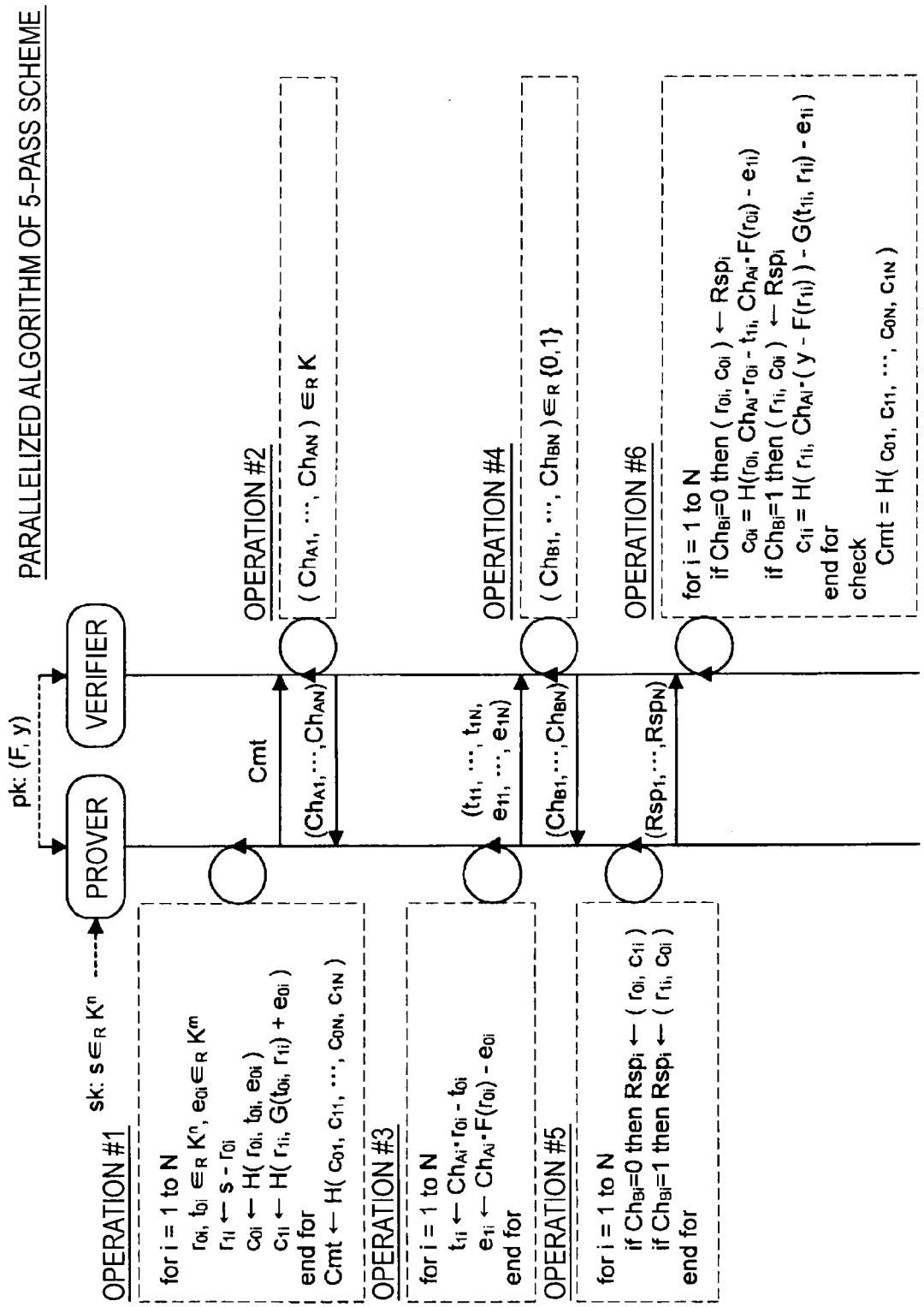
FIG. 7 is an explanatory diagram for describing parallelization of efficient algorithms related to the 5-pass public-key authentication scheme.

3-2: Example of Parallelized Algorithm Structure (FIG. 7)

Next, a method of parallelizing the algorithm of the 5-pass scheme illustrated in FIG. 6 will be described with reference to FIG. 7. However, further description of the structure of the key generation algorithm Gen will be omitted.

As described above, applying the above interactive protocol related to the 5-pass scheme makes it possible to keep the probability of a successful forgery to $(1/2+1/q)$ or less. Consequently, executing the interactive protocol twice makes it possible to keep the probability of a successful forgery to $(1/2+1/q)^2$ or less. Furthermore, if the interactive protocol is executed N times, the probability of a successful forgery becomes $(1/2+1/q)^N$, and if N is set to a sufficiently large number (N=80, for example), the probability of a successful forgery becomes negligibly small.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 5-pass scheme in parallel (hereinafter designated parallelized algorithms) will now be described.

Operation #1:

As described in FIG. 7, the prover algorithm P first executes the following processes (1) to (4) for i=1 to N.

Process (1): The prover algorithm P randomly generates the vectors $r_{0i}, t_{0i}$ that are elements of the set $K^n$, and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$.

Process (3): The prover algorithm P calculates $c_{0i} \leftarrow H(r_{0i}, t_{0i}, e_{0i})$.

Process (4): The prover algorithm P calculates $c_{1i} \leftarrow H(r_{1i}, G(t_{0i}, r_{1i}) + e_{0i})$.

After executing the above processes (1) to (4) for i=1 to N, the prover algorithm P executes the hash value $Cmt \leftarrow H(c_{01}, c_{11}, \ldots, c_{0N}, c_{1N})$. The hash value Cmt generated in operation #1 is sent to the verifier algorithm V.

Operation #2:

Upon receiving the hash value Cmt, the verifier algorithm V randomly selects one number $Ch_{Ai}$ from the origins of q rings K for i=1 to N and sends the selected number $Ch_{Ai}$ (i=1 to N) to the prover algorithm P.

Operation #3:

Upon receiving the number $Ch_{Ai}$ (i=1 to N), the prover algorithm P calculates $t_{1i} \leftarrow Ch_{Ai} \cdot r_{0i} - t_{0i}$ for i=1 to N. Additionally, the prover algorithm P calculates $e_{1i} \leftarrow Ch_{Ai} \cdot F(r_{0i}) - e_{0i}$ for i=1 to N. Then, the prover algorithm P sends $t_{11}, \ldots, t_{1N}$ and $e_{11}, \ldots, e_{1N}$ to the verifier algorithm V.

Operation #4:

Upon receiving $t_{11}, \ldots, t_{1N}$ and $e_{11}, \ldots, e_{1N}$, the verifier algorithm V selects which verification pattern to use from between two verification patterns for i=1 to N. For example, the verifier algorithm V may select a numerical value from between two numerical values $\{0, 1\}$ representing verification patterns, and set the selected numerical value in a challenge $Ch_{Bi}$. This challenge $Ch_{Bi}$ (i=1 to N) is sent to the prover algorithm P.

Operation #5:

Upon receiving the challenge $Ch_{Bi}$ (i=1 to N), the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i=(r_{0i}, c_{1i})$. In the case where $Ch_{Bi}=1$, the prover algorithm P generates a response $Rsp_i=(r_{1i}, c_{0i})$. The response $Rsp_i$ (i=1 to N) generated in operation #5 is sent to the verifier algorithm V.

Operation #6:

Upon receiving the response $Rsp_i$ (i=1 to N), the verifier algorithm V executes the following processes (1) and (2) using the received response $Rsp_i$ (i=1 to N).

Process (1): In the case where $Ch_{Bi}=0$, the verifier algorithm V executes $(r_{0i}, c_{1i}) \leftarrow Rsp_i$. Then, the verifier algorithm V calculates $c_{0i}=H(r_{0i}-Ch_{Ai} \cdot r_{0i}-t_{1i}, Ch_{Ai} \cdot F(r_{0i})-e_{1i})$. The verifier algorithm V then stores $(c_{0i}, c_{1i})$.

Process (2): In the case where $Ch_{Bi}=1$, the verifier algorithm V executes $(r_{1i}, c_{0i}) \leftarrow Rsp_i$. Then, the verifier algorithm V calculates $c_{1i}=Ch_{Ai} \cdot (y-F(r_{1i}))-G(t_{1i}, r_{1i})-e_{1i}$. The verifier algorithm V then stores $(c_{0i}, c_{1i})$.

After executing the processes (1) and (2) for i=1 to N, the verifier algorithm V verifies whether or not the equality of $Cmt=H(c_{01}, c_{11}, \ldots, c_{0N}, c_{1N})$ holds. The verifier algorithm V outputs the value 1 to indicate authentication success in the case where these verifications succeed, and outputs the value 0 to indicate authentication failure in the case where a verification fails.

The example of the structures of the parallelized efficient algorithms related to the 5-pass scheme has been described above.

<4: Modification of Digital Signature Scheme>

Here, a method of modifying the foregoing public-key authentication scheme into a digital signature scheme will be introduced.

When a prover in a model of a public-key authentication scheme matches a signer in a digital signature scheme, an approximation to the model of the digital signature scheme can easily be understood in that only a prover can convince a verifier. Based on this idea, a method of modifying the above-described public-key authentication scheme into a digital signature scheme will be descried.

4-1: Modification of 3-Pass Public-Key Authentication Scheme into Digital Signature Scheme (FIG. 8)

First, modification of a public-key authentication scheme of 3-pass into a digital signature scheme will be described.

Figure 8:
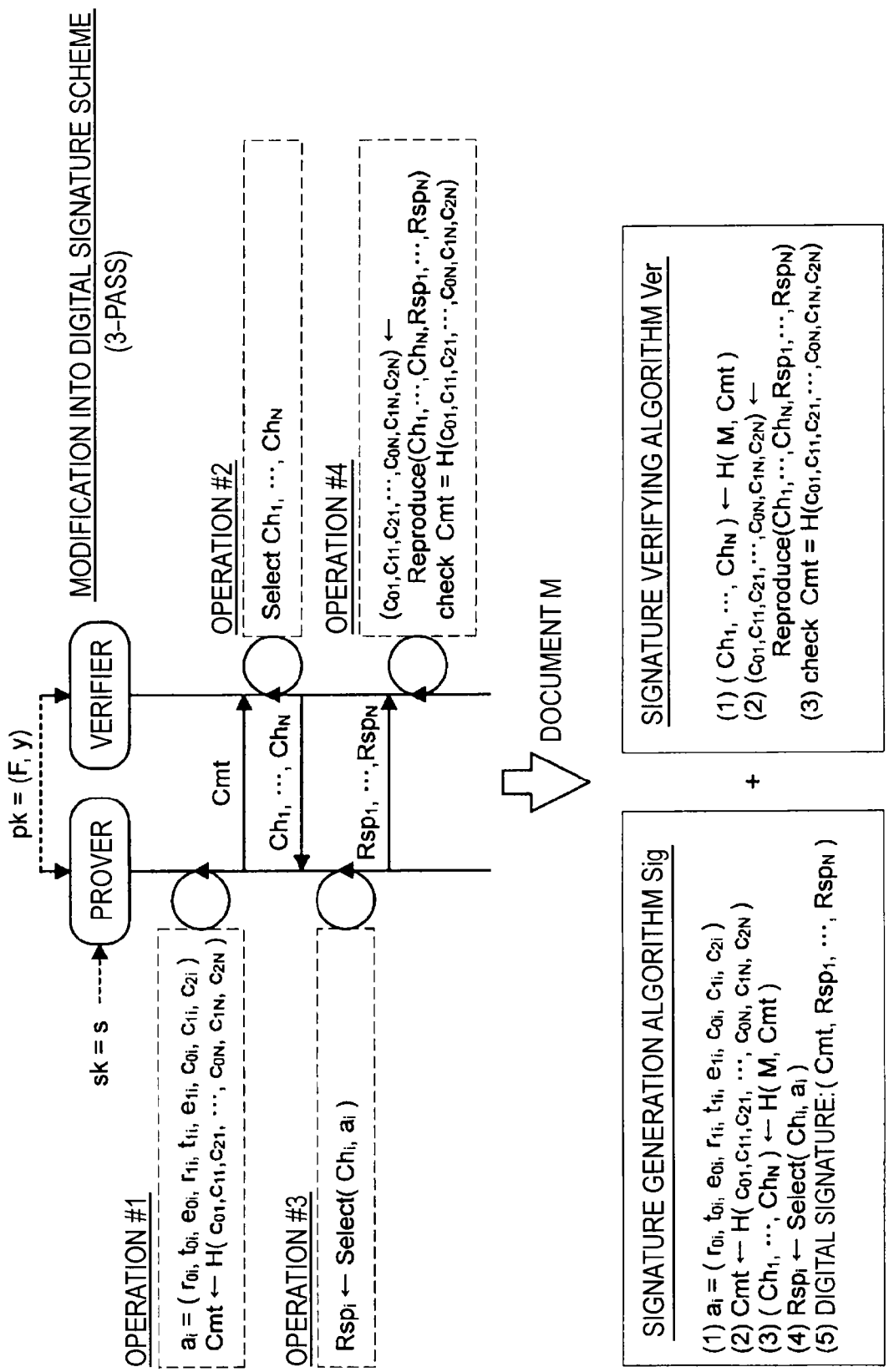
FIG. 8 is an explanatory diagram for describing a method of modifying an efficient algorithm related to the 3-pass public-key authentication scheme into an algorithm of a digital signature scheme.

As illustrated in FIG. 8, an efficient algorithm (for example, see FIG. 5) related to the 3-pass scheme is expressed with interactivity of three times and four operations, i.e., operation #1 to operation #4.

Operation #1 includes a process (1) of generating $a_i=(r_{0i}, t_{0i}, e_{0i}, r_{1i}, t_{1i}, e_{1i}, c_{0i}, c_{1i}, c_{2i})$ and a process (2) of calculating $Cmt \leftarrow H(c_{01}, c_{11}, c_{21}, \ldots, c_{0N}, c_{1N}, c_{2N})$. Cmt generated in operation #1 by the prover algorithm P is sent to the verifier algorithm V.

Operation #2 includes a process of selecting $Ch_1, \ldots, Ch_N$. $Ch_1, \ldots, Ch_N$ selected in operation #2 by the verifier algorithm V are sent to the prover algorithm P.

Operation #3 includes a process of generating $Rsp_1, \ldots, Rsp_N$ using $Ch_1, \ldots, Ch_N$ and $a_1, \ldots, a_N$. This process is expressed as $Rsp_i \leftarrow Select(Ch_i, a_i)$. $Rsp_i, \ldots, Rsp_N$ generated in operation #3 by the prover algorithm P are sent to the verifier algorithm V.

Operation #4 includes a process (1) of reproducing $c_{01}, c_{11}, c_{21}, \ldots, c_{0N}, c_{1N}, c_{2N}$ using $Ch_1, \ldots, Ch_N$ and $Rsp_1, \ldots, Rsp_N$ and a process (2) of verifying $Cmt=H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

The algorithm of the public-key authentication scheme expressed with the foregoing operation #1 to operation #4 is modified into a signature generation algorithm Sig and a signature verifying algorithm Ver illustrated in FIG. 8.

(Signature Generation Algorithm Sig)

First, the structure of the signature generation algorithm Sig will be described. The signature generation algorithm Sig includes the following processes (1) to (5).

Process (1): The signature generation algorithm Sig generates $a_i=(r_{0i}, t_{0i}, e_{0i}, r_{1i}, t_{1i}, e_{1i}, c_{0i}, c_{1i}, c_{2i})$.

Process (2): The signature generation algorithm Sig calculates $Cmt \leftarrow H(c_{01}, c_{11}, c_{21}, \ldots, c_{0N}, c_{1N}, c_{2N})$.

Process (3): The signature generation algorithm Sig calculates $(Ch_1, \ldots, Ch_N) \leftarrow H(M, Cmt)$. Here, M is a document to which a signature is attached.

Process (4): The signature generation algorithm Sig calculates $Rsp_i \leftarrow Select(Ch_i, a_i)$.

Process (5): The signature generation algorithm Sig sets $(Cmt, Rsp_1, \ldots, Rsp_N)$ as a signature.

(Signature Verifying Algorithm Ver)

Next, the structure of the signature verifying algorithm Ver will be described. The signature verifying algorithm Ver includes the following processes (1) to (3).

Process (1): The signature verifying algorithm Ver calculates $(Ch_1, \ldots, Ch_N) \leftarrow H(M, Cmt)$.

Process (2): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (3): The signature verifying algorithm Ver verifies $Cmt=H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

As described above, by matching the prover in the model of the public-key authentication scheme with the signer in the digital signature scheme, the algorithm of the public-key authentication scheme can be modified into the algorithm of the digital signature scheme.

4-2: Modification of 5-Pass Public-Key Authentication Scheme into Digital Signature Scheme (FIG. 9)

Next, a modification of the public-key authentication scheme related to the 5-pass into a digital signature scheme will be described.

Figure 9:
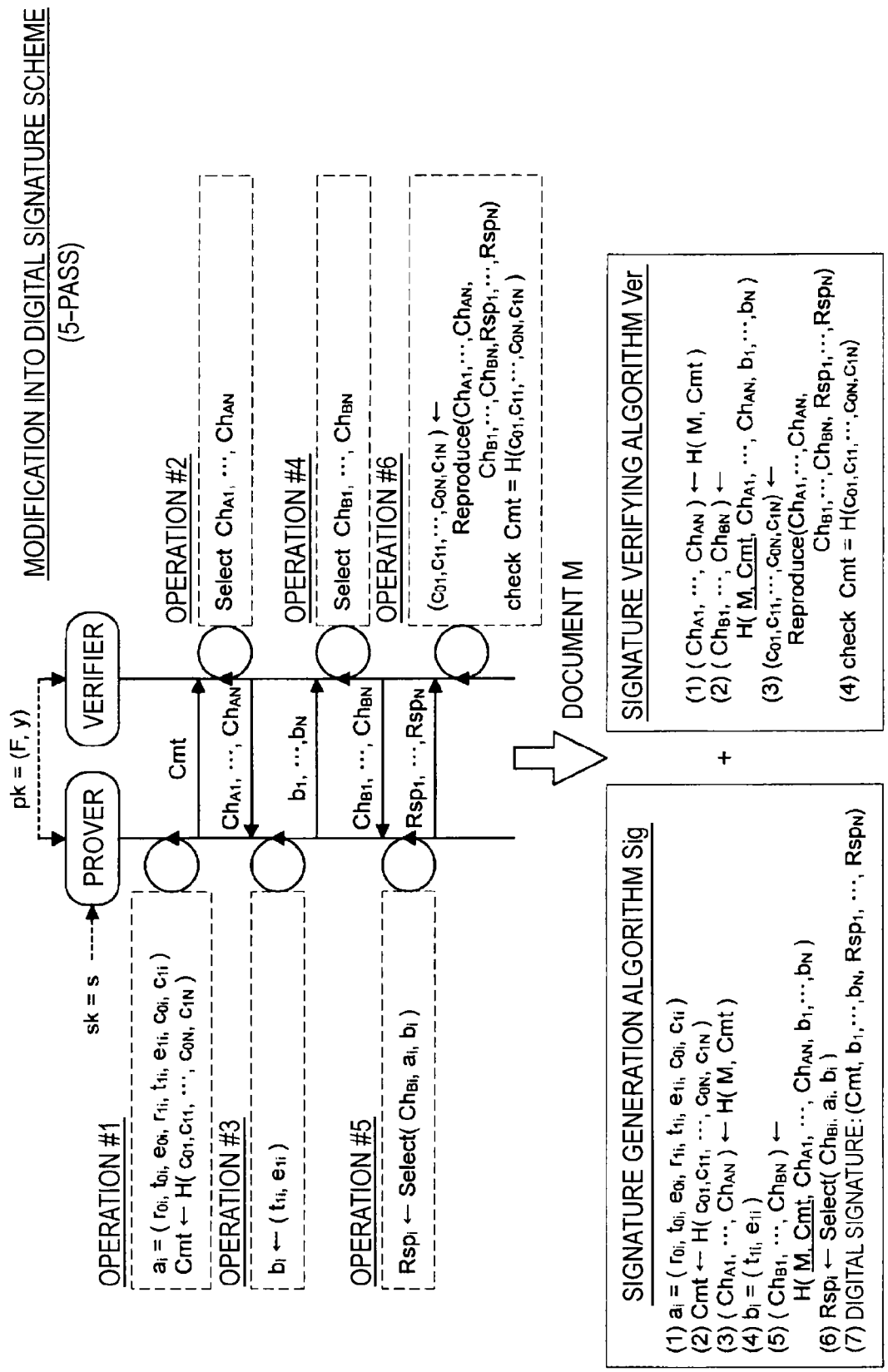
FIG. 9 is an explanatory diagram for describing a method of modifying an efficient algorithm related to the 5-pass public-key authentication scheme into an algorithm of the digital signature scheme.

As illustrated in FIG. 9, an efficient algorithm (for example, see FIG. 7) related to the 5-pass scheme is expressed with interactivity of five times and six operations, i.e., operation #1 to operation #6.

Operation #1 includes a process (1) of generating $a_i=(r_{0i}, t_{0i}, e_{0i}, r_{1i}, t_{1i}, e_{1i}, c_{0i}, c_{1i})$ for i=1 to N and a process (2) of calculating $Cmt \leftarrow H(c_{01}, c_{11}, \ldots, c_{0N}, c_{1N})$. Cmt generated in operation #1 by the prover algorithm P is sent to the verifier algorithm V.

Operation #2 includes a process of selecting $Ch_{A1}, \ldots, Ch_{AN}$. $Ch_{A1}, \ldots, Ch_{AN}$ selected in operation #2 by the verifier algorithm V are sent to the prover algorithm P.

Operation #3 includes a process of generating $b_i=(t_{1i}, e_{1i})$ for i=1 to N. Here, $b_1, \ldots, b_N$ generated in operation #3 by the prover algorithm P are sent to the verifier algorithm V.

Operation #4 includes a process of selecting $Ch_{B1}, \ldots, Ch_{BN}$. $Ch_{B1}, \ldots, Ch_{BN}$ selected in operation #4 by the verifier algorithm V are sent to the prover algorithm P.

Operation #5 includes a process of generating $Rsp_1, \ldots, Rsp_N$ using $Ch_{B1}, \ldots, Ch_{BN}, a_1, \ldots, a_N, b_1, \ldots, b_N$. This process is expressed as $Rsp_i \leftarrow \text{Select}(Ch_{Bi}, a_i, b_i)$. $Rsp_1, \ldots, Rsp_N$ generated in operation #5 by the prover algorithm P are sent to the verifier algorithm V.

Operation #6 includes a process (1) of reproducing $c_{01}, c_{11}, \ldots, c_{0N}, c_{1N}$ using $Ch_{A1}, \ldots, Ch_{AN}, Ch_{B1}, \ldots, Ch_{BN}, Rsp_1, \ldots, Rsp_N$ and a process (2) of verifying $Cmt=H(c_{01}, c_{11}, \ldots, c_{0N}, c_{1N})$ using the reproduced $c_{01}, c_{11}, \ldots, c_{0N}, c_{1N}$.

The algorithm of the public-key authentication scheme expressed with the foregoing operation #1 to operation #6 is modified into a signature generation algorithm Sig and a signature verifying algorithm Ver illustrated in FIG. 9.

(Signature Generation Algorithm Sig)

First, the structure of the signature generation algorithm Sig will be described. The signature generation algorithm Sig includes the following processes (1) to (7).

Process (1): The signature generation algorithm Sig generates $a_i=(r_{0i}, t_{0i}, e_{0i}, r_{1i}, t_{1i}, e_{1i}, c_{0i}, c_{1i})$.

Process (2): The signature generation algorithm Sig calculates $Cmt \leftarrow H(c_{01}, c_{11}, \ldots, c_{0N}, c_{1N})$.

Process (3): The signature generation algorithm Sig calculates $(Ch_{A1}, \ldots, Ch_{AN}) \leftarrow H(M, Cmt)$. Here, M is a document to which a signature is attached.

Process (4): The signature generation algorithm Sig generates $b_i=(t_{1i}, e_{1i})$ for i=1 to N.

Process (5): The signature generation algorithm Sig calculates $(Ch_{B1}, \ldots, Ch_{BN}) \leftarrow H(M, Cmt, Ch_{A1}, \ldots, Ch_{AN}, b_1, \ldots, b_N)$. Additionally, modification into $(Ch_{B1}, \ldots, Ch_{BN}) \leftarrow H(Ch_{A1}, \ldots, Ch_{AN}, b_1, \ldots, b_N)$ may be performed.

Process (6): The signature generation algorithm Sig calculates $Rsp_i \leftarrow \text{Select}(Ch_{Bi}, a_i, b_i)$.

Process (7): The signature generation algorithm Sig sets $(Cmt, b_1, \ldots, b_N, Rsp_1, \ldots, Rsp_N)$ as a digital signature.

(Signature Verifying Algorithm Ver)

Next, the structure of the signature verifying algorithm Ver will be described. The signature verifying algorithm Ver includes the following processes (1) to (4).

Process (1): The signature verifying algorithm Ver calculates $(Ch_{A1}, \ldots, Ch_{AN})=H(M, Cmt)$.

Process (2): The signature verifying algorithm Ver calculates $(Ch_{B1}, \ldots, Ch_{BN})=H(M, Cmt, Ch_{A1}, \ldots, Ch_{AN}, b_1, \ldots, b_N)$. When modification into $(Ch_{B1}, \ldots, Ch_{BN})=H(Ch_{A1}, \ldots, Ch_{AN}, b_1, \ldots, b_N)$ is performed in the process (5) performed by the signature verifying algorithm Ver, the signature verifying algorithm Ver calculates $(Ch_{B1}, \ldots, Ch_{BN})=H(Ch_{A1}, \ldots, Ch_{AN}, b_1, \ldots, b_N)$.

Process (3): The signature verifying algorithm Ver generates $c_{01}, c_{11}, \ldots, c_{0N}, c_{1N}$ using $Ch_{A1}, \ldots, Ch_{AN}, Ch_{B1}, \ldots, Ch_{BN}, Rsp_1, \ldots, Rsp_N$.

Process (4): The signature verifying algorithm Ver verifies $Cmt=H(c_{01}, c_{11}, \ldots, c_{0N}, c_{1N})$ using the reproduced $c_{01}, c_{11}, \ldots, c_{0N}, c_{1N}$.

As described above, by matching the prover in the model of the public-key authentication scheme with the signer in the digital signature scheme, the algorithm of the public-key authentication scheme can be modified into the algorithm of the digital signature scheme.

<5: Efficient Intermediate Variable Management Method>

Incidentally, it can be realized that the prover algorithm P stores many intermediate variables when algorithms of the above public-key authentication scheme and the above digital signature scheme are executed. For example, in the algorithm of the 3-pass scheme illustrated in FIG. 4, intermediate variables $r_0, t_0, e_0, r_1, t_1$, and $e_1$ generated in operation #1 are stored by the prover algorithm P and are reused in operation #3. Also, as in the parallelized algorithm illustrated in FIG. 5, when messages are collectively sent with the hash value Cmt in operation #1, the prover algorithm P has to store intermediate variables $r_{0i}, t_{0i}, e_{0i}, r_{1i}, t_{1i}, e_{1i}, c_{0i}, c_{1i}$, and $c_{2i}$ (where i=1 to N) to be reused in operation #3 as intermediate variables. For this reason, in order to execute algorithms of the above public-key authentication scheme and the digital signature scheme, a sufficient storage area is necessary.

Accordingly, the inventors of the present technology have devised a structure to reduce an amount of the intermediate variables to be stored by the prover algorithm P and execute the algorithms of the above public-key authentication scheme and the above digital signature scheme in a small storage area. Hereinafter, this structure (hereinafter referred to as a memory reduction method) will be described.

Figure 11:
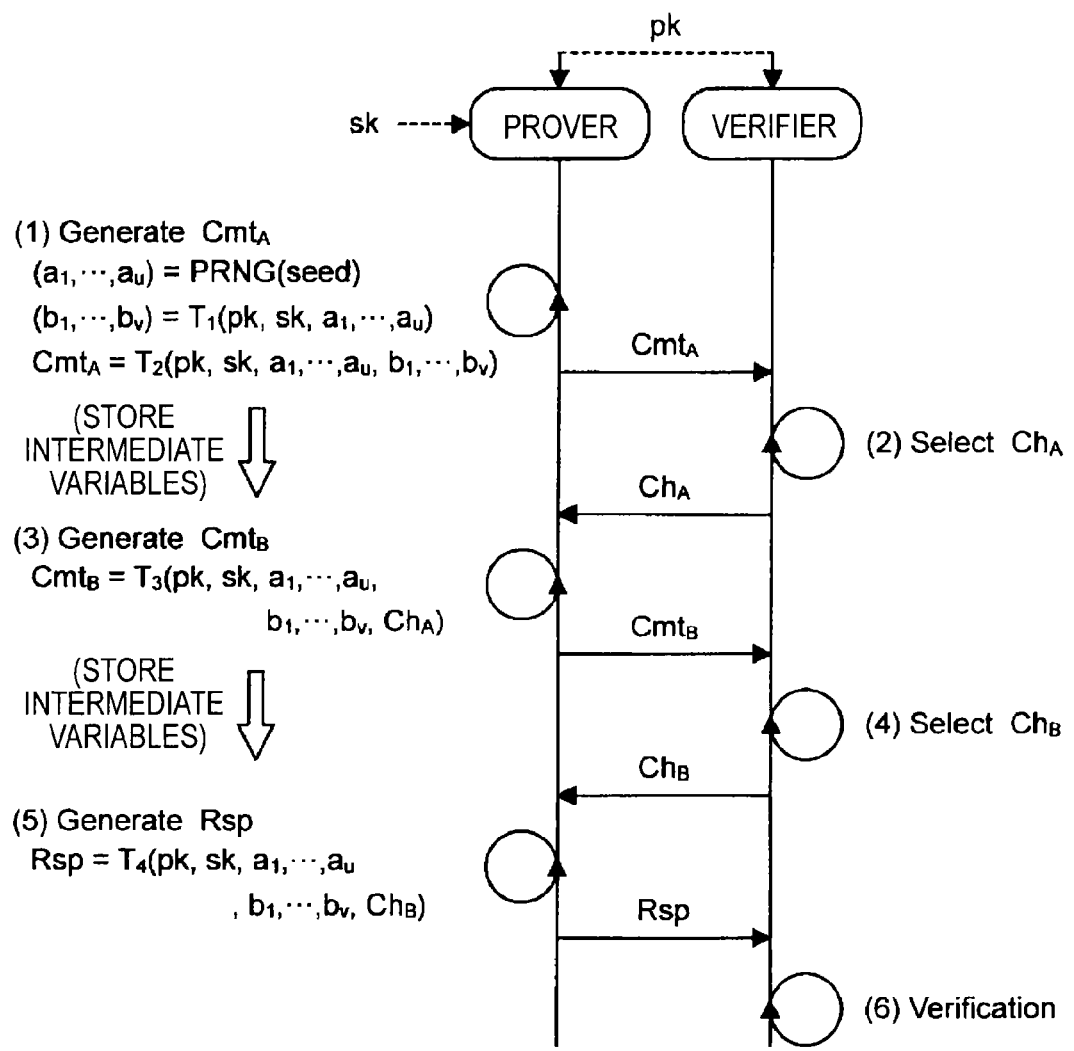
FIG. 11 is an explanatory diagram for describing an intermediate variable management method related to the 5-pass scheme.

5-1: Overview (FIGS. 10 and 11)

First, an overview of the memory reduction method according to the present embodiment will be described with reference to FIGS. 10 and 11. FIG. 10 is a diagram simply illustrating an algorithm of the 3-pass scheme. On the other hand, FIG. 11 is a diagram simply illustrating an algorithm of the 5-pass scheme.

In the case of the 3-pass scheme, as illustrated in FIG. 10, (1) Cmt is first generated by the prover algorithm P and is sent to the verifier algorithm V. (2) Subsequently, Ch is selected by the verifier algorithm V and is sent to the prover algorithm P. (3) Subsequently, Rsp is generated by the prover algorithm P and is sent to the verifier algorithm V. (4) Subsequently, verification is executed based on Cmt and Rsp by the verifier algorithm V.

In FIG. 10, $(a_1, \ldots, a_u)$ are intermediate variables generated by a pseudo-random number generator. On the other hand, $(b_1, \ldots, b_v)$ are intermediate variables generated based on random number components $(a_1, \ldots, a_u)$. $T_1$ is a function of generating $(b_1, \ldots, b_v)$. $T_2$ is a function of generating Cmt. $T_3$ is a function of generating Rsp. In this way, the intermediate variables generated during the generation of Cmt are used during generation of Rsp. For this reason, the prover algorithm P has to store the intermediate variables even after sending Cmt to the verifier algorithm V.

In the case of the 5-pass scheme, as illustrated in FIG. 11, (1) $Cmt_A$ is first generated by the verifier algorithm V and is sent to the verifier algorithm V. (2) Subsequently, $Ch_A$ is selected by the verifier algorithm V and is sent to the prover algorithm P. (3) Subsequently, $Cmt_B$ is generated by the verifier algorithm V and is sent to the verifier algorithm V. (4) Subsequently, $Ch_B$ is selected by the verifier algorithm V and is sent to the prover algorithm P. (5) Subsequently, Rsp is generated by the prover algorithm P and is sent to the verifier algorithm V. (6) Subsequently, verification is executed based on Cmt and Rsp by the verifier algorithm V.

In FIG. 11, $(a_1, \ldots, a_u)$ are intermediate variables generated by a pseudo-random number generator. On the other hand, $(b_1, b_v)$ are intermediate variables generated based on random number components $(a_1, \ldots, a_u)$. $T_1$ is a function of generating $(b_1, \ldots, b_v)$. $T_2$ is a function of generating $Cmt_A$. $T_3$ is a function of generating $Cmt_B$. $T_4$ is a function of generating Rsp. In this way, the intermediate variables generated during the generation of $Cmt_A$ and $Cmt_B$ are used during generation of Rsp. For this reason, the prover algorithm P has to store the intermediate variables even after sending $Cmt_A$ to the verifier algorithm V.

However, as a result of careful analysis of the algorithm structures illustrated in FIGS. 10 and 11, it has been proved that an algorithm can be modified so as to temporarily destroy the intermediate variables by storing the value of a seed input to a pseudo-random number generator. However, in order to temporarily destroy the intermediate variables, it is necessary to contrive a generation sequence of the hash value Cmt. Hereinafter, the contrivance realized without storing many intermediate variables at one time will be described in detail with reference to specific examples. Also, this contrivance is applicable to any of the 3-pass scheme, the 5-pass scheme, and the digital signature scheme.

5-2: Application Example #1

Figure 12:
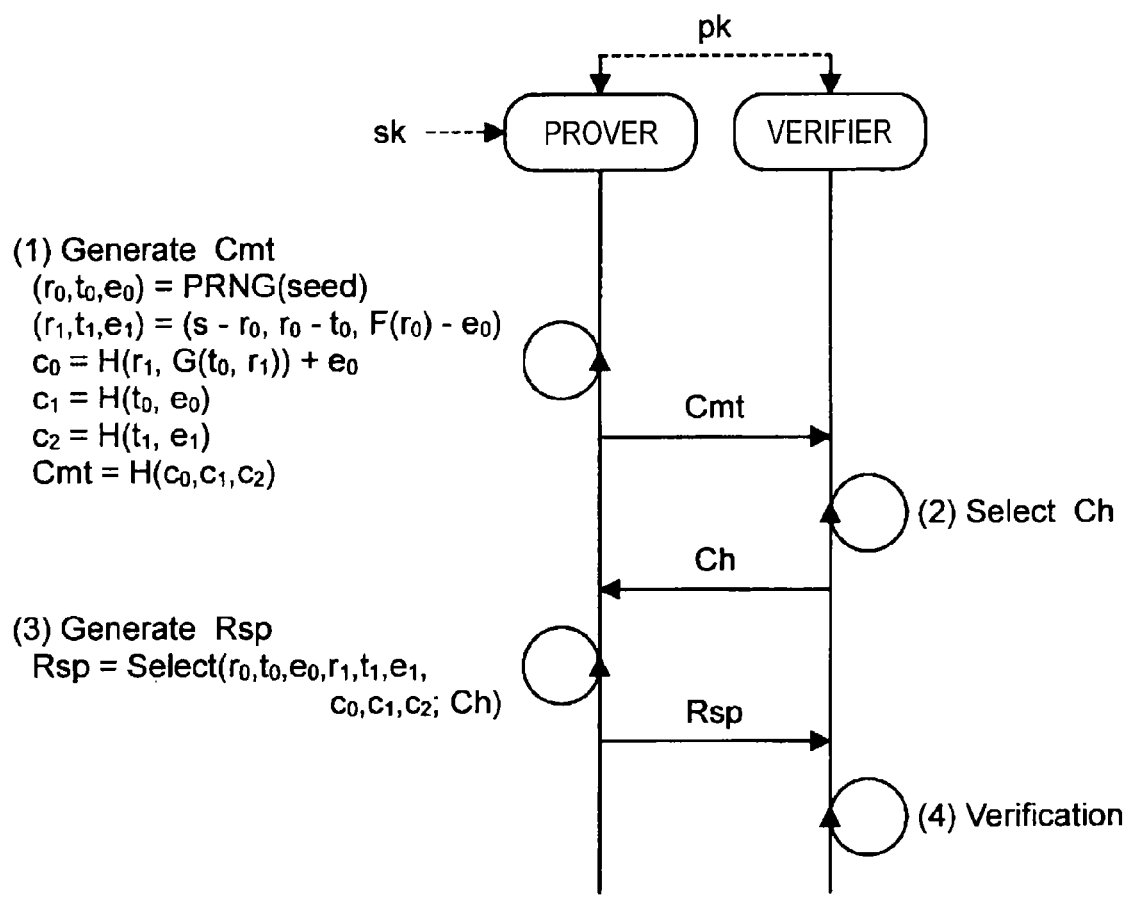
FIG. 12 is an explanatory diagram for describing a method of applying the intermediate variable management method according to an embodiment to the basic structure of the 3-pass scheme.
Figure 13:
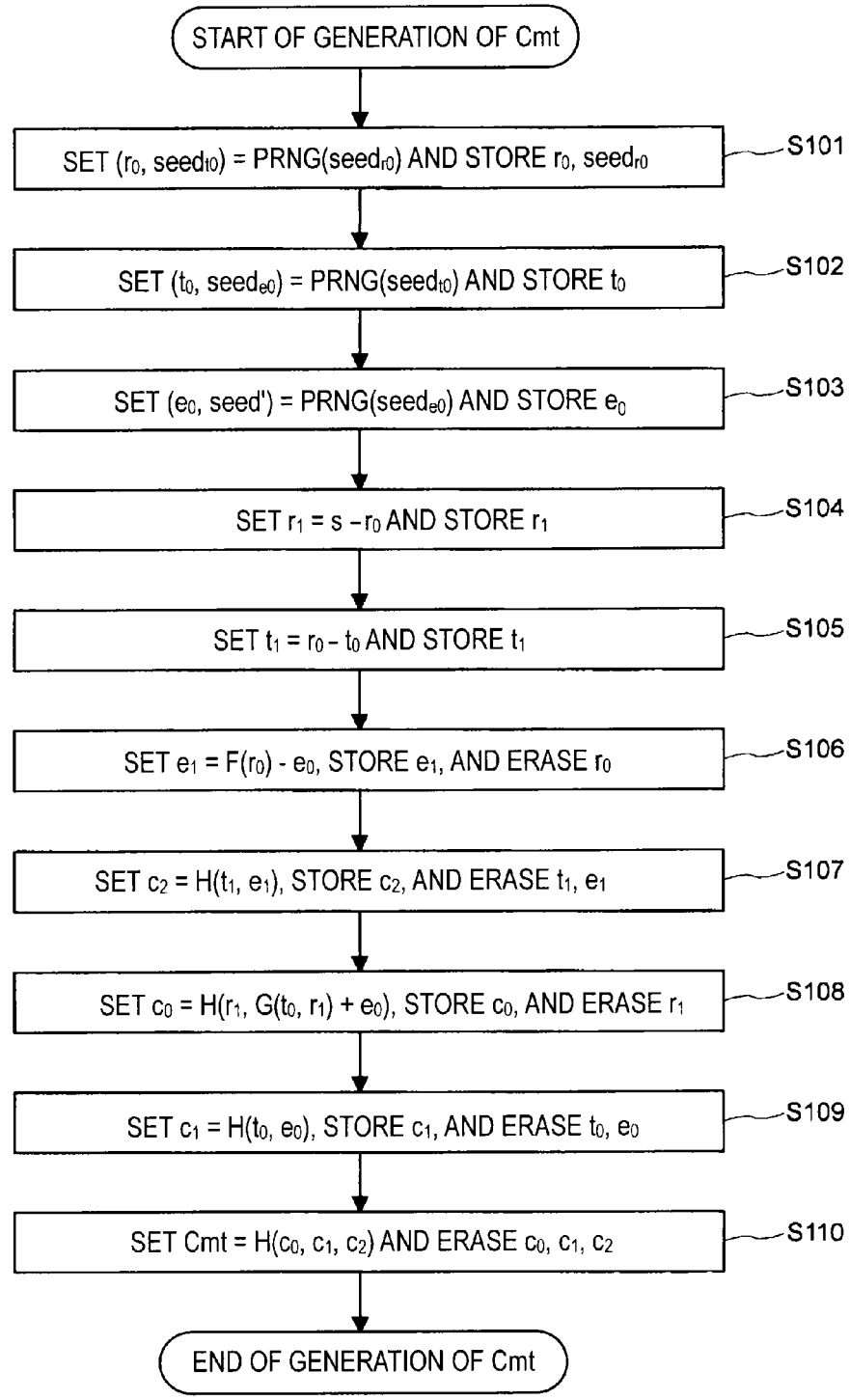
FIG. 13 is an explanatory diagram for describing a method of applying the intermediate variable management method according to an embodiment to the basic structure of the 3-pass scheme.
Figure 14:
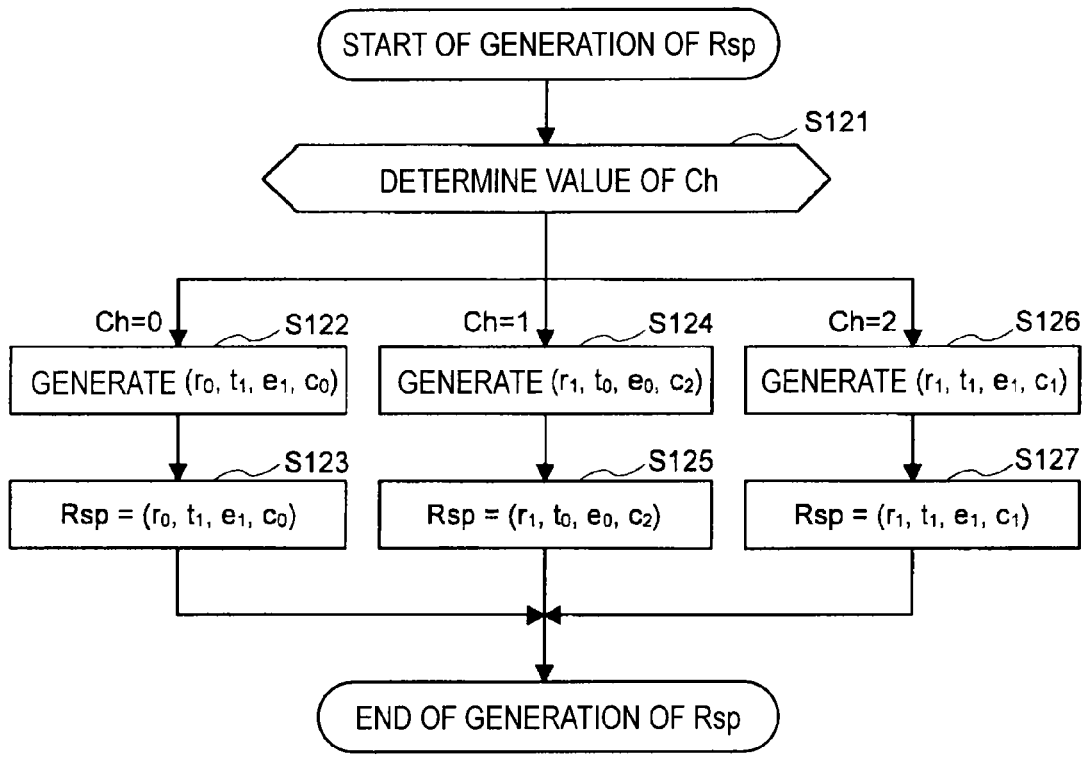
FIG. 14 is an explanatory diagram for describing a method of applying the intermediate variable management method according to an embodiment to the basic structure of the 3-pass scheme.

Application to Basic Structure of 3-Pass Scheme (FIGS. 12 to 14)

First, an algorithm structure in the case in which the memory reduction method according to the present embodiment is applied to the basic structure (see FIG. 4) of the 3-pass scheme will be described with reference to FIGS. 12 to 14.

(Overall Structure)

For example, the basic structure of the 3-pass scheme can be expressed as in FIG. 12. As illustrated in FIG. 12, (1) the prover algorithm P first generates the hash value Cmt based on messages $c_0$, $e_i$, and $c_2$. When the prover algorithm P generates the hash value Cmt, the prover algorithm P generates $(r_0, t_0, e_0)$=PRNG(seed) using a pseudo-random number generator PRNG. Subsequently, the prover algorithm P calculates $(r_1, t_1, e_1) = (s-r_0, r_0-t_0, F(r_0)-e_0)$. Subsequently, the prover algorithm P calculates $c_0 = H(r_1, G(t_0, r_1)+e_0)$, $c_1 = H(t_0, e_0)$, and $c_2 = H(t_1, e_1)$. Subsequently, the prover algorithm P calculates $Cmt = H(c_0, c_1, c_2)$.

The hash value Cmt generated by the prover algorithm P is sent to the verifier algorithm V. (2) Upon receiving the hash value Cmt, the verifier algorithm V selects a challenge Ch. Then, the challenge Ch selected by the verifier algorithm V is sent to the prover algorithm P.

(3) Upon receiving the challenge Ch, the prover algorithm P generates the response Rsp. When the prover algorithm P generates Rsp, the prover algorithm P selects a necessary combination from among $(r_0, t_0, e_0, r_1, t_1, e_1, c_0, c_1, c_2)$ according to the challenge Ch and sets the response Rsp. Then, the response Rsp generated by the prover algorithm P is sent to the verifier algorithm V. (4) Upon receiving the response Rsp, the verifier algorithm V executes verification based on the hash value Cmt, the challenge Ch, and the response Rsp.

Here, a method of generating the hash value Cmt such that the immediate variables $r_0, t_0, e_0, r_1, t_1, e_1, c_0, c_1$, and $c_2$ after the generation of the hash value Cmt can be temporarily destroyed in the above-described basic structure of the 3-pass scheme will be described. Also, a method of generating the response Rsp in the case where the method of generating the hash value Cmt to be described here is applied will also be described.

(Method of Generating Hash Value Cmt)

First, FIG. 13 is referred to. As illustrated in FIG. 13, when the prover algorithm P starts generating the hash value Cmt, the prover algorithm P first calculates $(r_0, seed_{r0})$=PRNG(seed$_{r0}$), and stores $r_0$ and seed$_{r0}$ thereafter (S101). Subsequently, the prover algorithm P calculates $(t_0, seed_{e0})$=PRNG(seed$_{t0}$), and stores $t_0$ thereafter (S102). Subsequently, the prover algorithm P calculates $(e_0, seed')$=PRNG(seed$_{e0}$), and stores $e_0$ thereafter (S103).

Subsequently, the prover algorithm P calculates $r_1 = s - r_0$, and stores $r_1$ thereafter (S104). Subsequently, the prover algorithm P calculates $t_1 = r_0 - t_0$, and stores $t_1$ thereafter (S105). Subsequently, the prover algorithm P calculates $e_1 = F(r_0) - e_0$, stores $e_1$ thereafter, and erases $r_0$ (S106). Subsequently, the prover algorithm P calculates $c_2 = H(t_1, e_1)$, stores $c_2$ thereafter, and erases $t_1$ and $e_1$ (S107). Subsequently, the prover algorithm P calculates $c_0 = H(r_1, G(t_0, r_1)+e_0)$, stores $c_0$ thereafter, and erases $r_1$ (S108).

Subsequently, the prover algorithm P calculates $c_1 = H(t_0, e_0)$, stores $c_1$ thereafter, and erases $t_0$ and $e_0$ (S109). Subsequently, the prover algorithm P calculates the hash value $Cmt = H(c_0, c_1, c_2)$ and erases $c_0, c_1$, and $c_2$ thereafter (S110). After completing the process of step S110, the prover algorithm P ends the series of processes related to the generation of the hash value Cmt. Also, at this time, the prover algorithm P does not store the intermediate variables $(r_0, t_0, e_0, r_1, t_1, e_1, c_0, c_1, c_2)$.

(Method of Generating Response Rsp)

Next, FIG. 14 will be referred to. As illustrated in FIG. 14, the prover algorithm P determines the value of a challenge Ch (S121). In the case where Ch=0, the prover algorithm P allows the process to proceed to step S122. In the case where Ch=1, the prover algorithm P allows the process to proceed to step S124. In the case where Ch=2, the prover algorithm P allows the process to proceed to step S126.

When the process proceeds to step S122, the prover algorithm P generates $(r_0, t_1, e_1, c_0)$ (S122). At this time, the prover algorithm P executes necessary steps in the algorithm illustrated in FIG. 13 to generate $(r_0, t_1, e_1, c_0)$. Subsequently, the prover algorithm P sets the response Rsp=$(r_0, t_1, e_1, c_0)$ (S123) and ends the series of processes related to the generation of the response Rsp.

When the process proceeds to step S124, the prover algorithm P generates $(r_1, t_0, e_0, c_2)$ (S124). At this time, the prover algorithm P executes necessary steps in the algorithm illustrated in FIG. 13 to generate $(r_1, t_0, e_0, c_2)$. Subsequently, the prover algorithm P sets the response Rsp=$(r_1, t_0, e_0, c_2)$ (S125) and ends the series of processes related to the generation of the response Rsp.

When the process proceeds to step S126, the prover algorithm P generates $r_1, t_1, e_1, c_1)$ (S126). At this time, the prover algorithm P executes necessary steps in the algorithm illustrated in FIG. 13 to generate $(r_1, t_1, e_1, c_1)$. Subsequently, the prover algorithm P sets the response $Rsp=(r_1, t_1, e_1, c_1)$ (S127) and ends the series of processes related to the generation of the response Rsp.

The algorithm structures in the case where the memory reduction method according to the present embodiment is applied to the basic structure of the 3-pass scheme have been described above. By applying the above memory reduction method, it is possible to realize the public-key authentication scheme of the 3-pass scheme in a small storage area.

5-3: Application Example #2

Figure 15:
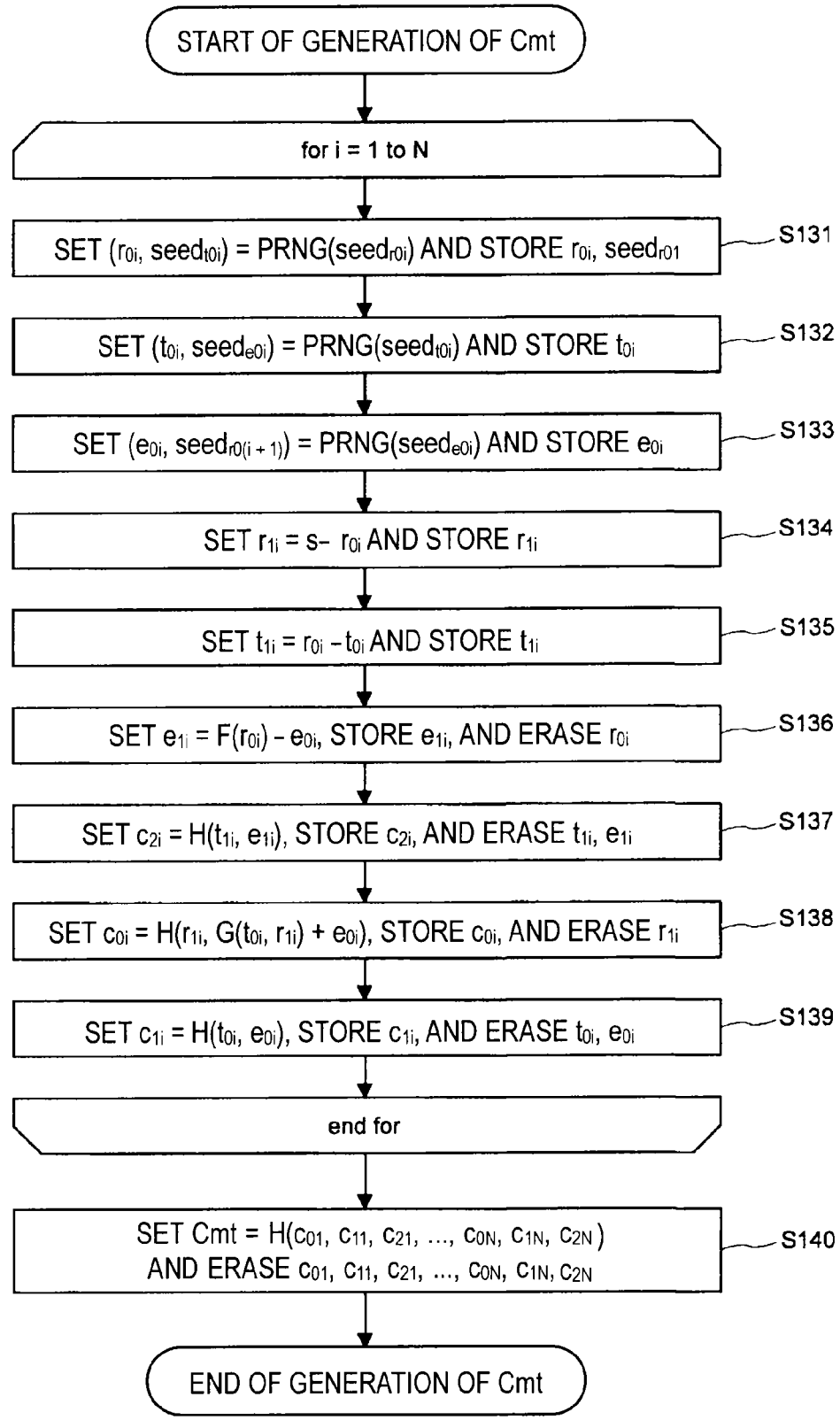
FIG. 15 is an explanatory diagram for describing a method of applying the intermediate variable management method according to the embodiment to a parallelized structure of the 3-pass scheme.
Figure 16:
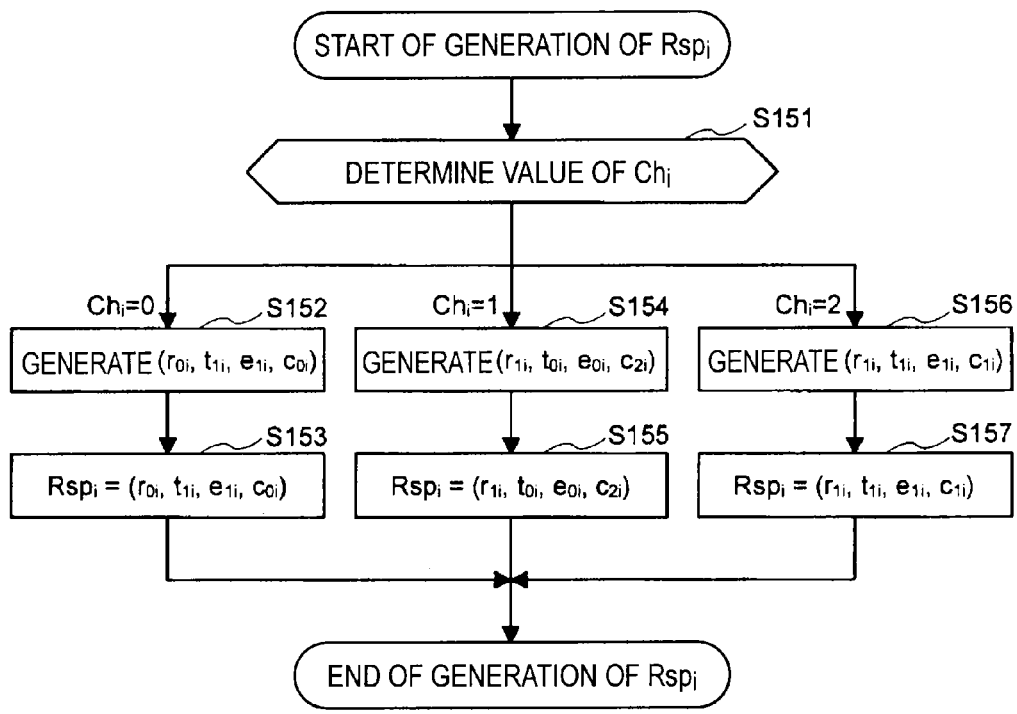
FIG. 16 is an explanatory diagram for describing a method of applying the intermediate variable management method according to the embodiment to a parallelized structure of the 3-pass scheme.

Application to Parallelized Structure of 3-Pass Scheme (FIGS. 15 and 16)

Next, an algorithm structure in the case where the memory reduction method according to the present embodiment is applied to the parallelized structure (see FIG. 5) of the 3-pass will be described with reference to FIGS. 15 and 16. Here, an algorithm structure in the case where the memory reduction method according to the present embodiment is applied to the parallelized algorithm of the 3-pass scheme illustrated in FIG. 5 will be considered.

(Method of Generating Hash Value Cmt)

First, FIG. 15 will be referred to. As illustrated in FIG. 15, the prover algorithm P starts generating the hash value Cmt and repeatedly performs processes of steps S131 to S139 for i=1 to N. In step S131, the prover algorithm P calculates $(r_{0i}, seed_{r0i})=PRNG(seed_{r0i})$ and stores $r_{0i}$ thereafter (S131). Here, the prover algorithm P stores $seed_{r01}$ when i=1.

Subsequently, the prover algorithm P calculates $(t_{0i}, seed_{e0i})=PRNG(seed_{r0i})$ and stores $t_{0i}$ thereafter (S132). Subsequently, the prover algorithm P calculates $(e_{0i}, seed_{r0(i+1)})=PRNG(seed_{e0i})$ and stores $e_{0i}$ thereafter (S133). Subsequently, the prover algorithm P calculates $r_{1i}=s-r_0$, and stores thereafter (S134). Subsequently, the prover algorithm P calculates $t_{1i}=r_{0i}-t_{0i}$ and stores $t_{1i}$ thereafter (S135). Subsequently, the prover algorithm P calculates $e_{1i}=F(r_{0i})-e_{0i}$, stores $e_{1i}$ thereafter, and erases $r_0$, (S136).

Subsequently, the prover algorithm P calculates $c_{2i}=H(t_{1i}, e_{1i})$, stores $c_{2i}$ thereafter, and erases $t_{1i}$ and $e_{1i}$ (S137). Subsequently, the prover algorithm P calculates $c_{0i}=H(r_{1i}, G(t_{0i}, r_{1i}))+e_{0i}$, stores $c_{0i}$ thereafter, and erases $r_{1i}$ (S138). Subsequently, the prover algorithm P calculates $c_{1i}=H(t_{0i}, e_{0i})$, stores $c_{1i}$ thereafter, and erases $t_{0i}$ and $e_{0i}$ (S139).

After executing the processes of steps S131 to S139 for i=1 to N, the prover algorithm P calculates the hash value Cmt=H $(c_{01}, c_{11}, c_{21}, \ldots, c_{0N}, c_{1N}, c_{2N})$ and erases $c_{01}, c_{11}, c_{21}, \ldots, c_{0N}, c_{1N}, c_{2N}$ thereafter (S140). After completing the process of step S140, the prover algorithm P ends the series of processes related to the generation of the hash value Cmt. Also, at this time, the prover algorithm P does not store the intermediate variables $(r_{0i}, t_{0i}, e_{0i}, r_{1i}, T_{1i}, e_{1i}, c_{0i}, c_{1i}, c_{2i})$ (where i=1 to N).

(Method of Generating Response $Rsp_i$)

Next, FIG. 16 will be referred to. A process of generating the response $Rsp_i$ is similarly executed for i=1 to N. As illustrated in FIG. 16, the prover algorithm P determines the value of a challenge Ch, (S151). In the case where $Ch_i=0$, the prover algorithm P allows the process to proceed to step S152. In the case where $Ch_i=1$, the prover algorithm P allows the process to proceed to step S154. In the case where $Ch_i=2$, the prover algorithm P allows the process to proceed to step S156.

When the process proceeds to step S152, the prover algorithm P generates $(r_{0i}, t_{1i}, e_{1i}, c_{0i})$ (S152). At this time, the prover algorithm P executes necessary steps in the algorithm illustrated in FIG. 15 to generate $(r_{0i}, t_{1i}, e_{1i}, c_{0i})$. Subsequently, the prover algorithm P sets the response $Rsp_i=(r_{0i}, t_{1i}, e_{1i}, c_{0i})$ (S153) and ends the series of processes related to the generation of the response $Rsp_i$.

When the process proceeds to step S154, the prover algorithm P generates $(r_{1i}, t_{0i}, e_{0i}, c_{2i})$ (S154). At this time, the prover algorithm P executes necessary steps in the algorithm illustrated in FIG. 15 to generate $(r_{1i}, t_{0i}, e_{0i}, c_{2i})$. Subsequently, the prover algorithm P sets the response $Rsp_i=(r_{1i}, t_{0i}, e_{0i}, c_{2i})$ (S155) and ends the series of processes related to the generation of the response $Rsp_i$.

When the process proceeds to step S156, the prover algorithm P generates $(r_{1i}, t_{1i}, e_{1i}, c_{1i})$ (S156). At this time, the prover algorithm P executes necessary steps in the algorithm illustrated in FIG. 15 to generate $(r_{1i}, t_{1i}, e_{1i}, c_{1i})$. Subsequently, the prover algorithm P sets the response $Rsp_i=(r_{1i}, t_{1i}, e_{1i}, c_{1i})$ (S157) and ends the series of processes related to the generation of the response $Rsp_i$.

The algorithm structures in the case where the memory reduction method according to the present embodiment is applied to the parallelized structure of the 3-pass scheme have been described above. By applying the above memory reduction method, it is possible to realize the parallelized public-key authentication scheme of the 3-pass scheme in a small storage area.

(Advantageous Effects of Memory Reduction)

In the case where (q, n, m, N)=(2, 80, 80, 140) is set and $c_i$ can be expressed with 160 bits, a storage area of 134400 bits is necessary when the above memory reduction method is not applied. However, when the above memory reduction method is applied and c, and a seed can be expressed with 160 bits, a storage area necessary for executing an algorithm can be reduced to 68000 bits. That is, by applying the above memory reduction method, the size of a necessary storage area is reduced to a size equal to or less than half.

5-4: Application Example #3

Application to Basic Structure of 5-Pass Scheme (FIGS. 17 to 20)

Next, an algorithm structure in the case where the memory reduction method according to the present embodiment is applied to the basic structure (see FIG. 6) of the 5-pass scheme will be described with reference to FIGS. 17 to 20.

(Overall Structure)

Figure 17:
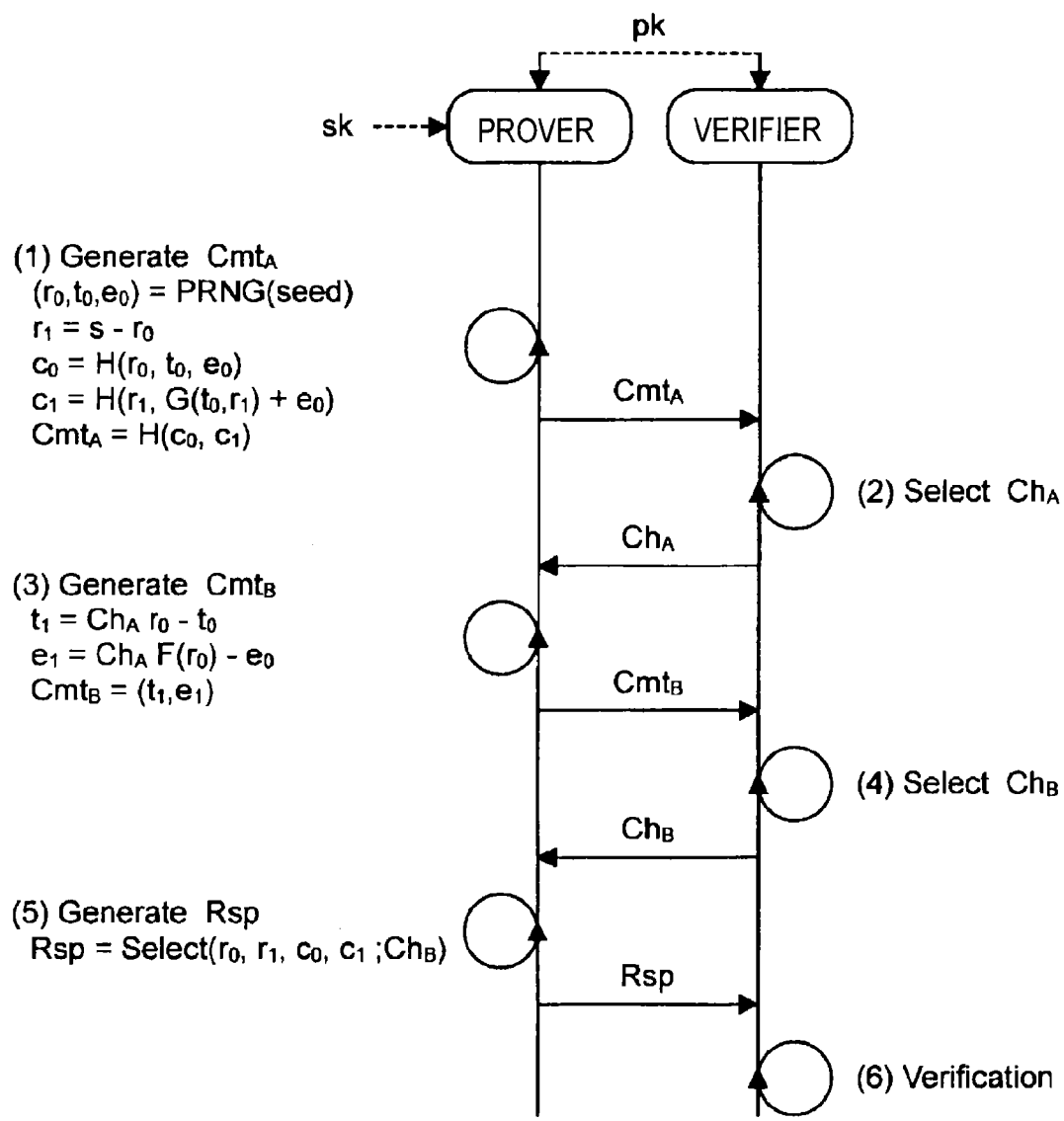
FIG. 17 is an explanatory diagram for describing a method of applying the intermediate variable management method according to an embodiment to the basic structure of the 5-pass scheme.

For example, the basic structure of the 5-pass scheme can be expressed as in FIG. 17. As illustrated in FIG. 17, (1) the prover algorithm P first generates the hash value $Cmt_A$ based on messages $c_0$ and $c_1$. When the prover algorithm P generates the hash value $Cmt_A$, the prover algorithm P generates $(r_0, t_0, e_0)=PRNG(seed)$ using a pseudo-random number generator PRNG. Subsequently, the prover algorithm P calculates $r_1=s-r_0$. Subsequently, the prover algorithm P calculates $c_0=H(r_1, t_0, e_0)$, $c_1=G(t_0, r_1)+e_0$). Subsequently, the prover algorithm P calculates $Cmt_A=H(c_0, c_1)$.

The hash value $Cmt_A$ generated by the prover algorithm P is sent to the verifier algorithm V. (2) Upon receiving the hash value $Cmt_A$, the verifier algorithm V selects a challenge $Ch_A$. Then, the challenge $Ch_A$ selected by the verifier algorithm V is sent to the prover algorithm P.

(3) Upon receiving the challenge $Ch_A$, the prover algorithm P generates a commitment value $Cmt_B$ including a challenge $Ch_A$, and intermediate variables $t_1$, $e_1$. When the prover algorithm P generates the commitment value $Cmt_B$, the prover algorithm P calculates $t1=Ch_A*r_0-t_0$, $e_1=Ch_A*F(r_0)-e_0$. Subsequently, the prover algorithm P sets $Cmt_B=(t_1, e_1)$.

The commitment value $Cmt_B$ generated by the prover algorithm P is sent to the verifier algorithm V. (4) Upon receiving the commitment value $Cmt_B$, the verifier algorithm V selects a challenge $Ch_B$. Then, the challenge $Ch_B$ selected by the verifier algorithm V is sent to the prover algorithm P.

(5) Upon receiving the challenge $Ch_B$, the prover algorithm P generates the response Rsp. When the prover algorithm P generates Rsp, the prover algorithm P selects a necessary combination from among $(r_0, r_1, c_0, c_1)$ according to the challenge $Ch_B$ and sets the response Rsp. Then, the response Rsp generated by the prover algorithm P is sent to the verifier algorithm V. (6) Upon receiving the response Rsp, the verifier algorithm V executes verification based on the hash value $Cmt_A$, the challenge $Ch_A$, the commitment value $Cmt_B$, the challenge $Ch_B$, and the response Rsp.

Here, a method of generating the hash value $Cmt_A$ such that the immediate variables $r_0, t_0, e_0, r_1, c_0,$ and $c_1$ after the generation of the hash value $Cmt_A$ can be temporarily destroyed in the above-described basic structure of the 5-pass scheme will be described. A method of generating the commitment value $Cmt_B$ such that the immediate variables $r_0, t_0,$ and $e_0$ after the generation of the commitment value $Cmt_B$ can be temporarily destroyed will be described. Also, a method of generating the response Rsp in the case where the method of generating the hash value $Cmt_A$ and the commitment value $Cmt_B$ to be described here is applied will also be described.

(Method of Generating Hash Value $Cmt_A$)

Figure 18:
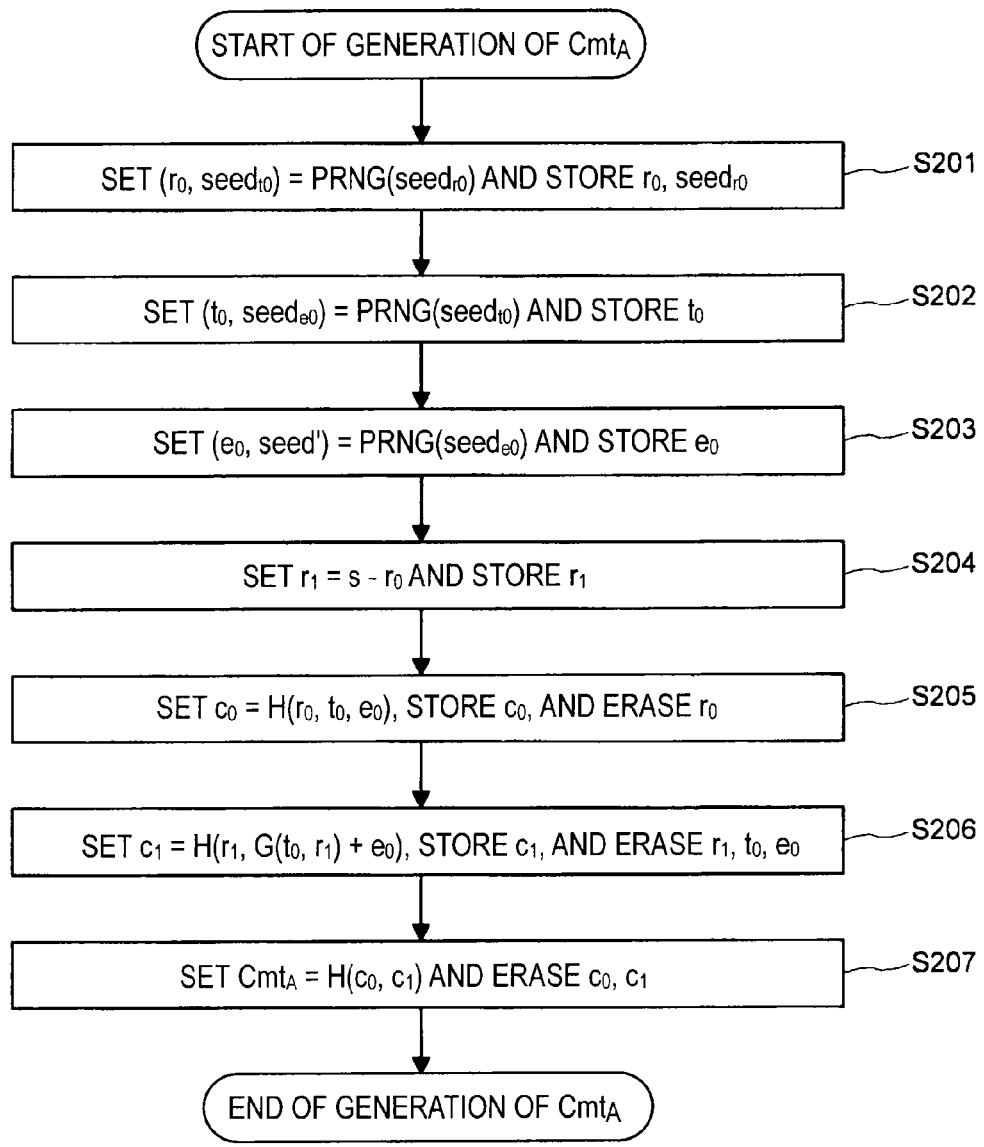
FIG. 18 is an explanatory diagram for describing a method of applying the intermediate variable management method according to an embodiment to the basic structure of the 5-pass scheme.

First, FIG. 18 will be referred to. As illustrated in FIG. 18, when the prover algorithm P starts generating the hash value $Cmt_A$, the prover algorithm P first calculates $(r_0, seed_{r0})$=PRNG($seed_{r0}$), and stores $r_0$ and $seed_{r0}$ thereafter (S201). Subsequently, the prover algorithm P calculates $(t_0, seed_{e0})$=PRNG($seed_{r0}$), and stores $t_0$ thereafter (S202). Subsequently, the prover algorithm P calculates $(e_0, seed')$=PRNG($seed_{e0}$), and stores $e_0$ thereafter (S203).

Subsequently, the prover algorithm P calculates $r_1=s-r_0$, and stores $r_1$ thereafter (S204). Subsequently, the prover algorithm P calculates $c_0=H(r_0, t_0, e_0)$, stores $c_0$ thereafter, and erases $r_0$ (S205). Subsequently, the prover algorithm P calculates $c_1=H(r_1, G(t_0, r_1)+e_0)$, stores $c_1$ thereafter, and erases $r_1, t_0, e_0$ (S206).

Subsequently, the prover algorithm P calculates the hash value $Cmt_A=H(c_0, c_1)$ and erases $c_0$ and $c_1$ thereafter (S207). After completing the process of step S207, the prover algorithm P ends the series of processes related to the generation of the hash value $Cmt_A$. Also, at this time, the prover algorithm P does not store the intermediate variables $(r_0, t_0, e_0, r_1, c_0, c_1)$.

(Method of Generating Hash Value $Cmt_B$)

Figure 19:
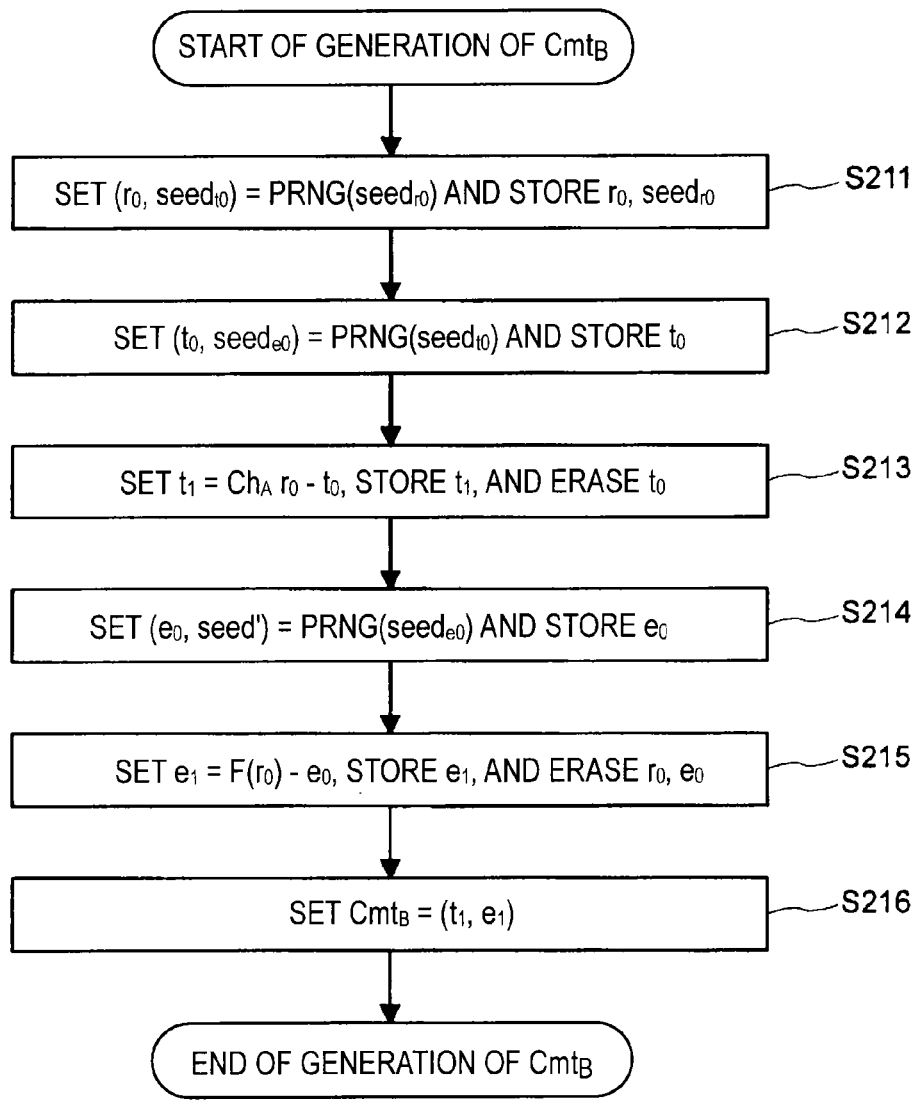
FIG. 19 is an explanatory diagram for describing a method of applying the intermediate variable management method according to an embodiment to the basic structure of the 5-pass scheme.

First, FIG. 19 will be referred to. As illustrated in FIG. 19, when the prover algorithm P starts generating the commitment value $Cmt_B$, the prover algorithm P first calculates $(r_0, seed_{r0})$=PRNG($seed_{r0}$), and stores $r_0$ and $seed_{r0}$ thereafter (S211). Subsequently, the prover algorithm P calculates $(t_0, seed_{e0})$=PRNG($seed_{r0}$), and stores $t_0$ thereafter (S212).

Subsequently, the prover algorithm P calculates $t_1=Ch_A*r_0-t_0$, stores $t_1$ thereafter, and erases $t_0$ (S213). Subsequently, the prover algorithm P calculates $(e_0, seed')$=PRNG($seede_0$) and stores $e_0$ thereafter (S214). Subsequently, the prover algorithm P calculates $e_1=F(r_0)-e_0$, stores $e_1$ thereafter, and erases $r_0, e_0$ (S215).

Subsequently, the prover algorithm P sets the commitment value $Cmt_B=(t_1, e_1)$ (S216). After completing the process of step S216, the prover algorithm P ends the series of processes related to the generation of the commitment value $Cmt_B$. Also, at this time, the prover algorithm P does not store the intermediate variables $(r_0, t_0, e_0)$.

(Method of Generating Response Rsp)

Figure 20:
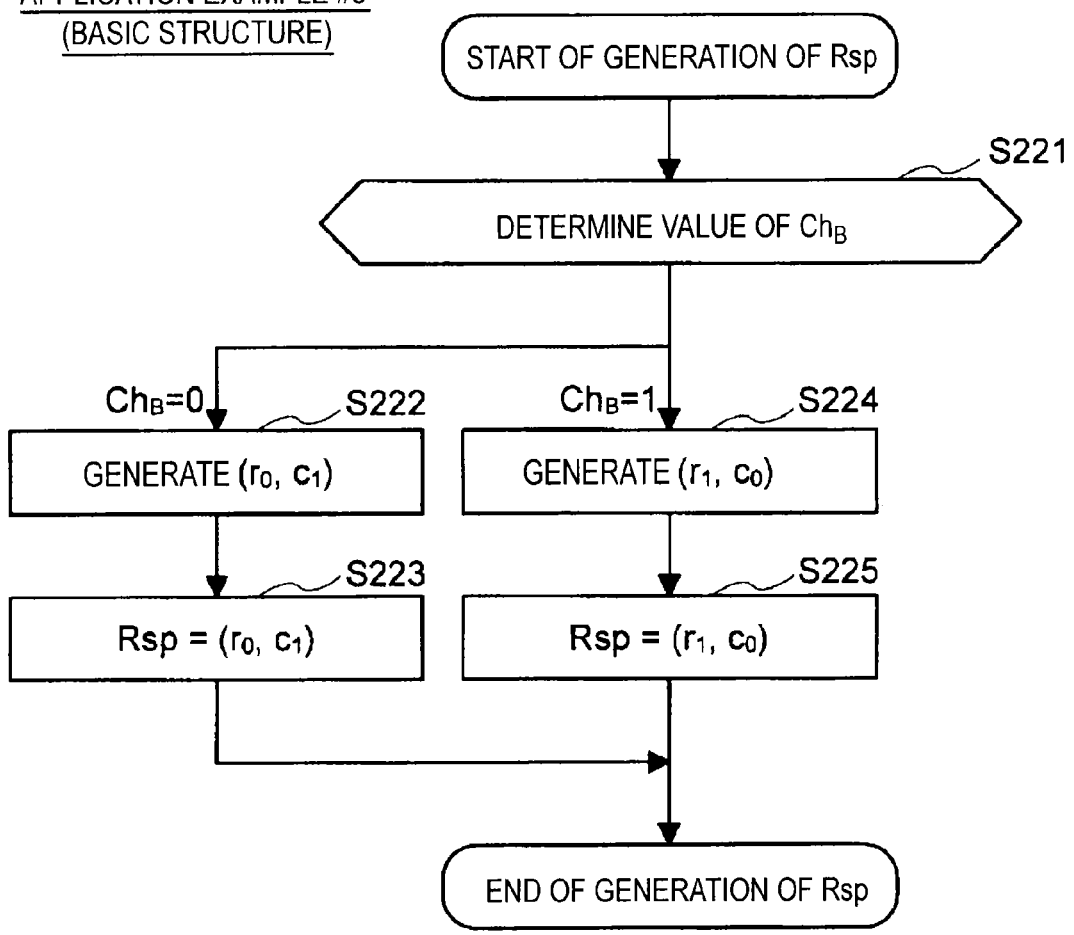
FIG. 20 is an explanatory diagram for describing a method of applying the intermediate variable management method according to an embodiment to the basic structure of the 5-pass scheme.

Next, FIG. 20 will be referred to. As illustrated in FIG. 20, the prover algorithm P determines the value of a challenge $Ch_B$ (S221). In the case where $Ch_B=0$, the prover algorithm P allows the process to proceed to step S222. In the case where $Ch_B=1$, the prover algorithm P allows the process to proceed to step S224.

When the process proceeds to step S222, the prover algorithm P generates $(r_0, c_1)$ (S222). At this time, the prover algorithm P executes necessary steps in the algorithm illustrated in FIG. 18 to generate $(r_0, c_1)$. Subsequently, the prover algorithm P sets the response Rsp=$(r_0, c_1)$ (S223) and ends the series of processes related to the generation of the response Rsp.

When the process proceeds to step S224, the prover algorithm P generates $(r_1, c_0)$ (S224). At this time, the prover algorithm P executes necessary steps in the algorithm illustrated in FIG. 18 to generate $(r_1, c_0)$. Subsequently, the prover algorithm P sets the response Rsp=$(r_1, c_0)$ (S225) and ends the series of processes related to the generation of the response Rsp.

The algorithm structures in the case where the memory reduction method according to the present embodiment is applied to the basic structure of the 5-pass scheme have been described above. By applying the above memory reduction method, it is possible to realize the public-key authentication scheme of the 5-pass scheme in a small storage area.

5-5: Application Example #4

Figure 21:
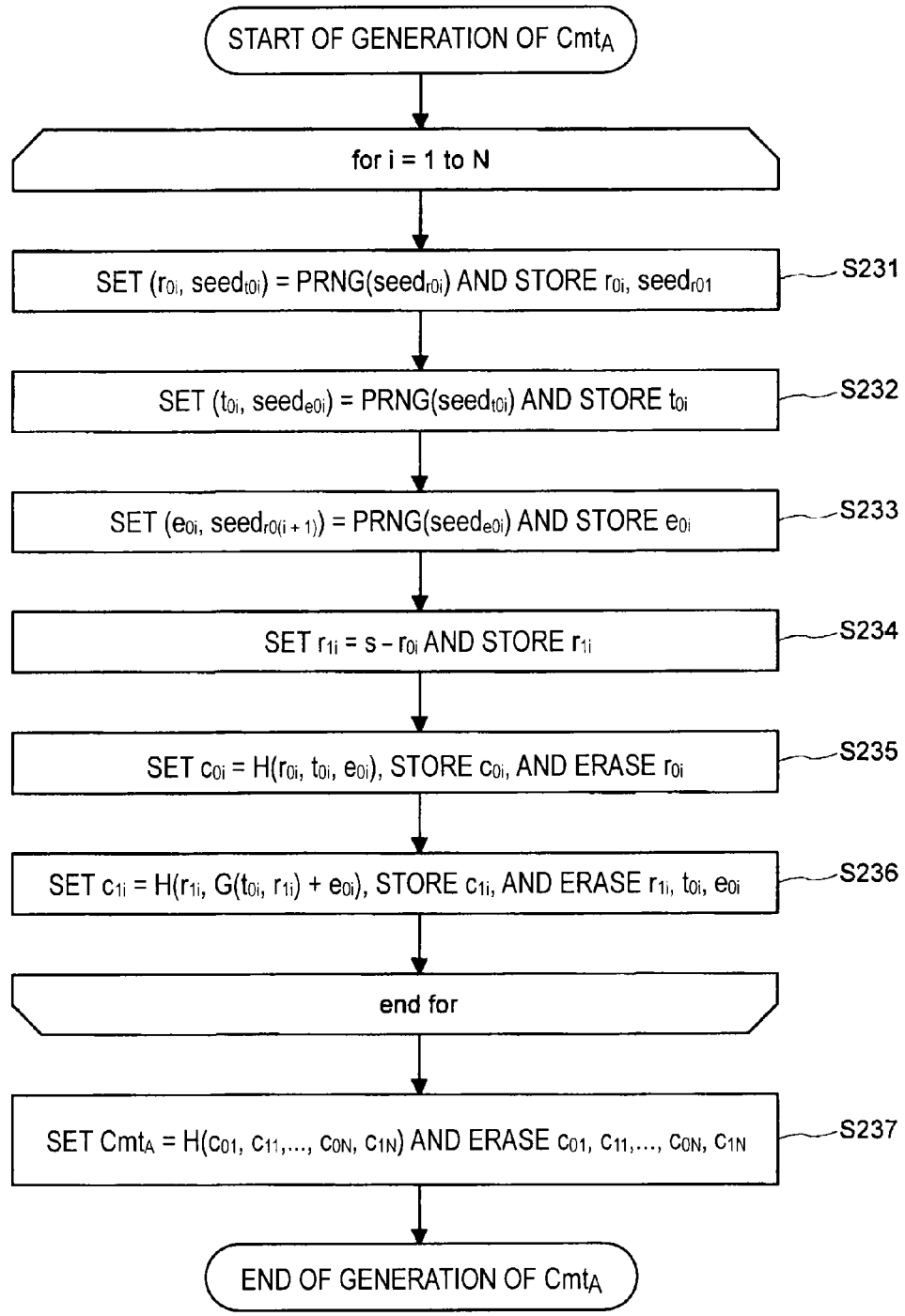
FIG. 21 is an explanatory diagram for describing a method of applying the intermediate variable management method according to the embodiment to a parallelized structure of the 5-pass scheme.

Application to Parallelized Structure of 5-Pass Scheme (FIGS. 20 and 21)

Next, an algorithm structure in the case where the memory reduction method according to the present embodiment is applied to the parallelized structure (see FIG. 7) of the 5-pass will be described with reference to FIGS. 21 and 22. Here, an algorithm structure in the case where the memory reduction method according to the present embodiment is applied to the parallelized algorithm of the 5-pass scheme illustrated in FIG. 7 will be considered.

(Method of Generating Hash Value $Cmt_A$)

First, FIG. 21 will be referred to. As illustrated in FIG. 21, the prover algorithm P starts generating the hash value $Cmt_A$ and repeatedly performs processes of steps S231 to S236 for i=1 to N. In step S231, the prover algorithm P calculates $(r_{0i}, seed_{r0i})$=PRNG($seed_{r0i}$) and stores $r_{0i}$ thereafter (S231). Here, the prover algorithm P stores $seed_{r01}$ when i=1. Subsequently, the prover algorithm P calculates $(t_{0i}, seed_{e0i})$=PRNG($seed_{r0i}$) and stores $t_{0i}$ thereafter (S232). Subsequently, the prover algorithm P calculates $(e_{0i}, seed_{r0(i+1)})$=PRNG($seed_{e0i}$) and stores $e_{0i}$ thereafter (S233).

Subsequently, the prover algorithm P calculates $r_{1i}=s-r_{0i}$ and stores $r_{1i}$ thereafter (S234). Subsequently, the prover algorithm P calculates $c_{0i}=H(r_{0i}, t_{0i}, e_{0i})$, stores $c_{0i}$ thereafter, and erases $r_{0i}$ (S235). Subsequently, the prover algorithm P calculates $c_{1i}=H(r_{1i}, G(t_{0i}, r_{1i})+e_{0i})$, stores $c_{1i}$ thereafter, and erases $r_{1i}, t_{0i}, e_{0i}$ (S236).

After executing the processes of steps S231 to S236 for i=1 to N, the prover algorithm P calculates the hash value $Cmt_A=H(c_{01}, c_{11}, \ldots, c_{0N}, c_{1N})$ and erases $c_{01}, c_{11}, \ldots, c_{0N}, c_{1N}$ thereafter (S237). After completing the process of step S237, the prover algorithm P ends the series of processes related to the generation of the hash value $Cmt_A$. Also, at this time, the prover algorithm P does not store the intermediate variables $(r_{0i}, t_{0i}, e_{0i}, r_{1i}, c_{0i}, c_{1i})$ (where i=1 to N).

(Method of Generating Hash Value $Cmt_B$)

Figure 22:
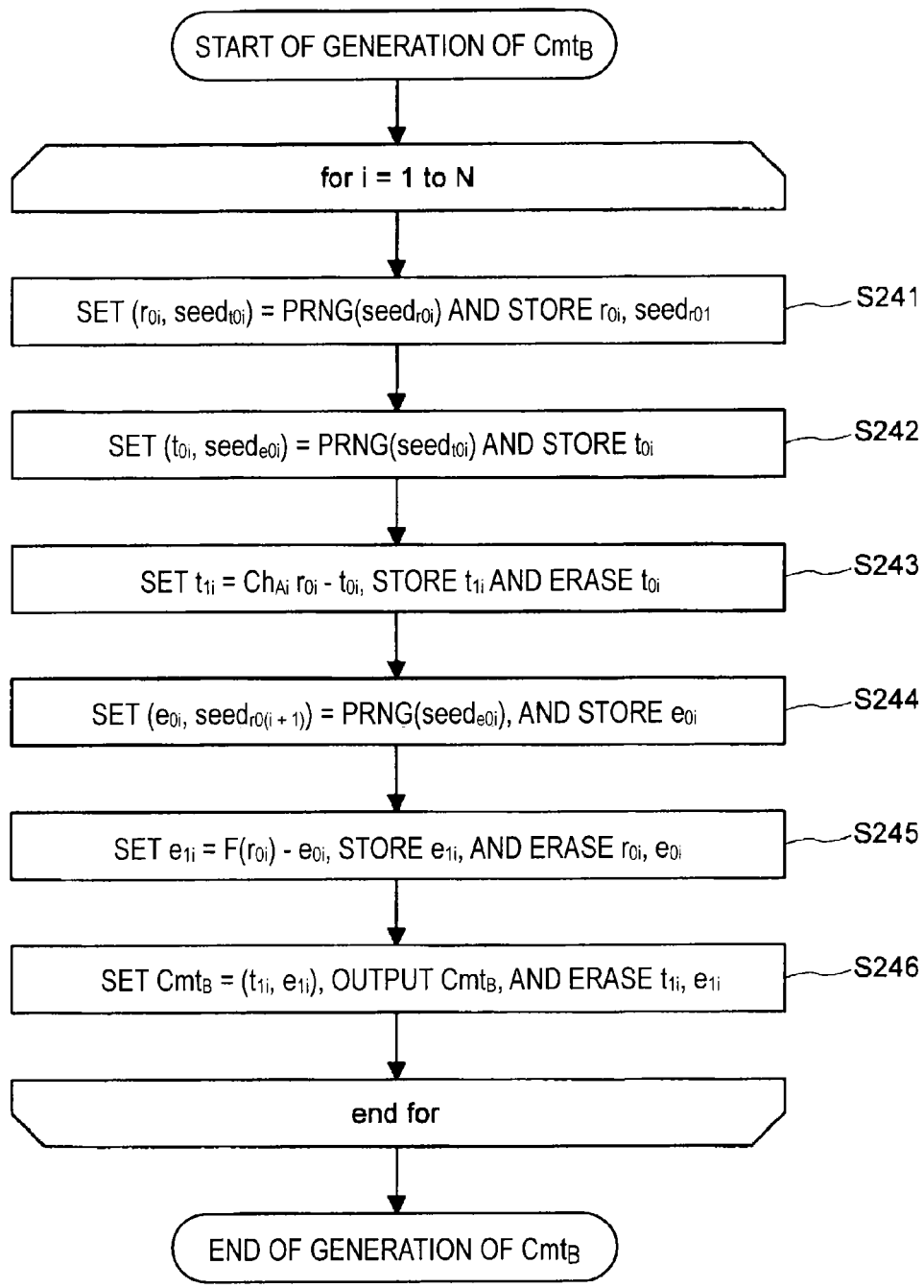
FIG. 22 is an explanatory diagram for describing a method of applying the intermediate variable management method according to the embodiment to a parallelized structure of the 5-pass scheme.

Next, FIG. 22 will be referred to. As illustrated in FIG. 22, the prover algorithm P starts generating the commitment value $Cmt_B$ and repeatedly performs processes of steps S241 to S246 for i=1 to N. In step S241, the prover algorithm P calculates $(r_{0i}, seed_{r0i})$=PRNG($seed_{r0i}$) and stores $r_{0i}$ thereafter (S241). Here, the prover algorithm P stores $seed_{r01}$ when i=1. Subsequently, the prover algorithm P calculates ($t_{0i}$, $seed_{e0i}$)=PRNG($seed_{r0i}$) and stores $t_{0i}$ thereafter (S242).

Subsequently, the prover algorithm P calculates $t_{1i}$=ChA$_i$*$r_{0i}$−$t_{0i}$, stores $t_{1i}$ thereafter, and erases t0i (S243). Subsequently, the prover algorithm P calculates ($e_{0i}$, $seed_{r0(i+1)}$)=PRNG($seed_{e0i}$), and stores $e_{0i}$ thereafter (S244). Subsequently, the prover algorithm P calculates $e_{1i}$=F($r_{0i}$)−$e_{0i}$, stores $e_{1i}$ thereafter, and erases $r_{0i}$, $e_{0i}$ (S245). Subsequently, the prover algorithm P sets the commitment value $Cmt_B$=($t_{1i}$, $e_{1i}$), transmits the commitment value $Cmt_B$ to the verifier algorithm V, and erases $t_{1i}$, $e_{1i}$ thereafter (S246).

After executing the processes of steps S241 to S246 for i=1 to N, the prover algorithm P ends the series of processes related to the generation of the commitment value $Cmt_B$. Also, at this time, the prover algorithm P does not store the intermediate variables ($r_{0i}$, $t_{0i}$, $e_{0i}$, $t_{1i}$, $e_{1i}$) (where i=1 to N).

(Method of Generating Response $Rsp_i$)

Figure 23:
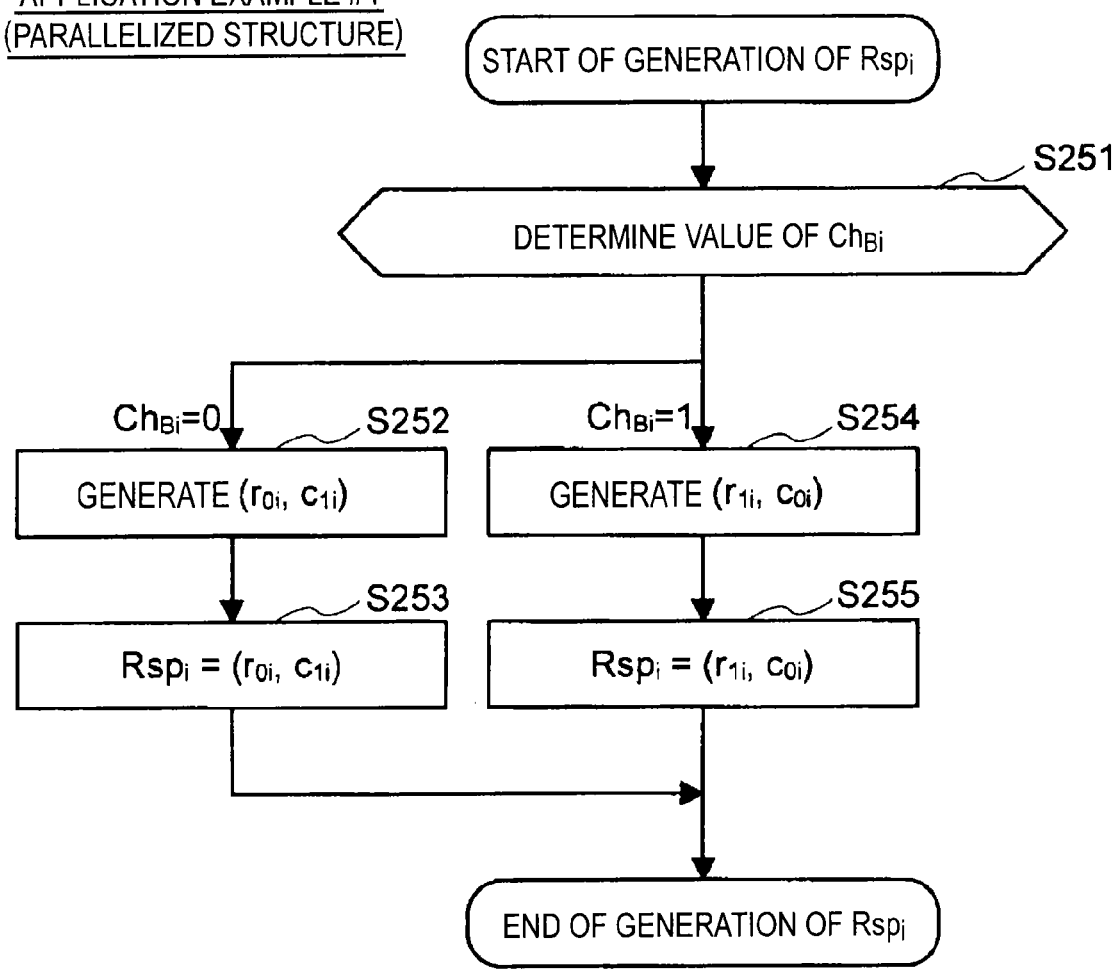
FIG. 23 is an explanatory diagram for describing a method of applying the intermediate variable management method according to the embodiment to a parallelized structure of the 5-pass scheme.

Next, FIG. 23 will be referred to. A process of generating the response $Rsp_i$ is similarly executed for i=1 to N. As illustrated in FIG. 23, the prover algorithm P determines the value of a challenge $Ch_{Bi}$ (S251). In the case where $Ch_{Bi}$=0, the prover algorithm P allows the process to proceed to step S252. In the case where $Ch_{Bi}$=1, the prover algorithm P allows the process to proceed to step S254.

When the process proceeds to step S252, the prover algorithm P generates ($r_{0i}$, $c_{1i}$) (S252). At this time, the prover algorithm P executes necessary steps in the algorithm illustrated in FIG. 21 to generate ($r_{0i}$, $c_{1i}$). Subsequently, the prover algorithm P sets the response $Rsp_i$=($r_{0i}$, $c_{1i}$) (S253) and ends the series of processes related to the generation of the response $Rsp_i$.

When the process proceeds to step S254, the prover algorithm P generates ($r_{1i}$, $c_{0i}$) (S254). At this time, the prover algorithm P executes necessary steps in the algorithm illustrated in FIG. 21 to generate ($r_{1i}$, $c_{0i}$). Subsequently, the prover algorithm P sets the response $Rsp_i$=($r_{1i}$, $c_{0i}$) (S255) and ends the series of processes related to the generation of the response $Rsp_i$.

The algorithm structures in the case where the memory reduction method according to the present embodiment is applied to the parallelized structure of the 5-pass scheme have been described above. By applying the above memory reduction method, it is possible to realize the parallelized public-key authentication scheme of the 5-pass scheme in a small storage area.

(Advantageous Effects of Memory Reduction)

In the case where (q, n, m, N)=(2, 80, 80, 90) is set and c, can be expressed with 160 bits, a storage area of 72000 or more bits is necessary when the above memory reduction method is not applied. However, when the above memory reduction method is applied and c, and a seed can be expressed with 160 bits, a storage area necessary for executing an algorithm can be reduced to 29600 or fewer bits. That is, by applying the above memory reduction method, the size of a necessary storage area is reduced to a size equal to or less than half.

5-6: Application Example #5

Application to Digital Signature Scheme

Next, an algorithm structure in the case where the memory reduction method according to the present embodiment is applied to the digital signature scheme (see FIGS. 8 and 9) will be described. As illustrated in FIGS. 8 and 9, the above digital signature scheme can be obtained from the parallelized algorithm of the 3-pass scheme or the 5-pass scheme. For this reason, a process executed by the signature generation algorithm Sig includes a process of generating Cmt or $Rsp_i$. Accordingly, by applying the above memory reduction method to this process, it is possible to execute an algorithm related to the above digital signature scheme in a small storage area in order to reduce the intermediate variables to be stored at one time to the maximum extent.

5-7: Modification Example A

Figure 24:
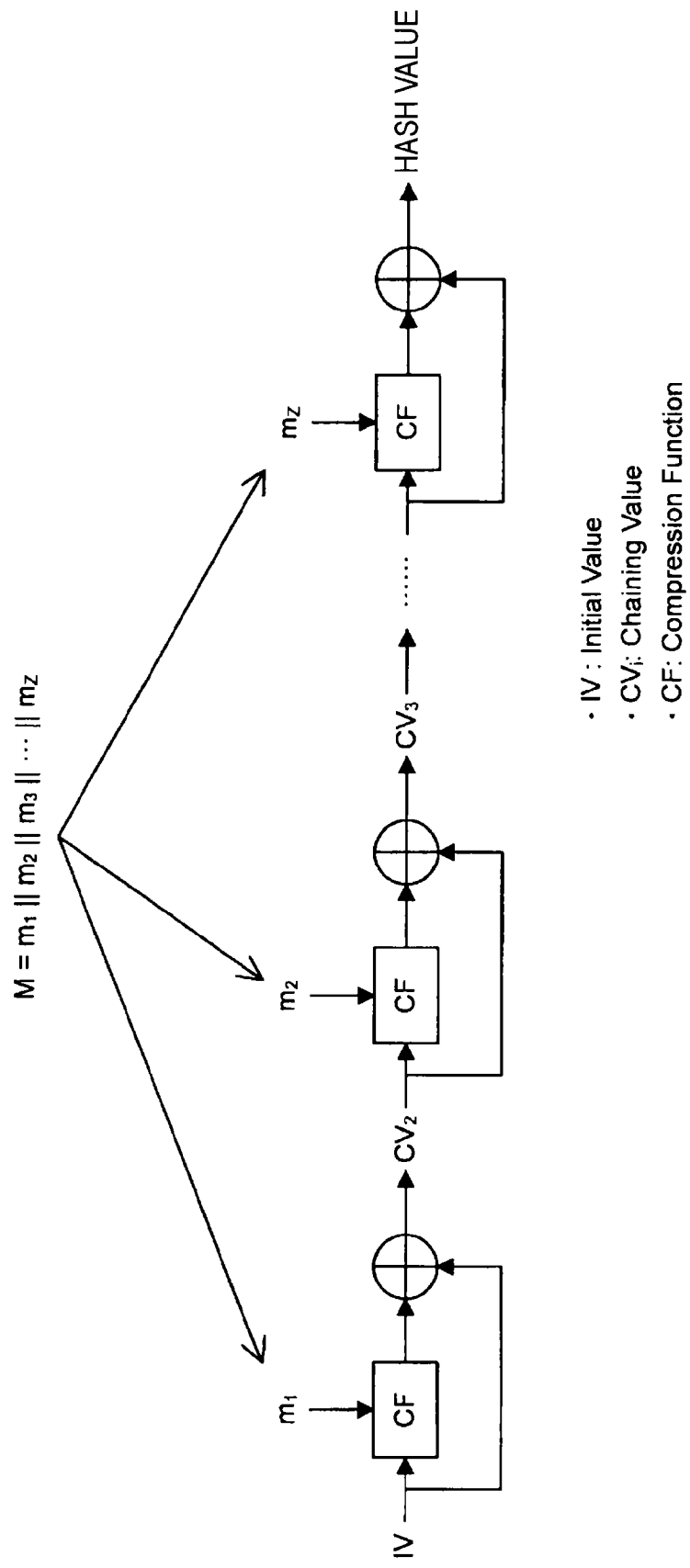
FIG. 24 is an explanatory diagram for describing an intermediate variable management method according to a modification example of the embodiment.

Structure in Consideration of Hash Function Structure (FIG. 24)

Incidentally, in each of the above algorithms, the values of the messages are stored in the storage area in order to calculate the hash value Cmt or $Cmt_A$. For example, in the example of FIG. 15, the messages $c_{0i}$, $c_{1i}$, $c_{2i}$ (where i=1 to N) are stored in the storage area. Similarly, in the example of FIG. 21, the messages $c_{0i}$, $c_{1i}$ (where i=1 to N) are stored in the storage area. However, the fact that all of the values of the messages are stored in the storage area is not preferable from the viewpoint of saving of the size of the storage area. Accordingly, the inventors of the present technology have devised a method of calculating the hash value Cmt or $Cmt_A$ focusing on the hash function structure without storing all of the values of the messages in the storage area.

In many cases, the hash function has a structure in which inputs are grouped in units of blocks and processes are sequentially executed in the units of blocks. For example, in the case of SHA-1, the hash function has the same structure as the structure illustrated in FIG. 24. The hash function illustrated in FIG. 24 generates a hash value by grouping padded inputs M into Z blocks $m_1, \ldots, m_z$ and operating blocks $m_j$ to a predetermined function CF along with an initial value IV or an intermediate value $CV_j$ while increasing an index j. Thus, when the intermediate value $CV_j$ is obtained, the previously used blocks do not become necessary. Accordingly, based on the characteristics, a structure for efficiently reducing the size of a memory area necessary for executing an algorithm has been devised. This structure will be described below in detail.

5-7-1: Modification Example A1

Figure 25:
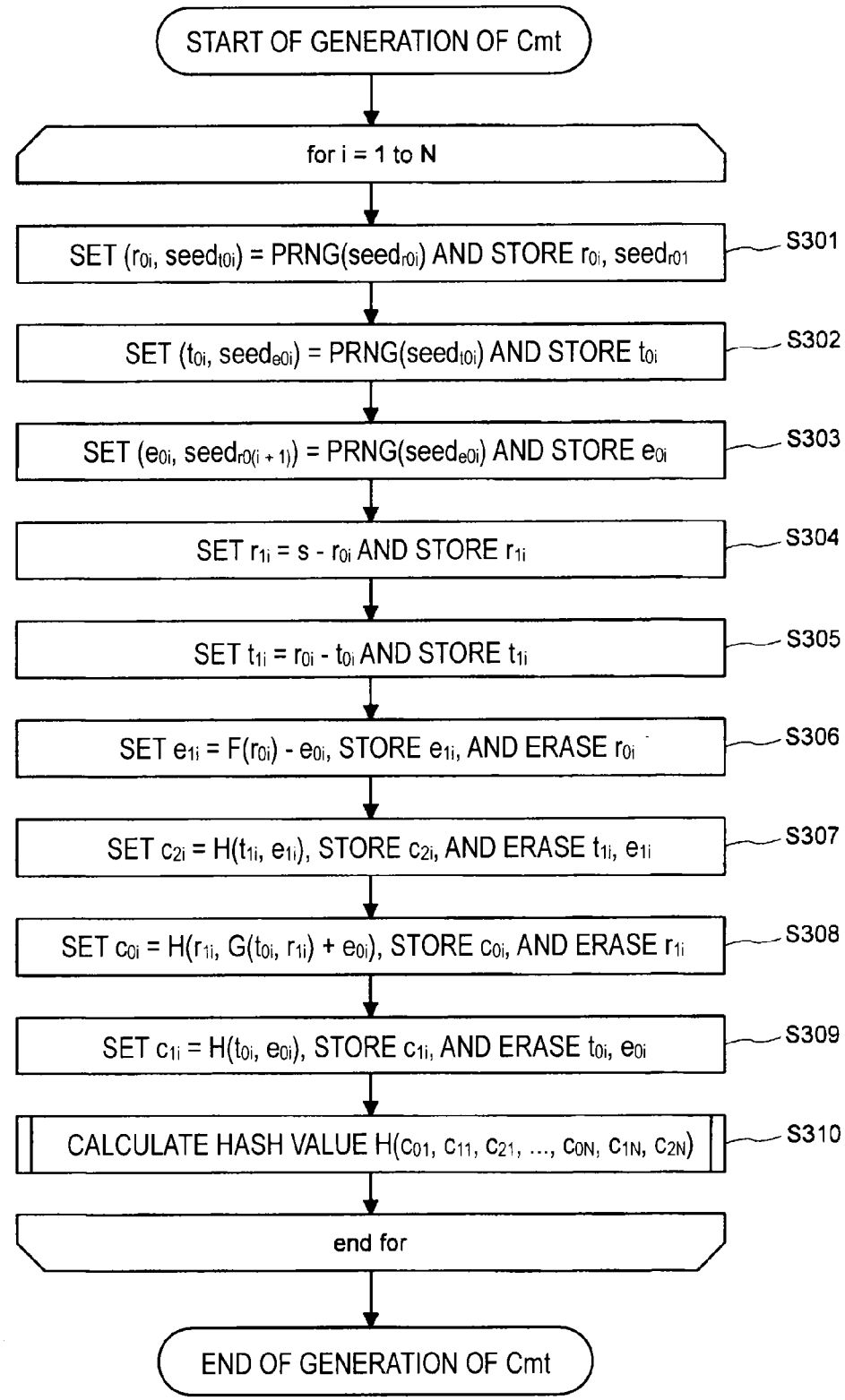
FIG. 25 is an explanatory diagram for describing an intermediate variable management method according to a modification example of the embodiment.
Figure 26:
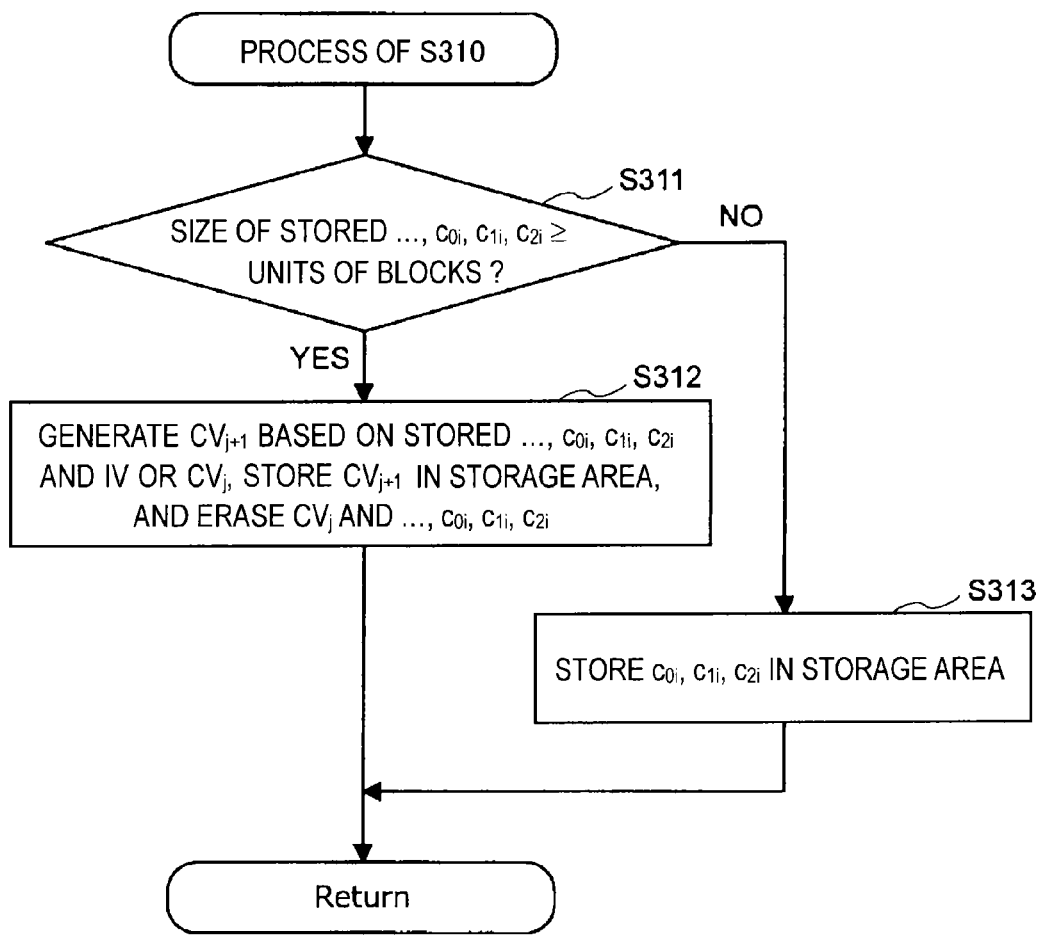
FIG. 26 is an explanatory diagram for describing an intermediate variable management method according to a modification example of the embodiment.

Application to 3-Pass Scheme (FIGS. 25 and 26)

First, FIGS. 25 and 26 will be referred to. FIGS. 25 and 26 are diagrams illustrating a structure (an algorithm in consideration of the hash function structure) improved from the algorithm illustrated in FIG. 15.

As illustrated in FIG. 25, the prover algorithm P starts generating the hash value Cmt and repeatedly executes processes of steps S301 to S310 for i=1 to N. In step S301, the prover algorithm P first calculates ($r_{0i}$, $seed_{r0i}$)=PRNG ($seed_{r0i}$), and stores $r_{0i}$ thereafter (S301). Here, the prover algorithm P stores the $seed_{r01}$ when i=1.

Subsequently, the prover algorithm P calculates ($t_{0i}$, $seed_{e0i}$)=PRNG($seed_{r0i}$), and stores $t_{0i}$ thereafter (S302). Subsequently, the prover algorithm P calculates ($e_{0i}$, $seed_{r0(i+1)}$)=PRNG($seed_{e0i}$), and stores $e_0$, thereafter (S303). Subsequently, the prover algorithm P calculates $r_{1i}$=s−$r_{0i}$, and stores $r_{1i}$ thereafter (S304). Subsequently, the prover algorithm P calculates $t_{1i}$=$r_{0i}$−$t_{0i}$, and stores $t_{1i}$ thereafter (S305).

Subsequently, the prover algorithm P calculates $e_{1i}=F(r_{0i})$ stores $e_{1i}$ thereafter, and erases $r_{0i}$ (S306).

Subsequently, the prover algorithm P calculates $c_{2i}=H(t_{1i}, e_{1i})$, stores $c_{2i}$ thereafter, and erases $t_{1i}$ and $e_{1i}$ (S307). Subsequently, the prover algorithm P calculates $c_{0i}=H(r_{1i}, G(t_{0i}, r_{1i}))+e_{0i}$, stores $c_{0i}$ thereafter, and erases $r_{1i}$ (S308). Subsequently, the prover algorithm P calculates $c_{1i}=H(t_{0i}, e_{0i})$, stores $e_{1i}$ thereafter, and erases $t_{0i}$ and $e_{0i}$ (S309). Subsequently, the prover algorithm P executes calculation related to calculation of the hash value $Cmt=H(c_{01}, c_{11}, c_{21}, \ldots, c_{0N}, c_{1N}, c_{2N})$ (S310: the details thereof will be described below).

After executing the processes of steps S301 to S310 for i=1 to N, the prover algorithm P ends the series of processes related to the generation of the hash value Cmt. Also, at this time, the prover algorithm P does not store the intermediate variables $(r_{0i}, t_{0i}, e_{0i}, r_{1i}, t_{1i}, e_{1i}, c_{0i}, c_{1i}, c_{2i})$ (where i=1 to N).

(Process of Step S310)

Here, the process of step S310 will be described in detail with reference to FIG. 26.

As illustrated in FIG. 26, in step S310, the prover algorithm P determines whether or not the sum size of the messages ..., $c_{0i}, c_{1i}, c_{2i}$ already stored in the storage area is equal to or greater than the units of blocks of the hash function (S311). When the sum size of the stored messages is equal to or greater than the units of blocks, the prover algorithm P allows the process to proceed to step S312. Conversely, when the sum size of the stored messages is less than the units of blocks, the prover algorithm P allows the process to proceed to step S313.

When the process proceeds to step S312, the prover algorithm P generates a subsequent intermediate value $CV_{j+1}$ based on the messages ..., $c_{0i}, c_{1i}, c_{2i}$ stored in the storage area and IV or the intermediate value $CV_j$, stores the subsequent intermediate value $CV_{j+1}$ in the storage area, and erases the messages ..., $c_{0i}, c_{1i}, c_{2i}$ and the intermediate value $CV_j$ thereafter (S312). On the other hand, when the process proceeds to step S313, the prover algorithm P stores the messages $c_{0i}, c_{1i}, c_{2i}$ in the storage area (S313). After executing the processes of steps S312 and S313, the prover algorithm P ends the process of step S310.

The algorithm of the 3-pass scheme in consideration of the hash function structure has been described above. When this structure is applied, (q, n, m, N)=(2, 80, 80, 140) is set and c, and the seeds are expressed with 160 bits. Also, when the units of blocks of the hash function are 512 bits, the storage area necessary for executing the algorithm is reduced to 1952 bits or less.

5-7-2: Modification Example A2

Figure 27:
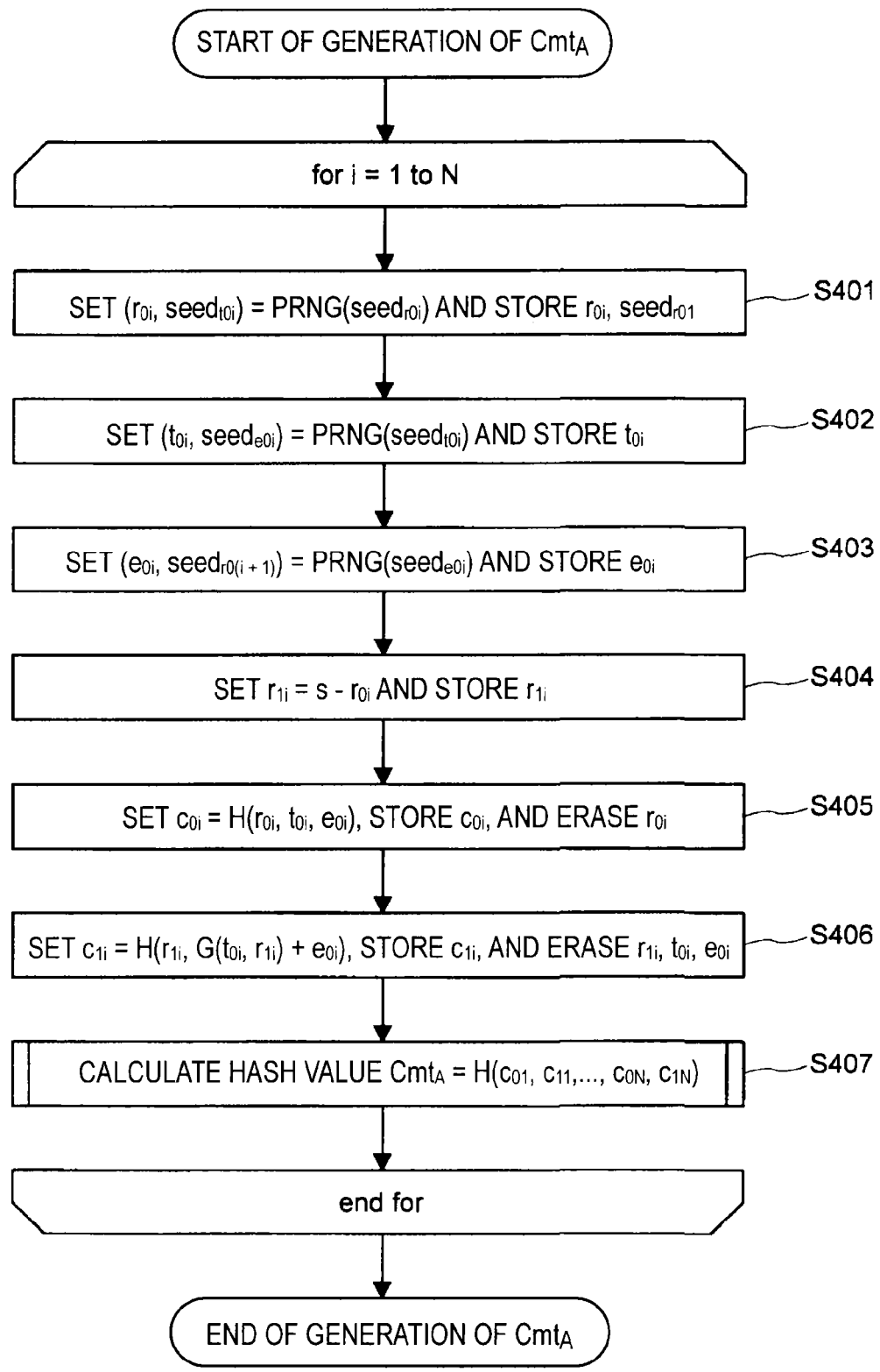
FIG. 27 is an explanatory diagram for describing an intermediate variable management method according to a modification example of the embodiment.

Application to 5-Pass Scheme (FIGS. 27 and 28)

First, FIGS. 27 and 28 will be referred to. FIGS. 27 and 28 are diagrams illustrating a structure (an algorithm in consideration of the hash function structure) improved from the algorithm illustrated in FIG. 21.

As illustrated in FIG. 27, the prover algorithm P starts generating the hash value $Cmt_A$ and repeatedly performs processes of steps S401 to S407 for i=1 to N. In step S401, the prover algorithm P calculates $(r_{0i}, seed_{r0i})=PRNG(seed_{r0i})$ and stores $r_{0i}$ thereafter (S401). Here, the prover algorithm P stores $seed_{r01}$ when i=1. Subsequently, the prover algorithm P calculates $(t_{0i}, seed_{e0i})=PRNG(seed_{r0i})$ and stores to thereafter (S402). Subsequently, the prover algorithm P calculates $(e_{0i}, seed_{r0(i+1)})=PRNG(seed_{e0i})$ and stores $e_{0i}$ thereafter (S403).

Subsequently, the prover algorithm P calculates $r_{1i}=s-r_0$, and stores $r_{1i}$ thereafter (S404). Subsequently, the prover algorithm P calculates $c_{0i}=H(r_{0i}, t_{0i}, e_{0i})$, stores $c_{0i}$ thereafter, and erases $r_{0i}$ (S405). Subsequently, the prover algorithm P calculates $c_{1i}=H(r_{1i}, G(t_{0i}, r_{1i})+e_{0i})$, stores $c_{1i}$ thereafter, and erases $r_{1i}, t_{0i}, e_{0i}$ (S406). Subsequently, the prover algorithm P executes calculation related to calculation of the hash value $Cmt_A=H(c_{01}, c_{11}, \ldots, c_{0N}, c_{1N})$ (S407: the details thereof will be described below).

After executing the processes of steps S401 to S407 for i=1 to N, the prover algorithm P ends the series of processes related to the generation of the hash value $Cmt_A$. Also, at this time, the prover algorithm P does not store the intermediate variables $(r_{0i}, t_{0i}, e_{0i}, r_{1i}, c_{0i}, c_{1i})$ (where i=1 to N).

(Process of Step S407)

Here, the process of step S407 will be described in detail with reference to FIG. 28.

As illustrated in FIG. 28, in step S407, the prover algorithm P determines whether or not the sum size of the messages ..., $c_{0i}, c_{1i}$ already stored in the storage area is equal to or greater than the units of blocks of the hash function (S411). When the sum size of the stored messages is equal to or greater than the units of blocks, the prover algorithm P allows the process to proceed to step S412. Conversely, when the sum size of the stored messages is less than the units of blocks, the prover algorithm P allows the process to proceed to step S413.

When the process proceeds to step S412, the prover algorithm P generates a subsequent intermediate value $CV_{j+1}$ based on the messages ..., $c_{0i}, c_{1i}$ stored in the storage area and IV or the intermediate value $CV_j$, stores the subsequent intermediate value $CV_{j+1}$ in the storage area, and erases the messages ..., $c_{0i}, c_{1i}$ and the intermediate value $CV_j$ thereafter (S412). On the other hand, when the process proceeds to step S413, the prover algorithm P stores the messages $c_{0i}, c_{1i}$ in the storage area (S413). After executing the processes of steps S412 and S413, the prover algorithm P ends the process of step S407.

The algorithm of the 5-pass scheme in consideration of the hash function structure has been described above. When this structure is applied, (q, n, m, N)=(2, 80, 80, 90) is set and c, and the seeds are expressed with 160 bits. Also, when the units of blocks of the hash function are 512 bits, the storage area necessary for executing the algorithm is reduced to 1712 bits or less.

5-8: Modification Example B

Seed Determination Method

The description above focuses on the structure in which all of the random numbers are generated from one seed, but each of the above algorithms is not limited to the structure. That is, random numbers may be configured to be generated from a plurality of seeds. For example, as shown in the following formulas (13) to (15), values determined in advance may be configured to be operated with respect to one seed and random access to any variable may be configured to be enabled. In this example, a seed, texts "r," "t," and "e," and an index i are combined. In this example, necessary intermediate variables can be acquired immediately by enabling random access from one seed to any variable, and thus an operation speed can be expected to be improved.

[Math 11]

$$r_{0i} = \text{PRNG}(\text{seed}\|\text{``}r\text{''}\|i) \quad (13)$$

$$t_{0i} = \text{PRNG}(\text{seed}\|\text{``}t\text{''}\|i) \quad (14)$$

$$e_{0i} = \text{PRNG}(\text{seed}\|\text{``}e\text{''}\|i) \quad (15)$$

The efficient intermediate variable management method has been described above. By applying the above method, it is possible to reduce the size of a storage area necessary for executing an algorithm.

<6: Example of Hardware Configuration (FIG. 29)>

Each algorithm described above can be performed by using, for example, the hardware configuration of the information processing apparatus shown in FIG. 29. That is, processing of each algorithm can be realized by controlling the hardware shown in FIG. 29 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 29, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<7: Summary>

Lastly, the technical contents according to the embodiment of the present technology will be briefly described. The technical contents stated here can be applied to various information processing apparatuses, such as a personal computer, a mobile phone, a game machine, an information terminal, an information appliance, a car navigation system, and the like. Further, the function of the information processing apparatus described below can be realized by using a single information processing apparatus or using a plurality of information processing apparatuses. Furthermore, a data storage means and an arithmetic processing means which are used for performing a process by the information processing apparatus described below may be mounted on the information processing apparatus, or may be mounted on a device connected via a network.

The functional configuration of the foregoing information processing apparatus is realized as follows. For example, an information processing apparatus described in the following (1) has a function of executing an algorithm of an efficient public-key authentication scheme or a digital signature scheme that bases its safety on the difficulty of solving multi-order multivariate simultaneous equations.

(1)

An information processing apparatus including:

a random number generation unit configured to generate a pair of random numbers from a seed;

a message generation unit configured to generate messages based on a pair of multi-order multivariate polynomials $F=(f_1, \ldots, f_m)$ defined in a ring K, the pair of random numbers, and a vector s that is an element of a set $K^n$;

a message supply unit configured to supply the messages to a verifier storing the pair of multi-order multivariate polynomials F and vectors $y=(y_1, \ldots, y_m)=(f_1(s), \ldots, f_m(s))$; and a response supply unit configured to supply the verifier with response information corresponding to a verification pattern selected by the verifier from among k (where k≥3) verification patterns, wherein the vector s is a secret key, wherein the pair of multi-order multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys and the response information, and wherein the message generation unit stores the seed in a storage apparatus and sequentially erases the random numbers becoming unnecessary in course of generating the messages and intermediate variables generated from the random numbers.

(2)

The information processing apparatus according to (1), wherein the response supply unit regenerates the random numbers or the intermediate variables used as the response information based on the seed stored in the storage apparatus.

(3)

The information processing apparatus according to (1) or (2), wherein the message generation unit generates the messages of N times (where N≥2), wherein the message supply unit supplies the verifier with the messages of the N times with interactivity of one time, and wherein the response supply unit supplies the verifier with the response information of the N times corresponding to the verification patterns selected by the verifier for the messages of the N times, with interactivity of one time.

(4)

The information processing apparatus according to (3), wherein the message generation unit generates one hash value from the messages of the N times, and wherein the message supply unit supplies the verifier with the hash value instead of the messages of the N times.

(5)

The information processing apparatus according to (4), wherein the message generation unit stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

(6)

An information processing apparatus including:

a random number generation unit configured to generate a pair of random numbers from a seed;

a message generation unit configured to generate messages based on a pair of multi-order multivariate polynomials $F=(f_1, \ldots, f_m)$ defined in a ring K, the pair of random numbers, and a vector s that is an element of a set $K^n$;

a message supply unit configured to supply the messages to a verifier storing the pair of multi-order multivariate polynomials F and vectors $y=(y_1, \ldots, y_m)=(f_1(s), \ldots, f_m(s))$;

an intermediate information generation unit configured to generate third information based on first information randomly selected by the verifier and second information obtained at a time of generation of the messages;

an intermediate information supply unit configured to supply the third information to the verifier; and a response supply unit configured to supply the verifier with response information corresponding to a verification pattern selected by the verifier from among k (where k≥2) verification patterns, wherein the vector s is a secret key, wherein the pair of quadratic multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys, the first information, the third information, and the response information, and wherein the message generation unit stores the seed in a storage apparatus and sequentially erases the random numbers becoming unnecessary in course of generating the messages and intermediate variables generated from the random numbers.

(7)

The information processing apparatus according to (6), wherein the intermediate information generation unit regenerates the random numbers or the intermediate variables used at a time of the generation of the third information based on the seed stored in the storage apparatus.

(8)

The information processing apparatus according to (7), wherein the intermediate information generation unit sequentially erases the random numbers becoming unnecessary in course of generating the third information and the intermediate variables generated from the random numbers.

(9)

The information processing apparatus according to any one of (6) to (8), wherein the response supply unit regenerates the random numbers or the intermediate variables used as the response information based on the seed stored in the storage apparatus.

(10)

The information processing apparatus according to any one of (6) to (9), wherein the message generation unit generates the messages of N times (where N≥2), wherein the message supply unit supplies the verifier with the messages of the N times with interactivity of one time, wherein the intermediate information generation unit generates the third information of the N times based on the first information selected by the verifier for the messages of the N times and the second information of the N times obtained at a time of the generation of the messages, wherein the intermediate information supply unit supplies the verifier with the third information of the N times with interactivity of one time, and wherein the response supply unit supplies the verifier with the response information of the N times corresponding to the verification patterns selected by the verifier for the messages of the N times, with interactivity of one time.

(11)

The information processing apparatus according to (10), wherein the message generation unit generates one hash value from the messages of the N times, and wherein the message supply unit supplies the verifier with the hash value instead of the messages of the N times.

(12)

The information processing apparatus according to (11), wherein the message generation unit stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

(13)

A signature generation apparatus including:

a random number generation unit configured to generate a pair of random numbers from a seed;

a signature generation unit configured to generate a digital signature for a document M based on a pair of multi-order multivariate polynomials $F=(f_1, \ldots, f_m)$ defined in a ring K, the pair of random numbers, and a signature key s that is an element of a set $K^n$; and a signature supply unit configured to supply the digital signature to a verifier storing the pair of multi-order multivariate polynomials F and vectors $y=(f_1(s), \ldots, f_m(s))$, wherein the signature generation unit stores the seed in a storage apparatus and sequentially erases the random numbers becoming unnecessary in course of generating the digital signature and intermediate variables generated from the random numbers.

(14)

An information processing method including:

a step of generating a pair of random numbers from a seed;

a step of generating messages based on a pair of multi-order multivariate polynomials $F=(f_1, \ldots, f_m)$ defined in a ring K, the pair of random numbers, and a vector s that is an element of a set $K^n$;

a step of supplying the messages to a verifier storing the pair of multi-order multivariate polynomials F and vectors $y=(y_1, \ldots, y_m)=(f_1(s), \ldots, f_m(s))$; and a step of supplying the verifier with response information corresponding to a verification pattern selected by the verifier from among k (where k≥3) verification patterns, wherein the vector s is a secret key, wherein the pair of multi-order multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys and the response information, and wherein, in the step of generating the messages, the seed is stored in a storage apparatus and a process of sequentially erasing the random numbers becoming unnecessary in course of generating the messages and intermediate variables generated from the random numbers is executed.

(15)

An information processing method including:

a step of generating a pair of random numbers from a seed;

a step of generating messages based on a pair of multi-order multivariate polynomials $F=(f_1, \ldots, f_m)$ defined in a ring K, the pair of random numbers, and a vector s that is an element of a set $K^n$;

a step of supplying the messages to a verifier storing the pair of multi-order multivariate polynomials F and vectors $y=(y_1, \ldots, y_m)=(f_1(s), \ldots, f_m(s))$;

a step of generating third information based on first information randomly selected by the verifier and second information obtained at a time of generation of the messages;

a step of supplying the third information to the verifier; and a step of supplying the verifier with response information corresponding to a verification pattern selected by the verifier from among k (where k≥2) verification patterns, wherein the vector s is a secret key, wherein the pair of quadratic multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys, the first information, the third information, and the response information, and wherein, in the step of generating the messages, the seed is stored in a storage apparatus and a process of sequentially erasing the random numbers becoming unnecessary in course of generating the messages and intermediate variables generated from the random numbers is executed.

(16)

A signature generation method including:

a step of generating a pair of random numbers from a seed;

a step of generating a digital signature for a document M based on a pair of multi-order multivariate polynomials $F=(f_1, \ldots, f_m)$ defined in a ring K, the pair of random numbers, and a signature key s that is an element of a set $K^n$; and a step of supplying the digital signature to a verifier storing the pair of multi-order multivariate polynomials F and vectors $y=(f_1(s), \ldots, f_m(s))$, wherein, in the step of generating the digital signature, the seed is stored in a storage apparatus and a process of sequentially erasing the random numbers becoming unnecessary in course of generating the digital signature and intermediate variables generated from the random numbers is executed.

(17)

A program causing a computer to realize:

a random number generation function of generating a pair of random numbers from a seed;

a message generation function of generating messages based on a pair of multi-order multivariate polynomials $F=(f_1, \ldots, f_m)$ defined in a ring K, the pair of random numbers, and a vector s that is an element of a set $K^n$;

a message supply function of supplying the messages to a verifier storing the pair of multi-order multivariate polynomials F and vectors $y=(y_1, \ldots, y_m)=(f_1(s), \ldots f_m(s))$; and a response supply function of supplying the verifier with response information corresponding to a verification pattern selected by the verifier from among k (where k≥3) verification patterns, wherein the vector s is a secret key, wherein the pair of multi-order multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys and the response information, and wherein the message generation function stores the seed in a storage apparatus and sequentially erases the random numbers becoming unnecessary in course of generating the messages and intermediate variables generated from the random numbers.

(18)

A program causing a computer to realize:

a random number generation function of generating a pair of random numbers from a seed;

a message generation function of generating messages based on a pair of multi-order multivariate polynomials $F=(f_1, \ldots, f_m)$ defined in a ring K, the pair of random numbers, and a vector s that is an element of a set $K^n$;

a message supply function of supplying the messages to a verifier storing the pair of multi-order multivariate polynomials F and vectors $y=(y_1, \ldots, y_m)=(f_1(s), \ldots, f_m(s))$;

an intermediate information generation function of generating third information based on first information randomly selected by the verifier and second information obtained at a time of generation of the messages;

an intermediate information supply function of supplying the third information to the verifier; and a response supply function of supplying the verifier with response information corresponding to a verification pattern selected by the verifier from among k (where k≥2) verification patterns, wherein the vector s is a secret key, wherein the pair of quadratic multivariate polynomials F and the vectors y are public keys, wherein the response information is information selected from among the pair of random numbers and the messages according to the verification pattern, wherein the messages are information obtained by executing calculation prepared in advance for the verification pattern corresponding to the response information based on the public keys, the first information, the third information, and the response information, and wherein the message generation function stores the seed in a storage apparatus and sequentially erases the random numbers becoming unnecessary in course of generating the messages and intermediate variables generated from the random numbers.

(19)

A program causing a computer to realize:

a random number generation function of generating a pair of random numbers from a seed;

a signature generation function of generating a digital signature for a document M based on a pair of multi-order multivariate polynomials $F=(f_1, \ldots, f_m)$ defined in a ring K, the pair of random numbers, and a signature key s that is an element of a set $K^n$; and a signature supply function of supplying the digital signature to a verifier storing the pair of multi-order multivariate polynomials F and vectors $y=(f_1(s), \ldots, f_m(S))$, wherein the signature generation function stores the seed in a storage apparatus and sequentially erases the random numbers becoming unnecessary in course of generating the digital signature and intermediate variables generated from the random numbers.

(20)

A computer-readable recording medium having the program according to any one of (17) to (19) recorded thereon.

(Remark)

The above prover algorithm P is an example of the random number generation unit, the message generation unit, the message supply unit, the response supply unit, the intermediate information generation unit, and the intermediate information supply unit. Also, the above signature generation algorithm Sig is an example of the random number generation unit, the signature generation unit, and the signature supply unit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above description, the algorithms using the hash function H have been introduced, but a commitment function COM may be used instead of the hash function H. The commitment function COM is a function in which a character string S and a random number p are used as factors. An example of the commitment function includes a scheme published by Shai Halevi and Silvio Micali in the international conference CRYPTO1996.

REFERENCE SIGNS LIST

Gen key generation algorithm
P prover algorithm
V verifier algorithm
Sig signature generation algorithm
Ver signature verifying algorithm

The invention claimed is:

1. An information processing apparatus comprising:
circuitry configured to
generate a pair of random numbers from a seed;
generate a message based on a pair of multi-order multivariate polynomials $F=(f1, \ldots, fm)$ defined in a ring K, the pair of random numbers, and a vector s that is an element of a set $K^n$;
supply the message to a verifier storing the pair of multi-order multivariate polynomials F and vectors $y=(y1, \ldots, Ym)=(f1(s), \ldots, fm(s))$; and
supply the verifier with response information corresponding to a verification pattern selected by the verifier from among k (where k≥3) verification patterns,
wherein the vector s is a secret key,
wherein the pair of multi-order multivariate polynomials F and the vectors y are public keys,
wherein the response information is information selected from among the pair of random numbers and the message according to the verification pattern,
wherein the message is information obtained by executing calculation prepared in advance for the verification pattern corresponding to the response information based on the public keys and the response information,
stores the seed in a storage apparatus and sequentially erases the random numbers becoming unnecessary in course of generating the message and intermediate variables generated from the random numbers,
generates the messages of N times (where N≥2),
the verifier with the messages of the N times with interactivity of one time,
supplies the verifier with the response information of the N times corresponding to the verification patterns selected by the verifier for each of the messages of the N times, with interactivity of one time,
generates one hash value from the messages of the N times,
supplies the verifier with the hash value instead of the messages of the N times, and
stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

2. The information processing apparatus according to claim 1, regenerates the same random numbers or the same intermediate variables used as the response information based on the seed stored in the storage apparatus.

3. An information processing apparatus comprising:
circuitry configured to
generate a pair of random numbers from a seed;
generate a message based on a pair of multi-order multivariate polynomials $F=(f1, \ldots, fm)$ defined in a ring K, the pair of random numbers, and a vector s that is an element of a set $K^n$;
supply the message to a verifier storing the pair of multi-order multivariate polynomials F and vectors $y=(y1, \ldots, Ym)=(f1(s), \ldots, fm(s))$;
generate third information based on first information randomly selected by the verifier and second information obtained at a time of generation of the message;
supply the third information to the verifier; and
supply the verifier with response information corresponding to a verification pattern selected by the verifier from among k (where k≥2) verification patterns,
wherein the vector s is a secret key,
wherein the pair of multi-order multivariate polynomials F and the vectors y are public keys,
wherein the response information is information selected from among the pair of random numbers and the message according to the verification pattern,
wherein the message is information obtained by executing calculation prepared in advance for the verification pattern corresponding to the response information based on the public keys, the first information, the third information, and the response information,
stores the seed in a storage apparatus and sequentially erases the random numbers becoming unnecessary in course of generating the message and intermediate variables generated from the random numbers,
generates the messages of N times (where N≥2),
supplies the verifier with the messages of the N times with interactivity of one time,
generates the third information of the N times based on the first information selected by the verifier for each of the messages of the N times and the second information of the N times obtained at the time of the generation of the messages,
supplies the verifier with the third information of the N times with interactivity of one time,
supplies the verifier with the response information of the N times corresponding to the verification patterns selected by the verifier for each of the messages of the N times, with interactivity of one time,
generates one hash value from the messages of the N times,
supplies the verifier with the hash value instead of the messages of the N times, and
stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

4. The information processing apparatus according to claim 3, regenerates the random numbers or the intermediate variables used at a time of the generation of the third information based on the seed stored in the storage apparatus.

5. The information processing apparatus according to claim 4, sequentially erases the random numbers becoming unnecessary in course of generating the third information and the intermediate variables generated from the random numbers.

6. The information processing apparatus according to claim 3, regenerates the random numbers or the intermediate variables used as the response information based on the seed stored in the storage apparatus.

7. An information processing method comprising:
a step of generating, by circuitry of an information processing apparatus, a pair of random numbers from a seed;
a step of generating, by the circuitry, a message based on a pair of multi-order multivariate polynomials $F=(f1, \ldots, fm)$ defined in a ring K, the pair of random numbers, and a vector s that is an element of a set Kn;
a step of supplying, by the circuitry, the message to a verifier storing the pair of multi-order multivariate polynomials F and vectors $y=(y1, \ldots, Ym)=(f1(s), \ldots, fm(s))$; and
a step of supplying, by the circuitry, the verifier with response information corresponding to a verification pattern selected by the verifier from among k (where k≥3) verification patterns,
wherein the vector s is a secret key,
wherein the pair of multi-order multivariate polynomials F and the vectors y are public keys,
wherein the response information is information selected from among the pair of random numbers and the message according to the verification pattern,
wherein the message is information obtained by executing calculation prepared in advance for the verification pattern corresponding to the response information based on the public keys and the response information,
wherein, in the step of generating the message, the seed is stored in a storage apparatus and a process of sequentially erasing the random numbers becoming unnecessary in course of generating the message and intermediate variables generated from the random numbers is executed,
wherein, in the step of generating the message, the messages of N times (where N≥2) are generated,
wherein, in the step of supplying the message, the messages of the N times are supplied to the verifier with interactivity of one time,
wherein, in the step of supplying the response information, the verifier is supplied with the response information of the N times corresponding to the verification patterns selected by the verifier for each of the messages of the N times, with interactivity of one time,
wherein, in the step of generating the message, one hash value is generated from the messages of the N times,
wherein, in the step of supplying the message, the hash value is supplied to the verifier instead of the messages of the N times, and
wherein, in the step of generating the message, the generated messages are stored in the storage apparatus and the hash value is calculated by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

8. An information processing method comprising:
a step of generating, by circuitry of an information processing apparatus, a pair of random numbers from a seed;
a step of generating, by the circuitry, a message based on a pair of multi-order multivariate polynomials F=(f1, . . . , fm) defined in a ring K, the pair of random numbers, and a vector s that is an element of a set Kn;
a step of supplying, by the circuitry, the message to a verifier storing the pair of multi-order multivariate polynomials F and vectors y=(y1, . . . , Ym)=(f1(s), . . . , fm(s));
a step of generating, by the circuitry, third information based on first information randomly selected by the verifier and second information obtained at a time of generation of the message;
a step of supplying, by the circuitry, the third information to the verifier; and
a step of supplying, by the circuitry, the verifier with response information corresponding to a verification pattern selected by the verifier from among k (where k≥2) verification patterns,
wherein the vector s is a secret key,
wherein the pair of multi-order multivariate polynomials F and the vectors y are public keys,
wherein the response information is information selected from among the pair of random numbers and the message according to the verification pattern,
wherein the message is information obtained by executing calculation prepared in advance for the verification pattern corresponding to the response information based on the public keys, the first information, the third information, and the response information,
wherein, in the step of generating the message, the seed is stored in a storage apparatus and a process of sequentially erasing the random numbers becoming unnecessary in course of generating the message and intermediate variables generated from the random numbers is executed,
wherein, in the step of generating the message, the messages of N times (where N≥2) are generated,
wherein, in the step of supplying the message, the verifier is supplied with the messages of the N times with interactivity of one time,
wherein, in the step of generating intermediate information, the third information of the N times is generated based on the first information selected by the verifier for each of the messages of the N times and the second information of the N times obtained at the time of the generation of the messages,
wherein, in the step of generating intermediate information, the verifier is supplied with the third information of the N times with interactivity of one time,
wherein, in the step of supplying the response information, the verifier is supplied with the response information of the N times corresponding to the verification patterns selected by the verifier for each of the messages of the N times, with interactivity of one time,
wherein, in the step of generating the message, one hash value is generated from the messages of the N times,
wherein, in the step of supplying the message, the hash value is supplied to the verifier instead of the messages of the N times, and
wherein, in the step of generating the message, the generated messages are stored in the storage apparatus and the hash value is calculated by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

9. A non-transitory computer readable medium including computer executable instructions causing a computer to:
generate a pair of random numbers from a seed;
generate a message based on a pair of multi-order multivariate polynomials F=(f1, . . . , fm) defined in a ring K, the pair of random numbers, and a vector s that is an element of a set Kn;
supply the message to a verifier storing the pair of multi-order multivariate polynomials F and vectors y=(y1, . . . , Ym)=(f1(s), . . . , fm(s)); and
supply the verifier with response information corresponding to a verification pattern selected by the verifier from among k (where k≥3) verification patterns,
wherein the vector s is a secret key,
wherein the pair of multi-order multivariate polynomials F and the vectors y are public keys,
wherein the response information is information selected from among the pair of random numbers and the message according to the verification pattern,
wherein the message is information obtained by executing calculation prepared in advance for the verification pattern corresponding to the response information based on the public keys and the response information,
wherein the message generation function stores the seed in a storage apparatus and sequentially erases the random numbers becoming unnecessary in course of generating the message and intermediate variables generated from the random numbers,
wherein the message generation function generates the messages of N times (where N≥2),
wherein the message supply function supplies the verifier with the messages of the N times with interactivity of one time,
wherein the response supply function supplies the verifier with the response information of the N times corresponding to the verification patterns selected by the verifier for the messages of the N times, with interactivity of one time,
wherein the message generation function generates one hash value from the messages of the N times,
wherein the message supply function supplies the verifier with the hash value instead of the messages of the N times, and
wherein the message generation function stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

10. A non-transitory computer readable medium including computer executable instructions causing a computer to:
  generate a pair of random numbers from a seed;
  generate a message based on a pair of multi-order multivariate polynomials $F=(f1, \ldots, fm)$ defined in a ring K, the pair of random numbers, and a vector s that is an element of a set Kn;
  supply the message to a verifier storing the pair of multi-order multivariate polynomials F and vectors $y=(y1, \ldots, Ym)=(f1(s), \ldots, fm(s))$;
  generate third information based on first information randomly selected by the verifier and second information obtained at a time of generation of the message;
  supply the third information to the verifier; and
  supply the verifier with response information corresponding to a verification pattern selected by the verifier from among k (where $k \geq 2$) verification patterns,
  wherein the vector s is a secret key,
  wherein the pair of multi-order multivariate polynomials F and the vectors y are public keys,
  wherein the response information is information selected from among the pair of random numbers and the message according to the verification pattern,
  wherein the message is information obtained by executing calculation prepared in advance for the verification pattern corresponding to the response information based on the public keys, the first information, the third information, and the response information,
  wherein the message generation function stores the seed in a storage apparatus and sequentially erases the random numbers becoming unnecessary in course of generating the message and intermediate variables generated from the random numbers,
  wherein the message generation function generates the messages of N times (where $N \geq 2$),
  wherein the message supply function supplies the verifier with the messages of the N times with interactivity of one time,
  wherein the intermediate information generation function generates the third information of the N times based on the first information selected by the verifier for each of the messages of the N times and the second information of the N times obtained at the time of the generation of the messages,
  wherein the intermediate information supply function supplies the verifier with the third information of the N times with interactivity of one time,
  wherein the response supply function supplies the verifier with the response information of the N times corresponding to the verification patterns selected by the verifier for each of the messages of the N times, with interactivity of one time,
  wherein the message generation function generates one hash value from the messages of the N times,
  wherein the message supply function supplies the verifier with the hash value instead of the messages of the N times, and
  wherein the message generation function stores the generated messages in the storage apparatus and calculates the hash value by sequentially executing a process of calculating an intermediate value calculated by a hash function during calculation of the hash value based on the messages stored in the storage apparatus and a process of erasing the messages stored in the storage apparatus when a sum size of the messages stored in the storage apparatus is greater than a block unit of the hash function.

* * * * *